United States Patent [19]
Danmoto et al.

[11] Patent Number: 5,825,980
[45] Date of Patent: Oct. 20, 1998

[54] ROBOT HAND STRUCTURE, AND METHOD OF SELECTING HAND STRUCTURE

[75] Inventors: Shojiro Danmoto, Ushiku; Fumio Kanno, Tsuchiura; Takao Komiya; Sumiyoshi Ito, both of Ushiku, all of Japan

[73] Assignee: Canon Kabushiki Kaisha, Tokyo, Japan

[21] Appl. No.: 123,268

[22] Filed: Sep. 20, 1993

Related U.S. Application Data

[60] Division of Ser. No. 809,258, Dec. 18, 1991, abandoned, which is a continuation-in-part of Ser. No. 527,816, May 24, 1990, abandoned.

[30] Foreign Application Priority Data

| May 26, 1989 | [JP] | Japan | 1-131402 |
|---|---|---|---|
| May 26, 1989 | [JP] | Japan | 1-131403 |
| May 8, 1990 | [JP] | Japan | 2-116959 |
| May 8, 1990 | [JP] | Japan | 2-116960 |
| May 8, 1990 | [JP] | Japan | 2-116961 |
| May 8, 1990 | [JP] | Japan | 2-116962 |
| May 8, 1990 | [JP] | Japan | 2-116963 |
| May 8, 1990 | [JP] | Japan | 2-116964 |

[51] Int. Cl.⁶ .......................... G06F 15/46; G05B 19/42
[52] U.S. Cl. .................. 395/80; 395/83; 395/87; 395/89; 395/93; 395/95; 395/97; 395/99
[58] Field of Search ................ 395/80, 87, 89, 395/97, 99, 83, 93, 95

[56] References Cited

U.S. PATENT DOCUMENTS

| 4,001,556 | 1/1977 | Folchi et al. | 395/93 |
|---|---|---|---|
| 4,402,053 | 8/1983 | Kelley et al. | 395/94 |
| 4,412,293 | 10/1983 | Kelley et al. | 395/95 |
| 4,528,632 | 7/1985 | Nio et al. | 395/91 |
| 4,543,702 | 10/1985 | Wada | 29/434 |
| 4,593,820 | 6/1986 | Antonie et al. | 395/93 |
| 4,595,989 | 6/1986 | Yasukawa et al. | 395/89 |
| 4,598,456 | 7/1986 | McConnell | 29/407 |
| 4,643,473 | 2/1987 | Douglas | 294/111 |
| 4,663,726 | 5/1987 | Chand et al. | 318/573 |
| 4,694,230 | 9/1987 | Slocum et al. | 318/568 |
| 4,715,773 | 12/1987 | Parker et al. | 395/95 |
| 4,725,965 | 2/1988 | Keenan | 901/40 |
| 4,757,458 | 7/1988 | Takemoto et al. | 395/89 |
| 4,814,969 | 3/1989 | Kiyooka | 395/85 |
| 4,894,595 | 1/1990 | Sagawa et al. | 395/89 |
| 4,896,431 | 1/1990 | Danmoto et al. | 33/664 |
| 5,020,001 | 5/1991 | Yamamoto et al. | 395/87 |
| 5,307,447 | 4/1994 | Asano et al. | 395/90 |

FOREIGN PATENT DOCUMENTS

| 2125385 | 9/1972 | France . |
|---|---|---|
| 2599290 | 12/1987 | France . |
| 2143205 | 2/1985 | United Kingdom . |

*Primary Examiner*—George B. Davis
*Attorney, Agent, or Firm*—Fitzpatrick, Cella, Harper & Scinto

[57] ABSTRACT

A hand apparatus of a robot includes fingers for clamping a first workpiece and inserting a second workpiece into the first workpiece, a compliance device disposed between an arm of the robot and the fingers, and a calculator for determining shifting information between the first and second workpieces. A memory memorizes design information associated with the insertion operation of the first and second workpieces, and the hand apparatus selects whether the compliance device is required or not on the basis of the information provided by the calculator and the memory.

12 Claims, 44 Drawing Sheets

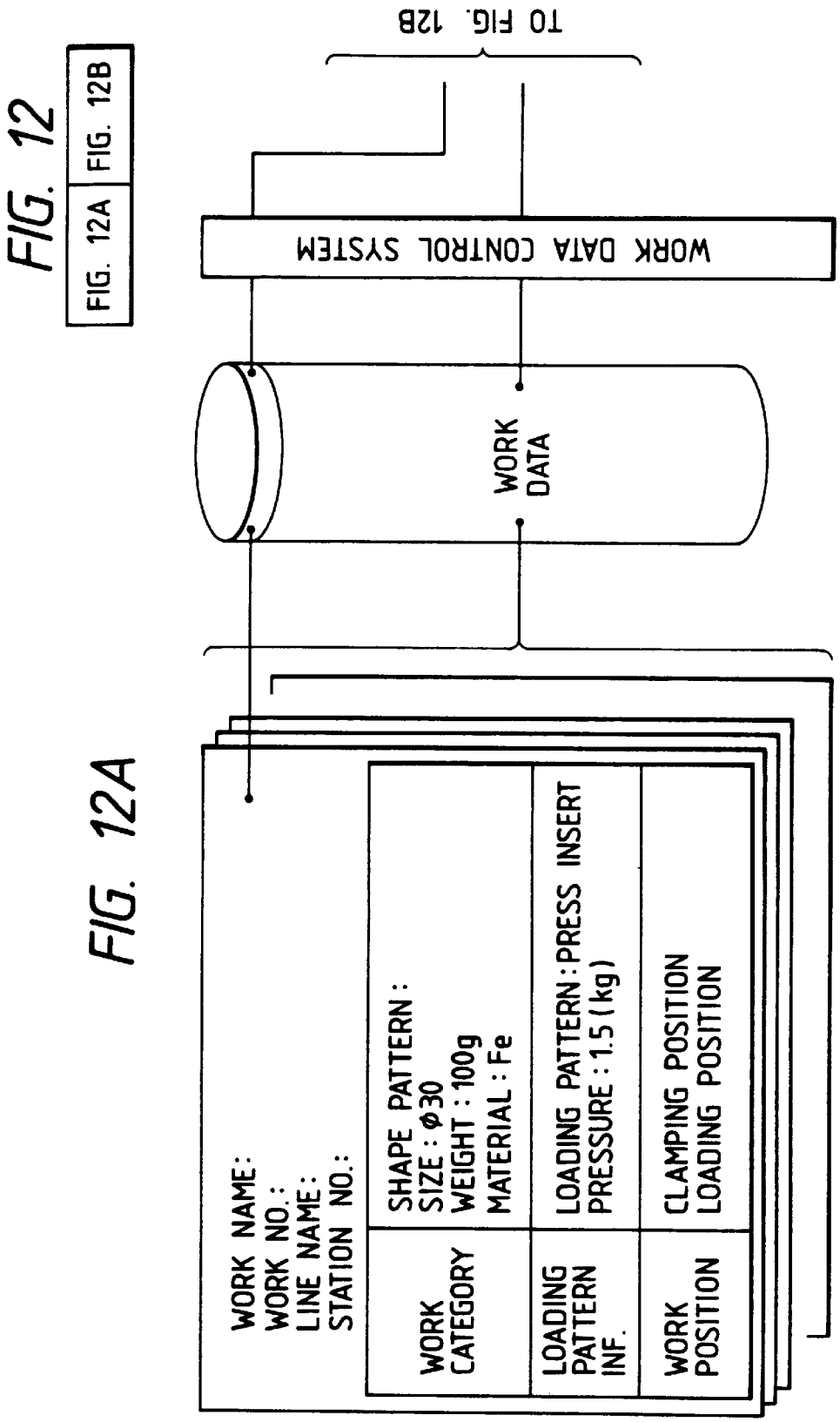

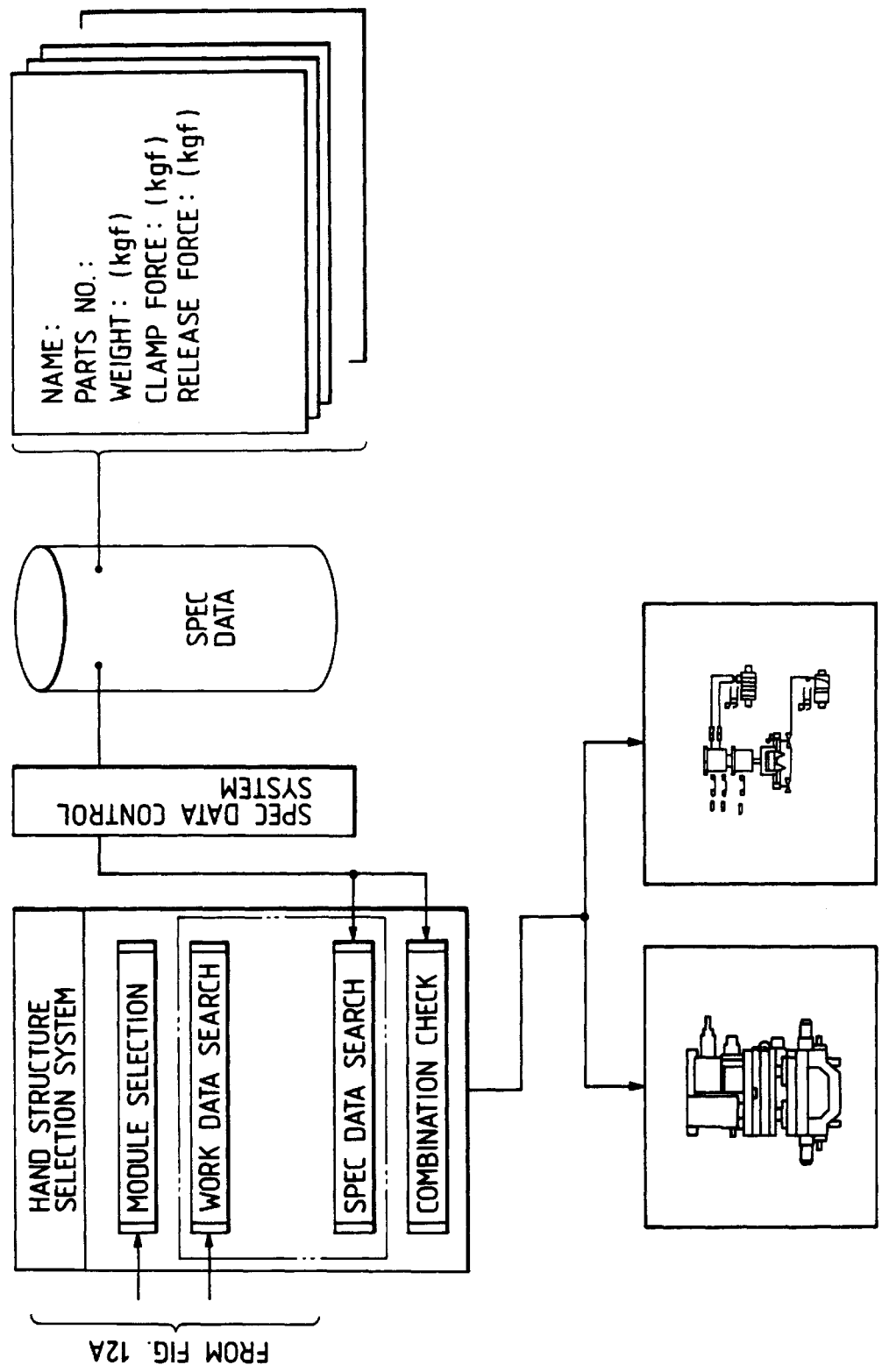

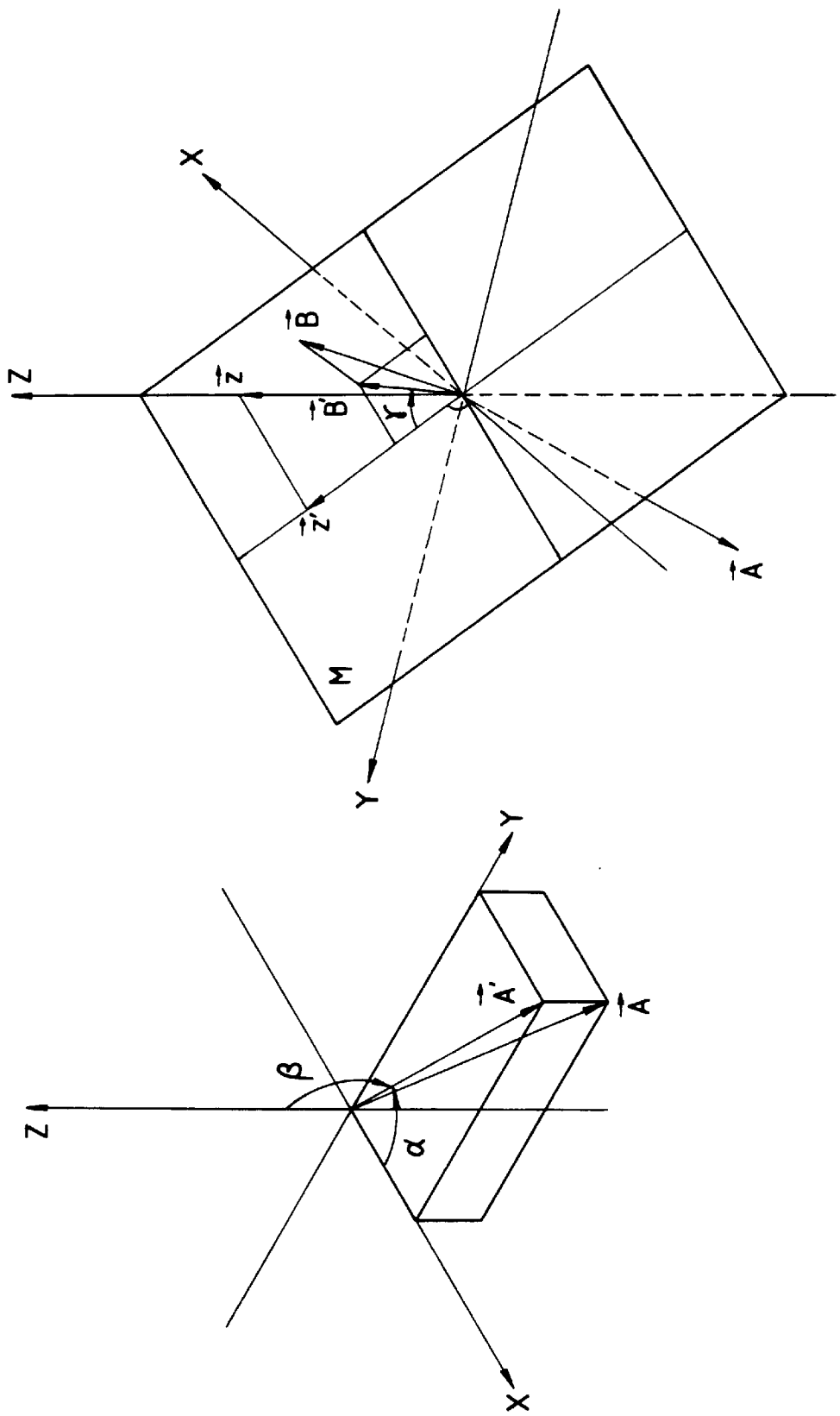

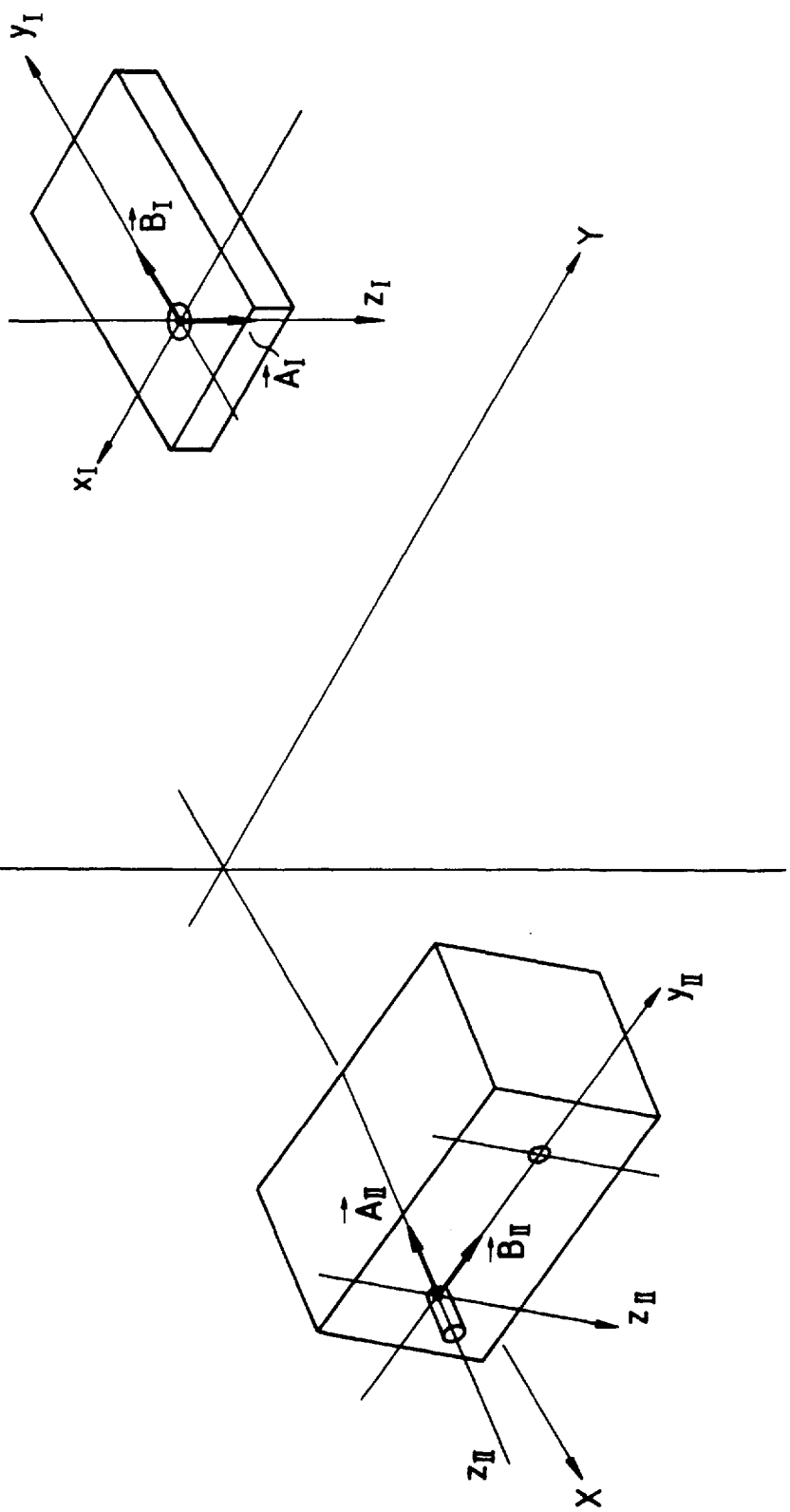

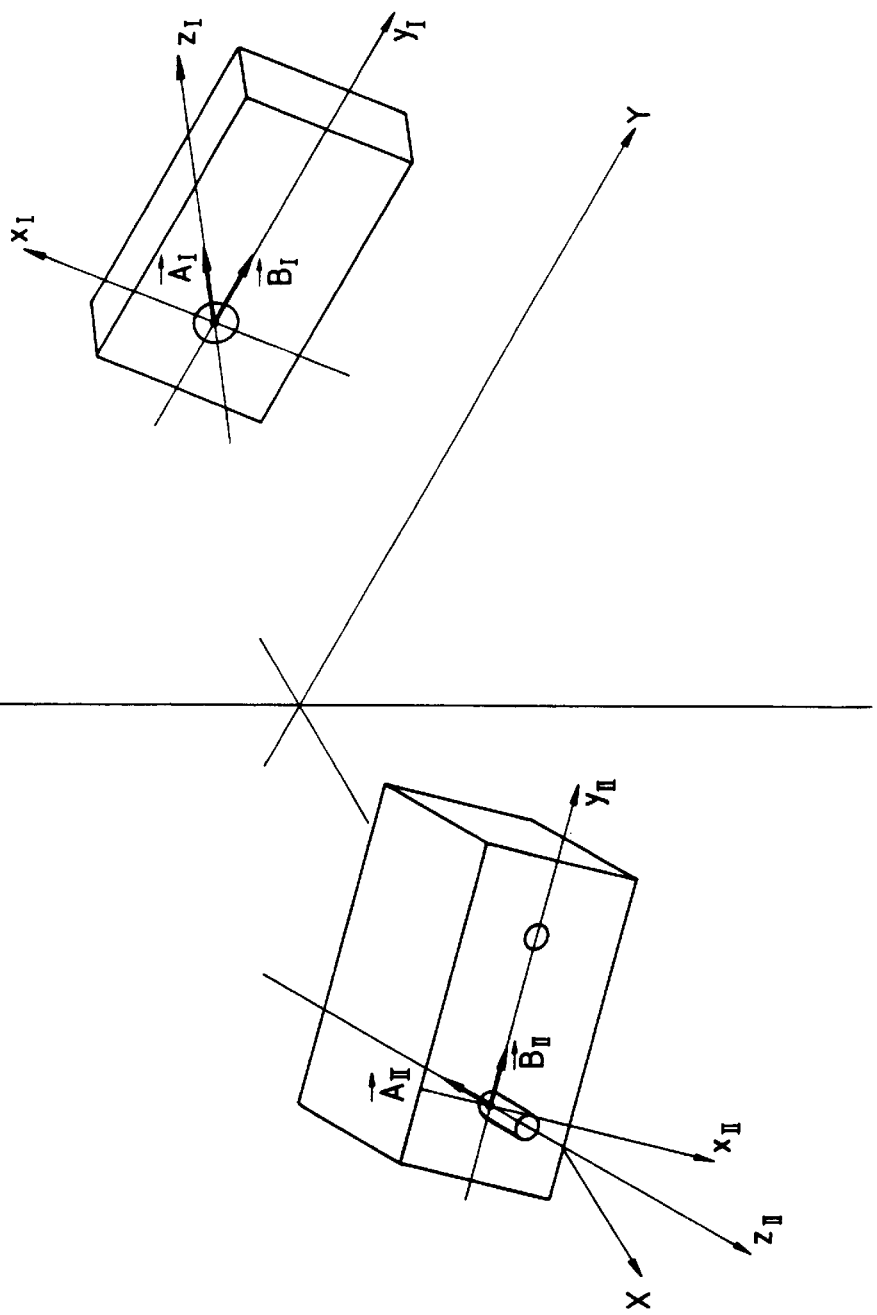

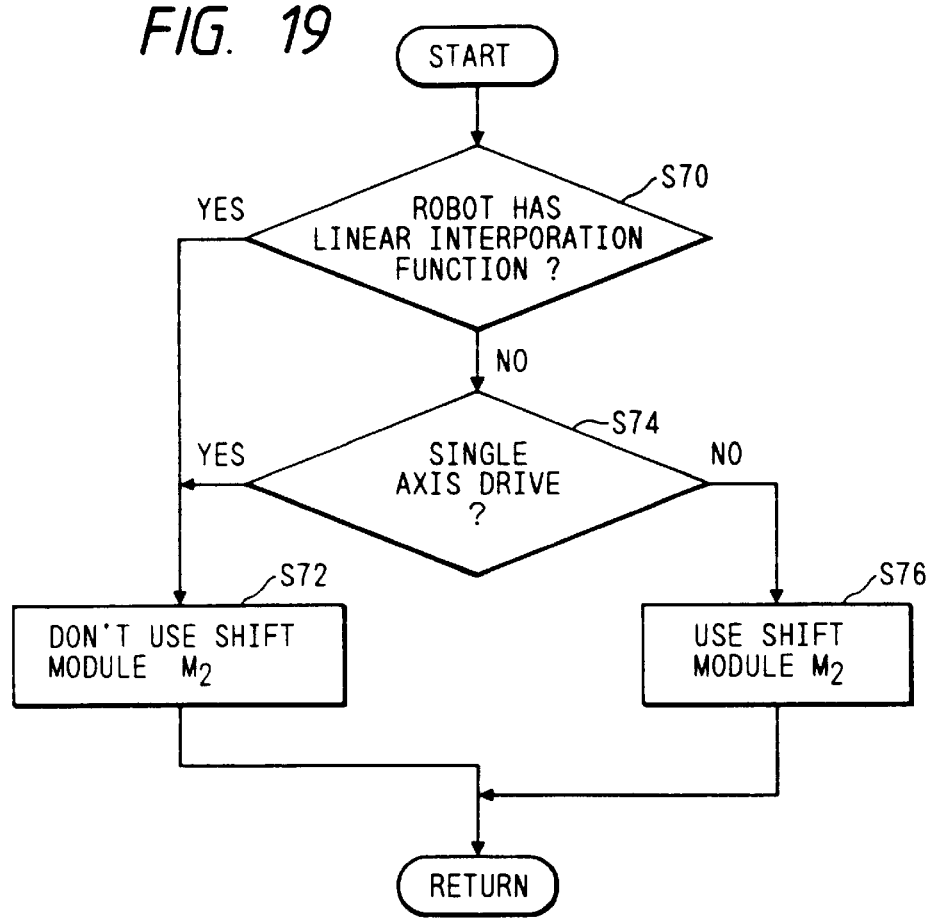
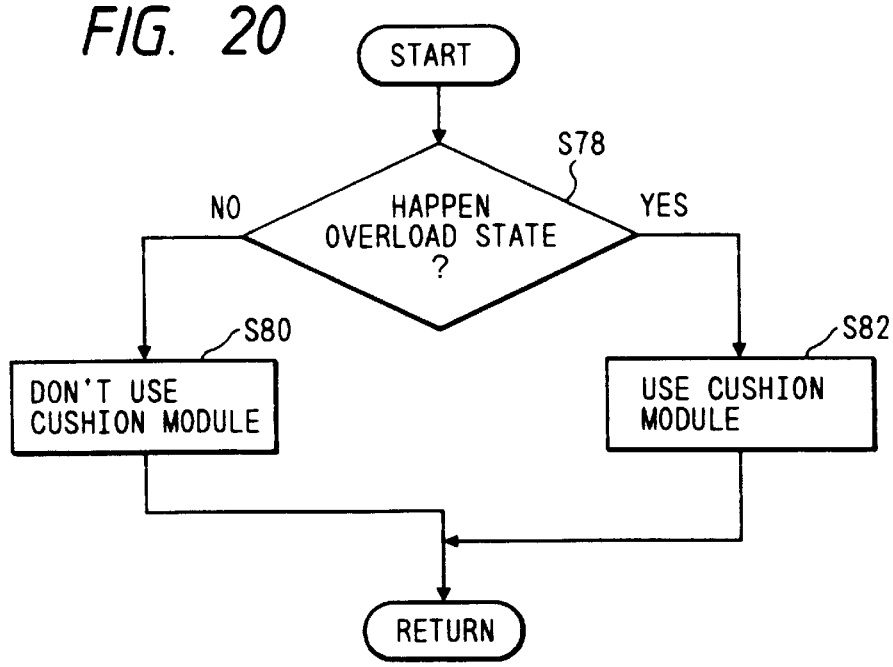

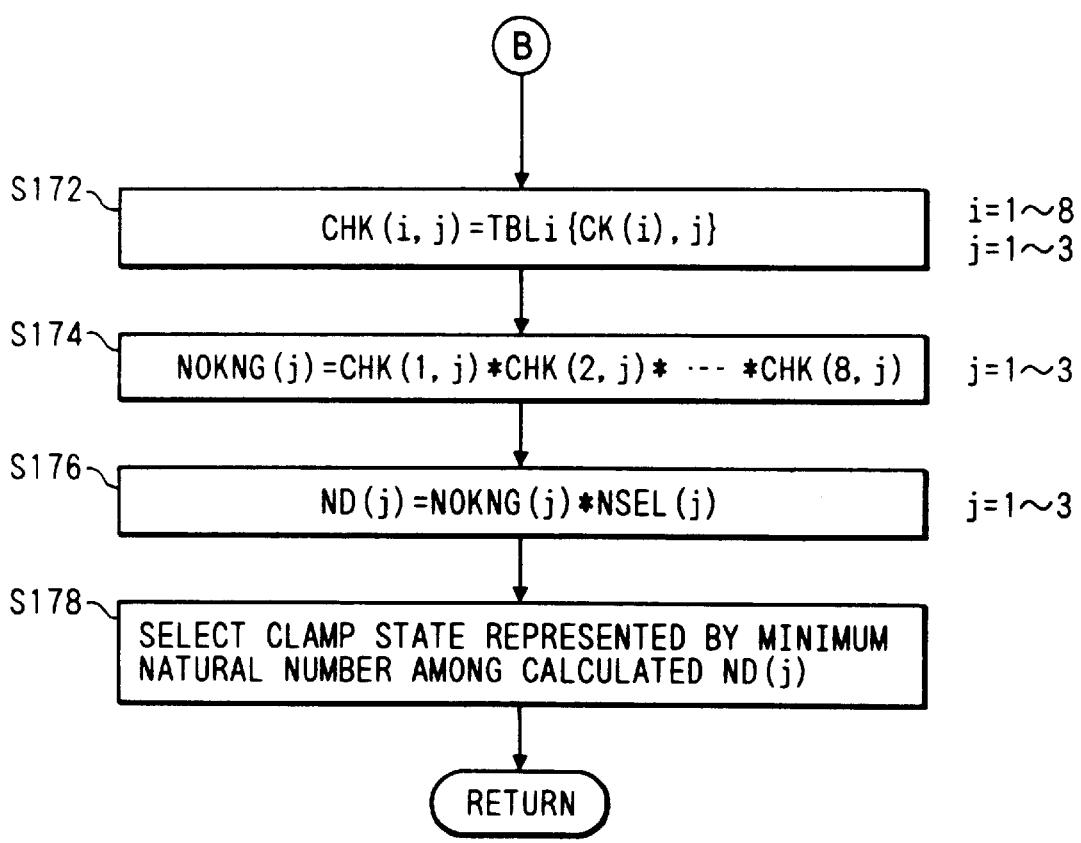

CHECK

| FIG. 25A | FIG. 25B |
|---|---|

CHECK TABLE CHK (i, j)

| | | | | SIDE CLAMP | SCOOP CLAMP | VACUUM |
|---|---|---|---|---|---|---|
| RIGIDITY | MATERIAL RIGIDITY | | OK | 1 | 1 | 1 |
| | SHAPE RIGIDITY | 1 | OK | 1 | 1 | 1 |
| | | 2 | NG | 0 | 1 | 1 |
| CLAMP SURFACE | SIDE CLAMP SURFACE | | OK | 1 | 1 | 1 |
| | SCOOP CLAMP SURFACE | | OK | 1 | 1 | 1 |
| | VACUUM SURFACE | | OK | 1 | 1 | 1 |
| CLAMPING FORCE | SIDE CLAMP FORCE | | NG | 0 | 1 | 1 |
| | VACUUM FORCE | | OK | 1 | 1 | 1 |
| | NOKNG (j) | | | 0 | 1 | 1 |
| | NSEL (j) | | | 1 | 2 | 3 |
| | ND (j) | | | 0 | 2 | 3 |
| | RESULT | | | | SELECTION | |

OK TABLE TBL (1, j)

| | | | SIDE CLAMP | SCOOP CLAMP | VACUUM |
|---|---|---|---|---|---|
| RIGIDITY | MATERIAL RIGIDITY | | 1 | 1 | 1 |
| | SHAPE RIGIDITY | 1 | 1 | 1 | 1 |
| | | 2 | 1 | 1 | 1 |
| CLAMP SURFACE | SIDE CLAMP SURFACE | | 1 | 1 | 1 |
| | SCOOP CLAMP SURFACE | | 1 | 1 | 1 |
| | VACUUM SURFACE | | 1 | 1 | 1 |
| CLAMPING FORCE | SIDE CLAMP FORCE | | 1 | 1 | 1 |
| | VACUUM FORCE | | 1 | 1 | 1 |

NG TABLE TBL (2, j)

| | | | SIDE CLAMP | SCOOP CLAMP | VACUUM |
|---|---|---|---|---|---|
| RIGIDITY | MATERIAL RIGIDITY | | 0 | 0 | 1 |
| | SHAPE RIGIDITY | 1 | 0 | 0 | 1 |
| | | 2 | 0 | 1 | 1 |
| CLAMP SURFACE | SIDE CLAMP SURFACE | | 0 | 1 | 1 |
| | SCOOP CLAMP SURFACE | | 1 | 0 | 1 |
| | VACUUM SURFACE | | 1 | 1 | 0 |
| CLAMPING FORCE | SIDE CLAMP FORCE | | 0 | 1 | 1 |
| | VACUUM FORCE | | 1 | 1 | 0 |

FROM FIG. 25A

FIG. 28

|  |  |  | UPPER SURFACE | | | LOWER SURFACE | | |
|---|---|---|---|---|---|---|---|---|
|  |  |  | S | M | L | S | M | L |
| COMPLIANCE M₅ | | S | ◎ | | | ◎ | | |
| | | M | | ◎ | | | ◎ | |
| | | L | | | ◎ | | | ◎ |
| CUSHION M₄ | | S | ◎ | | | ◎ | | |
| | | M | | ◎ | | ◎ | ◎ | |
| | | L | | | ◎ | | ◎ | ◎ |
| SHIFT M₂ | | S | ◎ | | | ◎ | | |
| | | M | | ◎ | | ◎ | ◎ | |
| | | L | | | ◎ | | ◎ | ◎ |
| REVERSING M₁ | | S | ◎ | | | ◎ | | |
| | | M | | ◎ | | | ◎ | |
| | | L | | | ◎ | | ◎ | ◎ |
| ROTATION M₃ | | S | ◎ | | | ◎ | | |
| | | M | | ◎ | | ◎ | ◎ | |
| | | L | | | ◎ | | ◎ | ◎ |
| FINGER M₆ | M6A M6E M6F | S | ◎ | | | | | |
| | | M | | ◎ | | | | |
| | | L | | | ◎ | | | |
| | M6B M6C M6D | S | ◎ | | | | | |
| | | M | | ◎ | | | | |
| | | L | | | ◎ | | | |

ROBOT HAND STRUCTURE, AND METHOD OF SELECTING HAND STRUCTURE

This application is a division of application Ser. No. 07/809,258, filed Dec. 18, 1991, now abandoned which is a continuation-in-part of application Ser. No. 07/527,816, filed May 24, 1990, now abandoned.

BACKGROUND OF THE INVENTION

1. Field of the Invention

The present invention relates to a hand structure of a robot, which is interposed between a finger unit and an arm unit of a robot and causes the finger unit to perform a predetermined position conversion operation.

2. Related Background Art

A conventional hand structure of a robot, which is interposed between a finger unit and an arm unit of the robot, causes the finger unit to perform a predetermined position conversion operation in an arbitrary combination of elementary operations such as a reversing operation, a shift operation, a rotational operation, a cushion operation, and a compliance operation.

However, the conventional hand structure adopts an arrangement that one hand structure causes the finger unit to perform one unique position conversion operation. Therefore, when the finger unit must perform another position conversion operation, the hand structure must be redesigned accordingly, and must be replaced as a whole.

When an identical pin is inserted in an identical hole, the hand structure must be independently designed and manufactured for a case wherein this hole is formed in a horizontal surface and for a case wherein this hole is formed in an inclined surface although the finger unit can have the same arrangement.

In this manner, in the conventional hand structure, every time the position conversion operation of the finger unit is changed, the hand structure must be redesigned, and must be manufactured to have an arrangement suitable for the corresponding position conversion operation. As a result, when the position conversion operation is changed, a long time is required for changing the design. In addition, position conversion operations cannot be commonly performed, thus posing a problem in terms of economy.

SUMMARY OF THE INVENTION

The present invention has been made in consideration of the above situation, and has as its first object to provide a hand structure of a robot, which can easily change a position conversion operation of a finger unit within a short period of time, and can solve a problem in terms of economy.

The above object can be achieved by arbitrarily combining modules for performing elementary operations as the hand structure. However, if a method of selecting the modules for the arbitrary combination is not established, an arbitrary work cannot be assembled using this hand structure. Thus, a demand has arisen for establishment of this selection method.

The present invention has been made in consideration of the above situation, and has as its second object to provide a method of selecting a hand structure of a robot, which can select an optimal combination of modules for performing a plurality of elementary operations, so that an arbitrary work is clamped and assembled.

It is a third object of the present invention to provide a method of selecting a hand structure, comprising the first step of judging a position of a first work located at a work pickup position, and a storing position of the first work with respect to a second work located at a place position, the second step of judging, based on the result of judgement in the first step, whether or not a rotation module and a reversing module are necessary, and the third step of selecting types of finger modules for clamping the first work according to a category inherent to the first work.

The method of selecting a hand structure of a robot according to the present invention further comprises the fourth step of judging the presence/absence of a linear interpolation function in the robot, and the fifth step of judging necessity of a shift module on the basis of the result of judgement in the fourth step.

The method of selecting a hand structure of a robot further comprises the sixth step of judging an overload state when the first work is attached to the second work, and the seventh step of judging necessity of a cushion module on the basis of the result of judgement in the sixth step.

It is a fourth object of the present invention to provide a method of selecting a vacuum finger for chucking a work, and a clamping finger for clamping a work, comprising the first step of judging rigidity of the work, the second step of judging the thickness of the work, the third step of judging a dimensional ratio of the work, and the fourth step of selecting, in accordance with the result of judgement in the first to third steps, whether the work is held by clamping or vacuum suction.

In the method of selecting a hand structure of a robot, it is selected in principle in the fourth step that the work is held by clamping, and when the work cannot be held by clamping, it is selected to hold the work by vacuum suction.

In the method of selecting a hand structure of a robot, the clamping fingers are classified into two types of fingers, i.e., a side-clamping finger and a scoop-clamping finger, and the side-clamping finger is selected in principle in the fourth step. When the side-clamping finger cannot be employed, the scoop-clamping finger is selected.

It is a fifth object of the present invention to provide a method of selecting a hand structure which comprises independent modules for performing elementary operations, i.e., a rotational operation, a reversing operation, a shift operation, a cushion operation, a compliance operation, and a work clamping operation to be combined with each other in order to assemble at least two works in a robot, comprising the first step of judging a position of a first work at a pickup position and a storing position of the first work with respect to a second work located at a place position, the second step of judging necessity of the rotation and reversing modules on the basis of results of judgement in the first step, and the third step of selecting a type of a finger module for selecting the first work in accordance with a category inherent to the first work.

The method of selecting a hand structure of a robot according to the present invention further comprises the fourth step of judging the presence/absence of a linear interpolation function in the robot, and the fifth step of judging necessity of the shift module on the basis of the result of judgement in the fourth step.

The method of selecting a hand structure of a robot further comprises the sixth step of judging an overload state when the first work is attached to the second work, and the seventh step of judging the necessity of the cushion module on the basis of the result of judgement in the sixth step.

It is a sixth object of the present invention to provide a method of selecting a clamping finger for clamping a work from a plurality of types of fingers, comprising the first step of judging a planar shape of the work, and the second step of causing the planar shape of the work judged in the first step to correspond to a map for specifying the type of clamping finger, and selecting an optimal clamping finger from the map. The map comprises an orthogonal coordinate system in which a length of the work is plotted along one axis, and a width of the work is plotted along the other axis, and has a plurality of regions of predetermined ranges each indicating an optimal selection result of the clamping finger while the work is standardized to the planar shape in one quadrature of the orthogonal coordinate system.

In the method of selecting a hand structure of a robot according to the present invention, the map is formed such that when one corner of a work to be clamped is placed on an origin of the orthogonal coordinate system, a region for specifying the type of the clamping finger as the optimal selection result is located at a portion where the other corner opposing the one corner is located.

In the method of selecting a hand structure of a robot according to the present invention, the map is prestored in an external memory means, and is read out from this external memory means in the second step.

BRIEF DESCRIPTION OF THE DRAWINGS

FIGS. 12, 12A and 12B are schematic diagrams of a system arrangement of a finger structure selection system shown in FIG. 11;

FIGS. 16A and 16B are views for explaining angular parameters for uniquely defining extending directions of the storing vector and the basic work vector;

FIGS. 18A, 18B, 18C, 18D, 18E, 18F and 18G are perspective views for 15 explaining different positions when a work is placed and when it is picked up;

FIG. 19 is a flow chart showing in detail a control sequence of judging an insert operation in step S14 shown in FIG. 13 as a subroutine;

FIG. 20 is a flow chart showing in detail a control sequence of judging an overload state in step S13 in FIG. 13 as a subroutine;

FIGS. 23A, 23B and 23C are flow charts showing in detail a control sequence of judging a clamping mode in step S102 in FIG. 22 as subroutines;

FIG. 25, 25A and 25B shows formats of a check table, an OK table, and an NG table used in the control sequence of judging the clamp mode shown in FIG. 22;

FIG. 28 shows a correlation table, used in the control sequence of final check in step S32 in FIG. 13, for determining good combinations of selected modules.

DETAILED DESCRIPTION OF THE PREFERRED EMBODIMENT

An arrangement of an embodiment of a hand structure of a robot according to the present invention will be described in detail below with reference to the accompanying drawings.

[Schematic Arrangement of Hand Structure]

Figure 1:
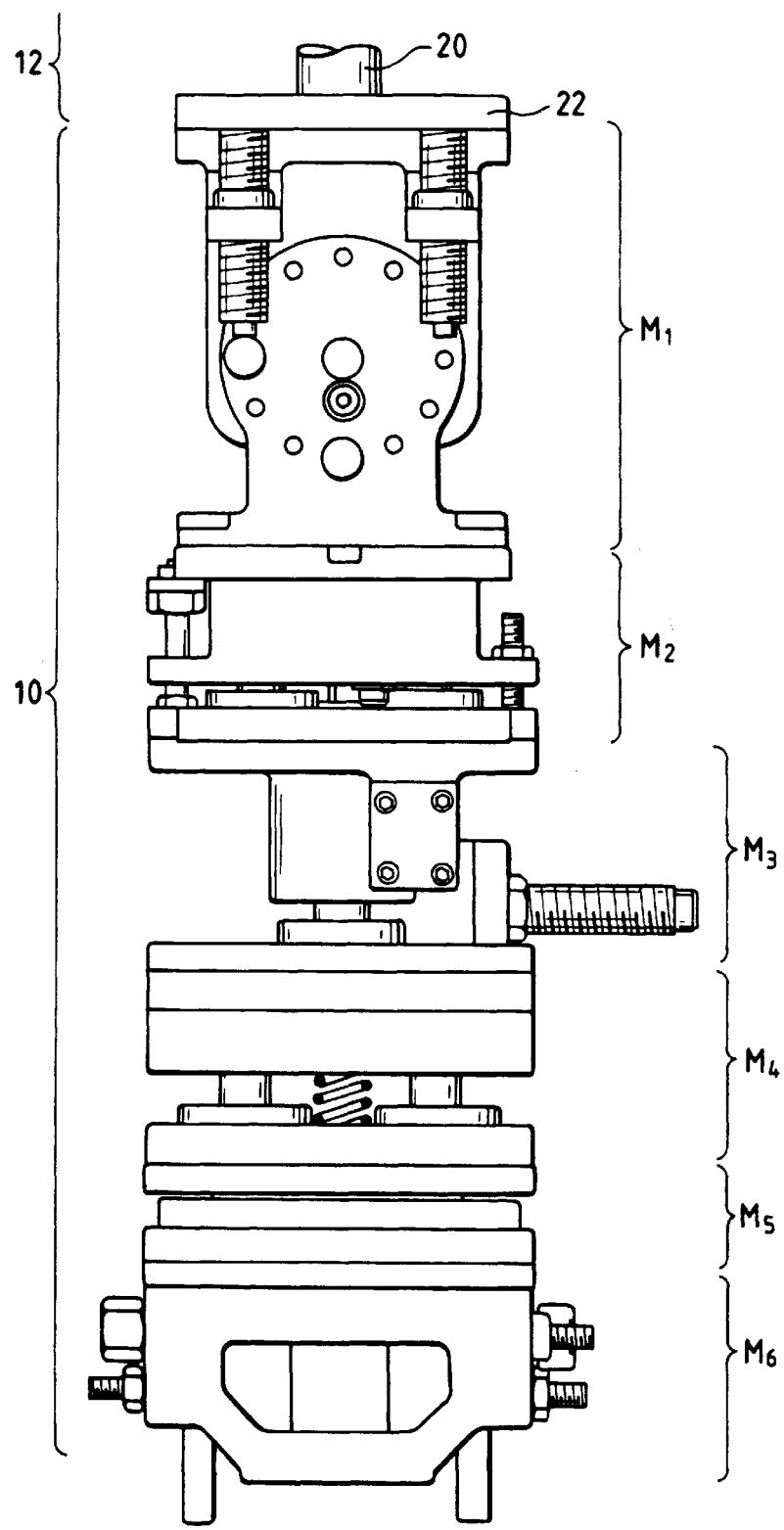
FIG. 1 is a schematic front view of an arrangement of a hand structure to which an embodiment of a method of selecting a hand structure according to the present invention is applied.

As shown in FIG. 1, a hand structure 10 of this embodiment comprises an arbitrary combination of a reversing module $M_1$ for executing a reversing operation, a shift module $M_2$ for executing a shift operation, a rotation module $M_3$ for executing a rotational operation, a cushion module $M_4$ for explaining a cushion operation, a compliance module $M_5$ for executing a compliance operation, and a finger module $M_6$ for executing a clamping operation of a work. In the arrangement of the illustrated embodiment, the six modules $M_1$ to $M_6$ are aligned downward from a Z-arm 20 (to be described later) of a robot 12, to which the hand structure 10 is attached, in the order named.

The above-mentioned reversing operation means a rotational operation about an axis of rotation which is set to be perpendicular to its central axis. The shift operation means a movement along its central axis. The rotational operation means rotation about its central axis. The cushion operation means an operation for absorbing an abnormal force acting along its central axis. The compliance operation means an operation for absorbing a position shift in a direction perpendicular to its central axis. The clamping operation includes holding operations by clamping, scooping, chucking utilizing a negative pressure, attraction by utilizing a magnetic force, and the like.

The finger module $M_6$ is a necessary item of the hand structure 10. Some of the reversing module $M_1$ to the compliance module $M_5$ are selected and combined, and the finger module $M_6$ is attached to the lowermost end of the combination of the selected modules.

A method of selecting a combination of these six modules $M_1$ to $M_6$ for an arbitrary work will be described in detail later. The order of the cushion module $M_4$ for executing the cushion operation and the compliance module $M_5$ for executing the compliance operation can be arbitrarily determined. It is regulated that the shift module $M_2$ must be disposed below the reversing module $M_1$.

[Schematic Arrangement of Robot]

Figure 2A:
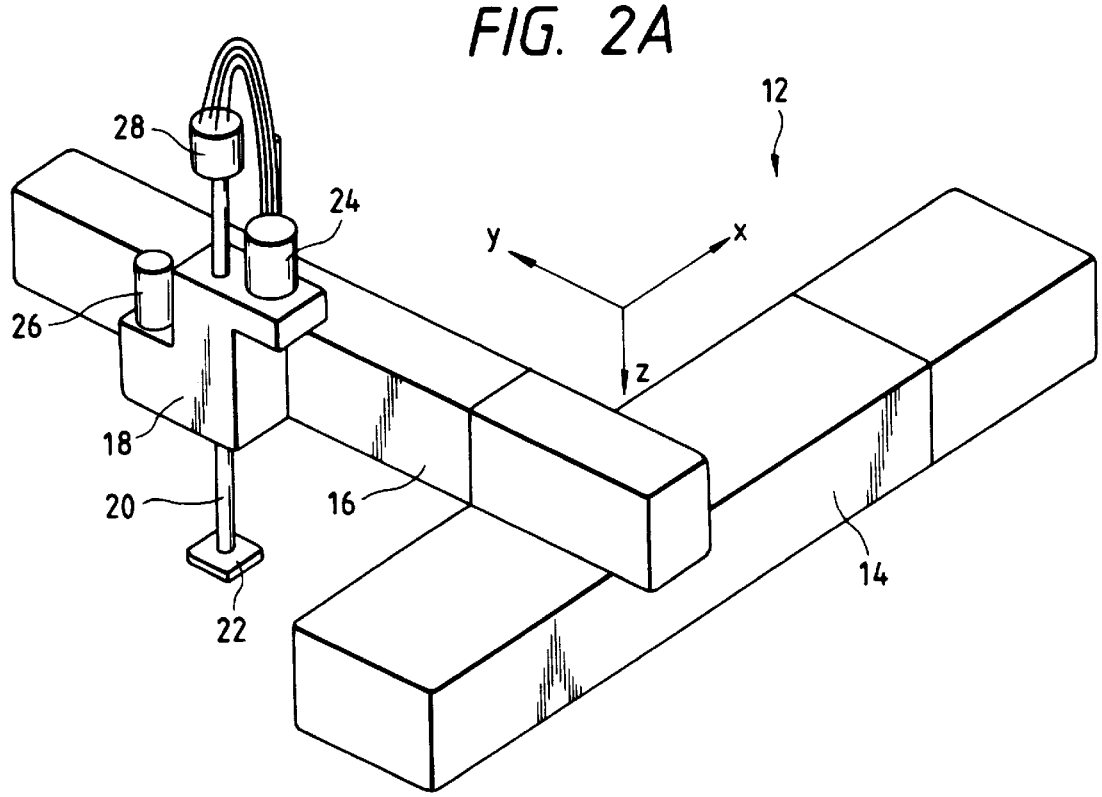
FIG. 2A is a schematic perspective view of an arrangement of a robot to which the hand structure is attached.
Figure 2B:
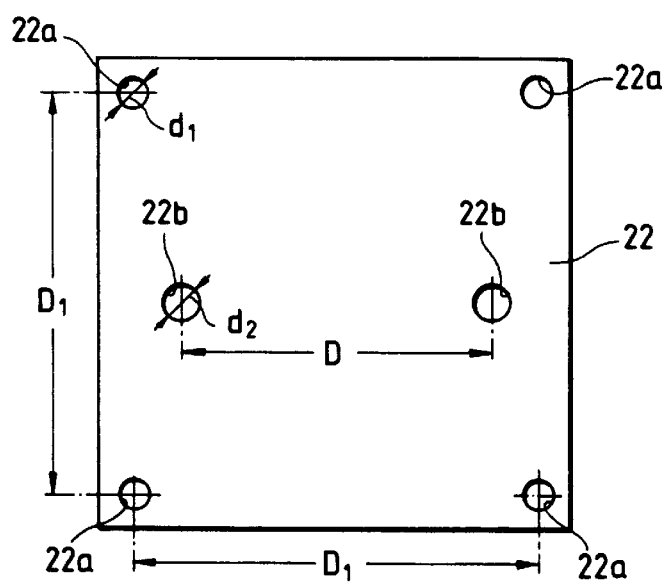
FIG. 2B is a bottom view showing a lower surface shape of a hand mounting plate.

As shown in FIG. 2A, the robot 12 to which the hand structure 10 is applied is constituted by an X-arm 14, a Y-arm 16 which is mounted to be perpendicular to the X-arm 14 and to be movable along an X-axis, a Y-axis moving member 18 which is mounted on the Y-arm 16 to be movable along a Y-axis, and the Z-arm 20 which vertically extends through the Y-axis moving member 18, and is supported to be vertically movable. A hand mounting plate 22 is fixed to the lower end of the Z-arm 20, and the hand structure 10 described above is attached to the hand mounting plate 22. In this embodiment, when the Z-arm 20 is moved not to be parallel to the X- or Y-axis on the X-Y plane, the robot 12 has a function of performing linear interpolation.

Mounting through holes 22a for mounting the hand structure 10 are formed in the four corners of the hand mounting plate 22 to extend through the plate vertically. The diameters and pitches of these through holes 22a are respectively set to be a constant value $d_1$ and a distance $D_1$. A pair of positioning pins 22b extend downward from the lower surface of the hand mounting plate 22 in order to precisely define the mounting positions of the modules $M_1$ to $M_5$ attached thereto. The pair of positioning pins 22b have a predetermined diameter $d_2$ and are separated by a predetermined distance $D_2$.

The Y-arm 16, the Y-axis moving member 18, and the Z-arm 20 are respectively moved by three driving motors 24, 26, and 28 provided to the Y-axis moving member 18.

[Description of Modules]

The arrangements of the modules $M_1$ to $M_6$ will be described hereinafter.

(Finger Module $M_6$)

The finger module $M_6$, attached to the lowermost portion of the hand structure 10, for clamping a work comprises six different modules, i.e., first to sixth finger modules $M_{6A}$, $M_{6B}$, $M_{6C}$, $M_{6D}$, $M_{6E}$, and $M_{6F}$, as shown in FIGS. 3A to 3F.

The first to fourth finger modules $M_{6A}$ to $M_{6D}$ are arranged to mechanically clamp a work. The fifth and sixth finger modules $M_{6E}$ and $M_{6F}$ are arranged to clamp a work by vacuum suction. Note that clampers of the first to fourth finger modules $M_{6A}$ to $M_{6D}$ which are arranged to mechanically clamp a work can be roughly classified into two types of clampers, i.e., a so-called side-clamping clamper which clamps two sides of a work and lifts it, and a so-called scoop-clamping clamper which is engaged with the lower surface of a work to lift it.

In this manner, of the finger modules $M_6$ which are arranged to mechanically clamp a work, a total of four different clamping modes are available, and a total of two different dampers are available for each clamping mode. As a result, an optimal module for a work to be mechanically clamped can be selected from a total of eight types.

Figure 3A:
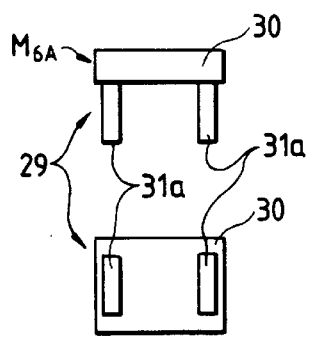
FIGS. 3A, 3B, 3C, 3D, 3E and 3F are schematic front views respectively showing arrangements of first to fifth finger modules.

As shown in FIG. 3A, the first finger module $M_{6A}$ is constituted by a so-called double-type finger structure 29 itself which mainly comprises a frame member 30, and a pair of dampers 31a and 31b which are disposed on the frame member 30 to approach/separate from each other. More specifically, the first finger module $M_{6A}$ is optimal for clamping a relatively small work. Note that the arrangement of the double-type finger structure will be described in detail later with reference to FIGS. 4A to 4E.

Figure 3B:
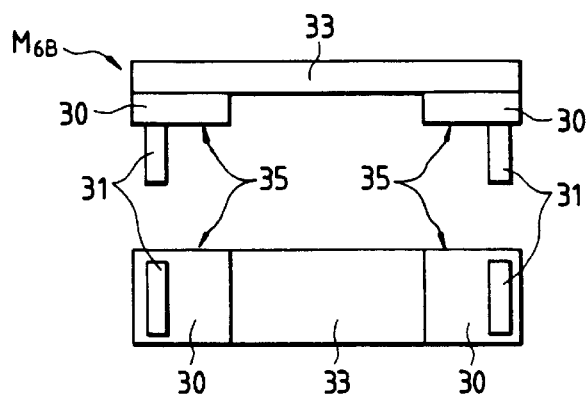

As shown in FIG. 3B, the second finger module $M_{6B}$ is constituted by a mounting member 33 as an elongated plate, and so-called single-type finger structures 35 attached to the two ends of the mounting member 33. Each single-type finger structure 35 mainly comprises the above-mentioned frame member 30, and a single damper 31 disposed on the frame member 30 to be movable in one direction. More specifically, the length of the mounting member 33 can be arbitrarily set, so that a clamping length of a work to be clamped can be desirably set, in other words, a work having a large clamping length can be reliably clamped. Note that the arrangement of the single-type finger structure 35 will be described in detail later with reference to FIGS. 4F to 4I.

The third finger module $M_{6C}$ is mainly constituted by the above-mentioned mounting member 33 and the double-type finger structures 29 attached to the two ends of the mounting member 33. In the third finger module $M_{6C}$, the clamping direction of the pair of clampers 31a and 31b in each double-type finger structure 29 is set to be perpendicular to the longitudinal direction of the mounting member 33. More specifically, the third finger module $M_{6C}$ is designed so that an elongated work can be clamped, in other words, a work whose longitudinal direction cannot be a clamping direction can be clamped.

The fourth finger module $M_{6D}$ is mainly constituted by the above-mentioned mounting member 33, and the single-type finger structures 35 attached to the four corners of the mounting member 33. In the fourth finger module $M_{6D}$, the moving direction of each clamper 31 of each single-type finger structure 35 is set to coincide with the longitudinal direction of the mounting member 33. More specifically, the fourth finger module $M_{6D}$ is set so that a work which is too large to be clamped by a pair of clampers can be clamped, in other words, a work which cannot be lifted unless it is clamped at four corners can be clamped.

Figure 3C:
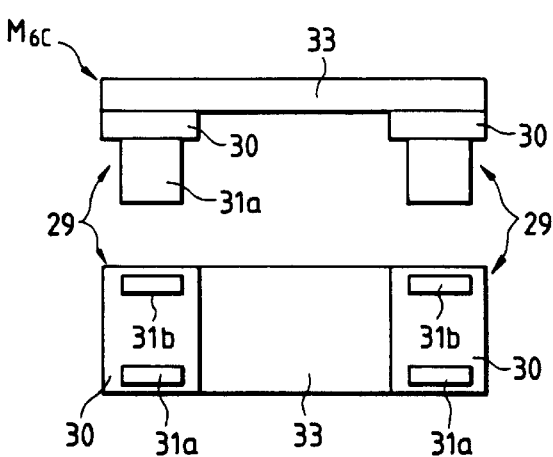
Figure 3D:
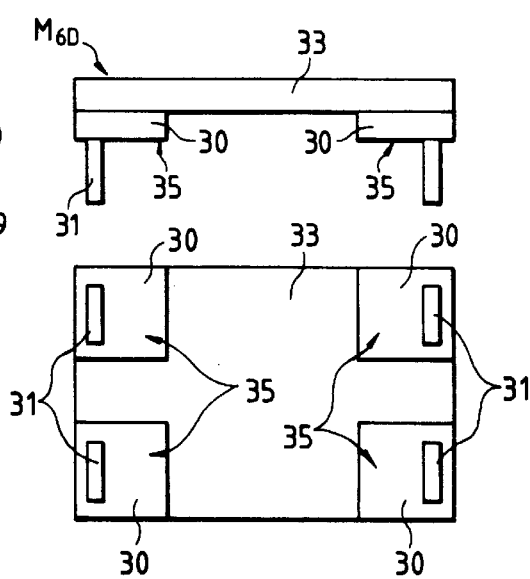
Figure 3E:
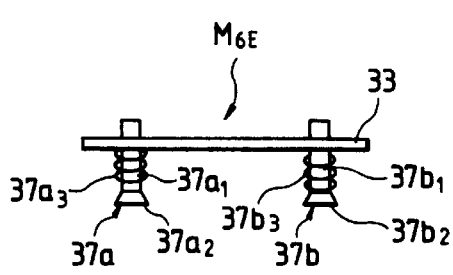

As shown in FIG. 3E, the fifth finger module $M_{6E}$ is mainly constituted by the above-mentioned mounting member 33, and a pair of vacuum pipes 37a and 37B which are attached to the two ends of the mounting member 33 and are vertically movably supported independently of each other. More specifically, the vacuum pipes 37a and 37b are constituted by pipe bodies $37a_1$, and $37b_1$, which are vertically movably supported on the mounting member 33, vacuum pads $37a_2$ and $37b_2$ attached to the lower ends of the pipe bodies $37a_1$, and $37b_1$, respectively, and coil springs $37a_3$ and $37b_3$ wound around the pipe bodies $37a_1$, and $37b_1$ to bias them downward. More specifically, the fifth finger module $M_{6E}$ can optimally clamp an upper surface of a work which is considerably inclined by vacuum suction.

Figure 3F:
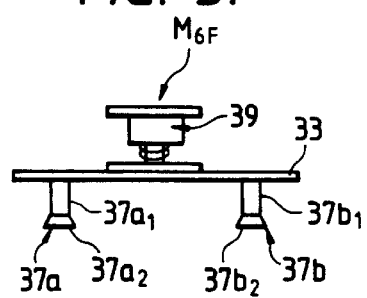

As shown in FIG. 3F, the sixth finger module $M_{6F}$ is mainly constituted by the above-mentioned mounting member 33, the pair of vacuum pipes 37a and 37b which are stationarily mounted at two ends of the mounting member, and a pivoting portion 39 for pivotally supporting the mounting member 33. More specifically, the vacuum pipes 37a and 37b are constituted by pipe bodies $37a_1$ and $37b_1$, which are stationarily fixed on the lower surface of the mounting member 33, and vacuum pads $37a_2$ and $37b_2$ attached to the lower ends of the pipe bodies $37a_1$ and $37b_1$, respectively. The pivoting portion 39 is set to be pivotally moved with respect to any one of other modules $M_1$ to $M_5$ or the mounting plate 22 to which this module is attached. The sixth finger module $M_{6F}$ can optimally clamp the upper surface of a work which is relatively moderately inclined by vacuum suction.

{Double-Type Finger Structure 29}

Figure 6A:
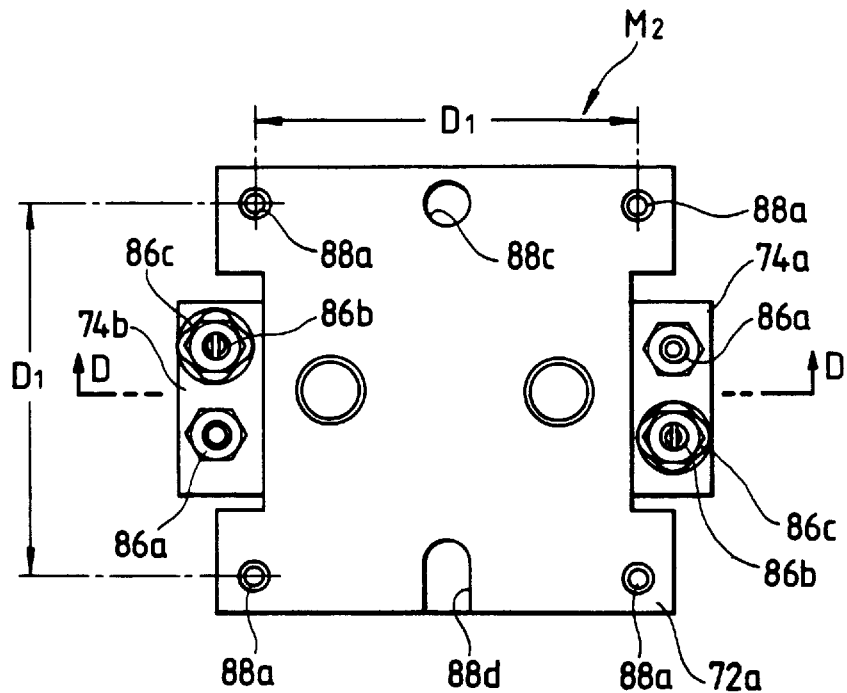
FIGS. 6A, 6B and 6C are respectively a plan view and bottom views showing in detail a shift module shown in FIG. 1.
Figure 6B:
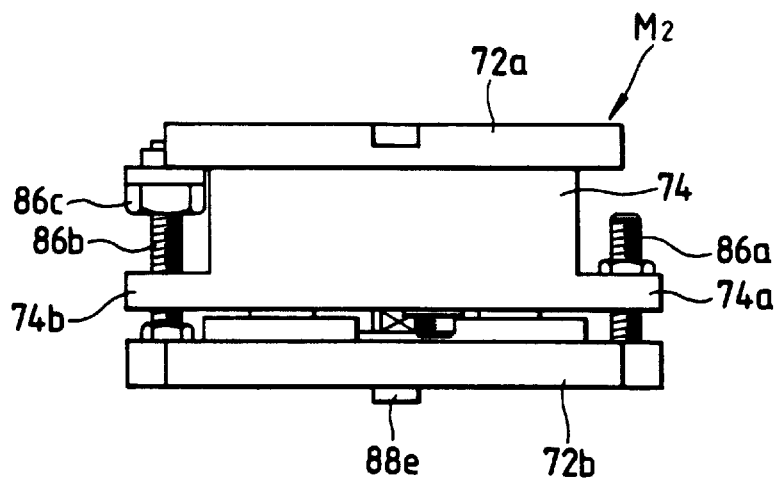
Figure 6C:
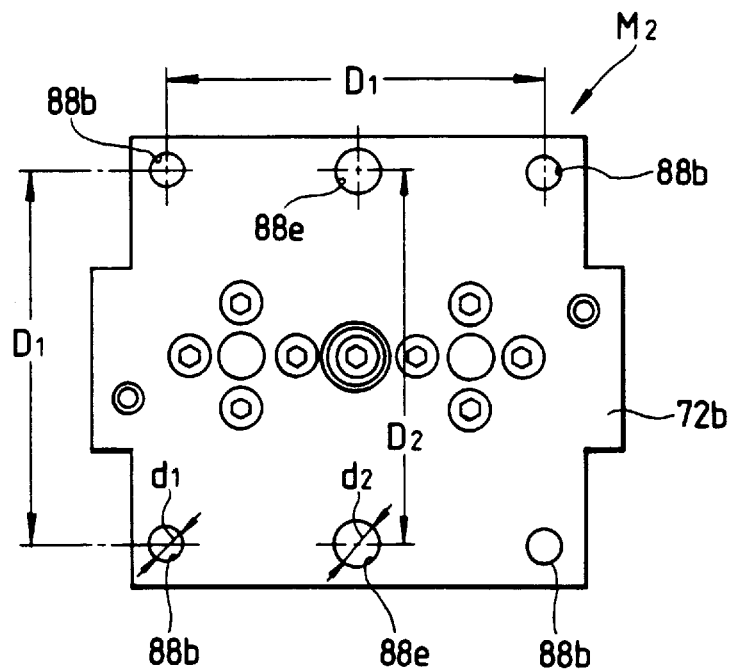

The double-type finger structure 29 which defines the first finger module $M_{6A}$ itself shown in FIG. 3A or is attached to the end portion of the third finger module $M_{6C}$ shown in FIG. 6C has a detailed arrangement, as shown in FIGS. 4A to 4E.

More specifically, the double-type finger structure 29 is driven by a pneumatic pressure, i.e., working compression air. As shown in FIGS. 4A to 4E, the finger structure 29 comprises the frame member 30 having upper and lower open surfaces and having a square shape when viewed from a front side. As can be seen from FIG. 4E, a pair of parallel guide shafts 32a and 32b which are parallel to each other in a horizontal plane are mounted in the frame member 30. A pair of slide members 34a and 34b are slidably supported through slide bushings $36a_1$; $36a_2$, and $36b_1$ and $36b_2$, respectively, while being guided by these guide shafts 32a and 32b.

Mounting segments 38a and 38b which project downward are integrally formed on the lower surfaces of the outer ends of the slide members 34a and 34b, respectively. Mounting segments 38a and 38b to which dampers (not shown) are respectively attached project downward. The shapes of these clampers can be arbitrarily changed according to a shape of a work to be clamped. The slide members 34a and 34b are biased in a direction to be separated from each other by a coil spring 40 shown in FIG. 4E.

Figure 4A:
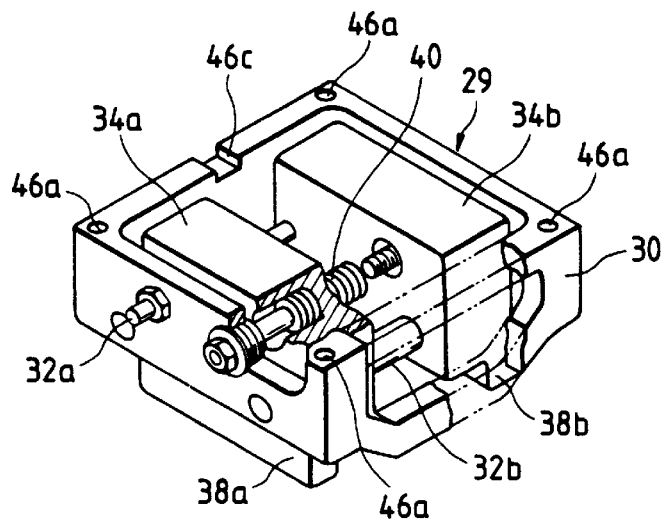
FIG. 4A is a partially cutaway perspective view of an arrangement of a double-jaw type finger structure shown in FIG. 3A.
Figure 4B:
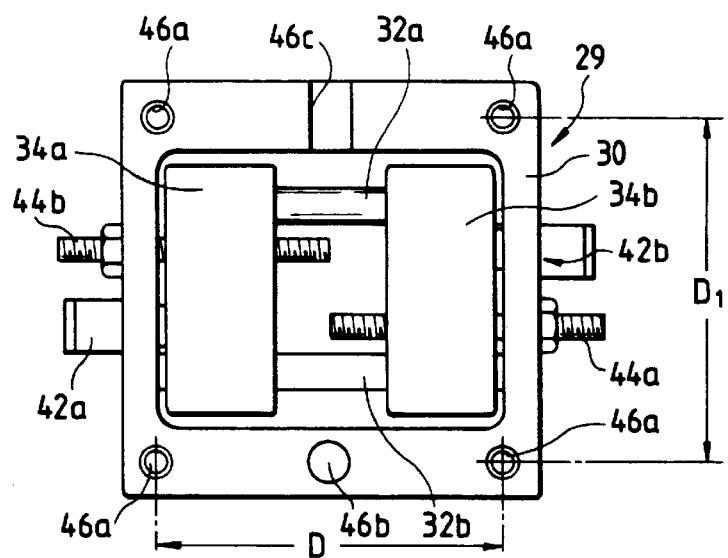
FIGS. 4B and 4C are respectively a plan view and a front view of a finger unit shown in FIG. 2.
Figure 4C:
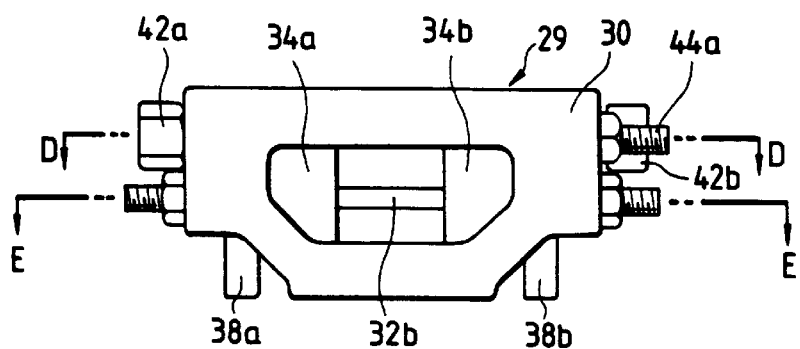
Figure 4D:
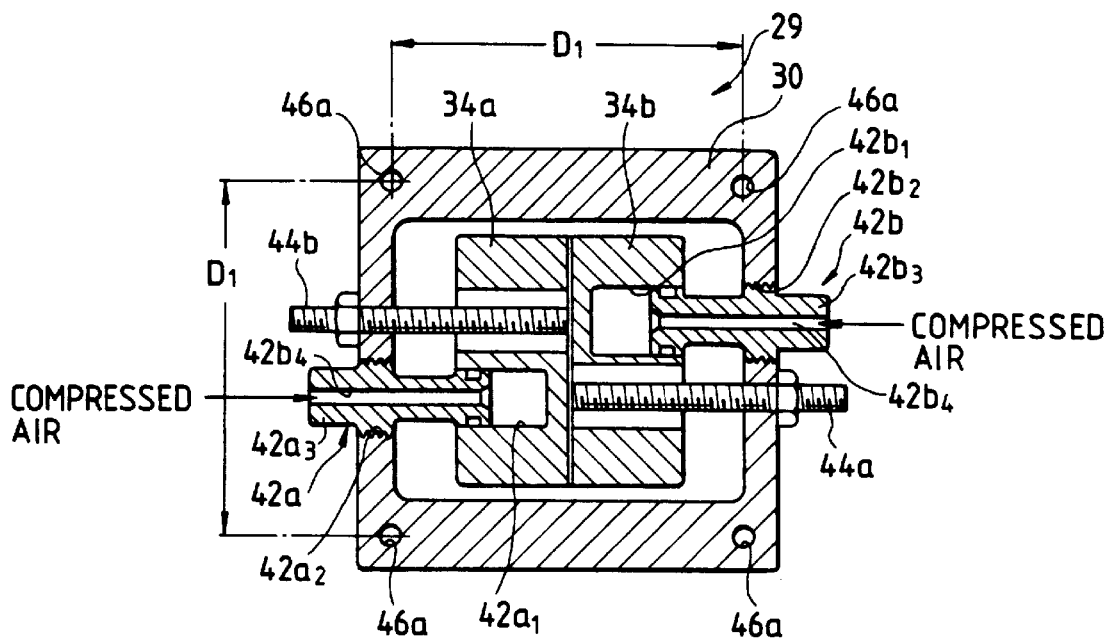
FIGS. 4D and 4E are sectional plan views taken along lines D—D and E—E in FIG. 4C, respectively.
Figure 4E:
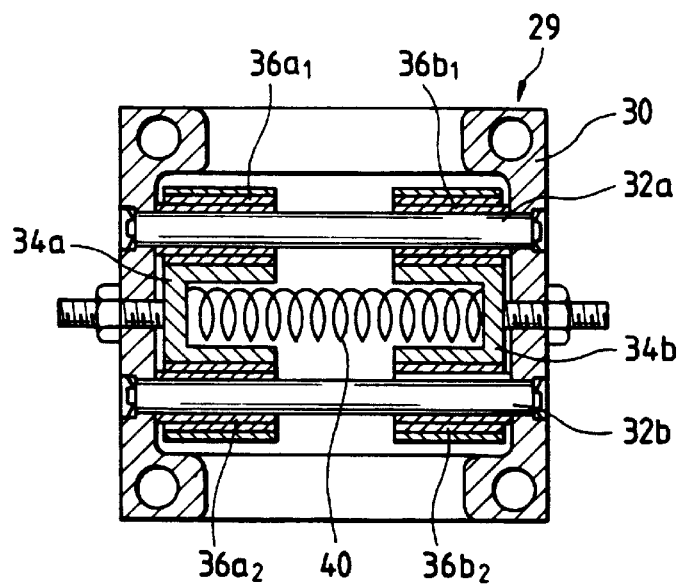

Pneumatic cylinder structures 42a and 42b which do not oppose each other in a horizontal plane are disposed to slide these slide members 34a and 34b to approach each other against the biasing force of the coil spring 40, as shown in FIG. 4D.

The pneumatic cylinder structures 42a and 42b comprise cylinder chambers $42a_1$ and $42b_1$, which are formed to be open to the rear surfaces of the corresponding slide members 34a and 34b, and piston bodies $42a_3$ and $42b_3$ which are fixed to extend into through holes $42a_2$ and $42b_2$ formed in the frame member 30, and whose distal ends are fitted in the corresponding cylinder chambers $42a_1$ and $42b_1$. Compression air introduction paths $42a_4$ and $42b_4$ are formed in the piston bodies $42a_3$ and $42b_3$ to extend in the axial direction, respectively.

As can be seen from FIG. 4D, stopper members 44a and 44b are mounted on the pneumatic cylinder structures 42b and 42a at opposing positions in the horizontal plane to extend through the slide members 34b and 34a, respectively. These stopper members 44a and 44b are threadably engaged to be reciprocal with the frame member 30, so that they are brought into contact with the inner surfaces of the corresponding slide members 34a and 34b to adjustably define the respective slide amounts.

Since the double-type finger structure 29 has the above-mentioned arrangement, the slide members 34a and 34b are biased to be separated from each other in a state wherein no working compression air is introduced into the two pneumatic cylinder structures 42a and 42b, as shown in FIG. 4B. As a result, the dampers (not shown) attached to the mounting segments 38a and 38b are separated by a maximum distance.

When the working compression air is introduced into the two pneumatic cylinder structures 42a and 42b, it is guided to the cylinder chambers $42a_1$ and $42b_1$ via the corresponding compression air introduction paths $42a_4$ and $42b_4$. As a result, the slide members 34a and 34b in which the cylinder chambers $42a_1$ and $42b_1$ are formed are biased in a direction to approach each other against the biasing force of the coil spring 40. As a result, a work located between the two dampers is clamped by the approaching clampers.

These clampers are inhibited from approaching by a distance shorter than a minimum distance predetermined by the stopper members 44a and 44b.

Mounting screw holes 46a are formed in the four corners of the upper surface of the frame member 30. The holes 46a have the predetermined diameter $d_1$, and are separated at the predetermined pitch $D_1$. The diameter $d_1$ and the pitch $D_1$ are common to the six modules $M_1$ to $M_6$, and the mounting plate 22. A positioning hole 46b and a positioning groove 46c which receive the pair of positioning pins formed on the bottom surface of each of the modules $M_1$ to $M_5$ and the mounting plate 22 to have the common diameter $d_2$ and to be separated by the common distance $D_2$ are formed in the central portions of the opposing two sides of the upper surface of the frame member 30.

Since the positioning hole 46b and the positioning groove 46c are set common to the modules $M_1$ to $M_6$ and the hand 46c are set common to the modules $M_1$ to $M_6$ and the hand mounting plate 22, as described above, the first finger module $M_{6A}$ can be mounted on any of the modules $M_1$ to $M_5$ and the mounting plate 22 in an identical state.

For example, when the first finger module $M_{6A}$ directly constituted by the double-type finger structure 29 is directly mounted on the hand mounting plate 22, a threaded portion formed on the lower end of a mounting screw (not shown) inserted downward through the mounting through hole 22a of the hand mounting plate 22 is screwed in the mounting screw hole 46a.

{Single-type Finger Structure 35}

The single-type finger structure 35 mounted on each end portion of the mounting member 33 in the second finger module $M_{6B}$ shown in FIG. 3B has a detailed arrangement, as shown in FIGS. 4F to 4I.

The single-type finger structure 35 comprises the same frame member 30 as that of the double-type finger structure 29 described above, as shown in FIG. 4F, and is driven by a pneumatic pressure, i.e., working compression air as in the double-type finger structure 29.

Figure 4F:
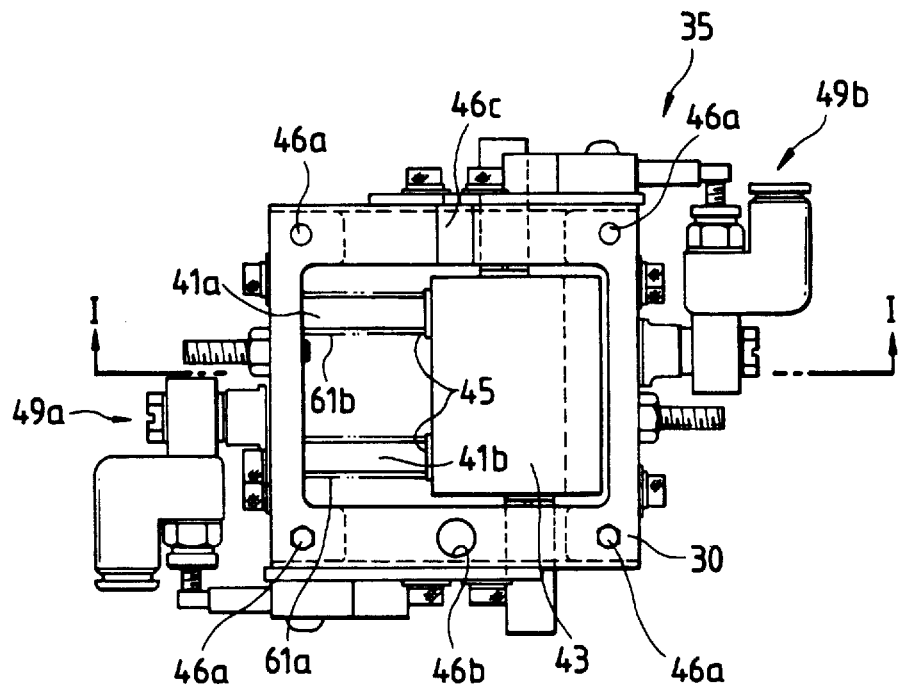
FIGS. 4F and 4G are respectively a plan view and a front view showing an arrangement of a single-jaw type finger structure shown in FIG. 3B.

A pair of guide shafts 41a and 41b which are parallel in a horizontal plane are mounted in the frame member 30, as shown in FIG. 4F. One slide member 43 is slidably supported through slide bushings 45 while being guided on the pair of guide shafts 41a and 41b.

Figure 4G:
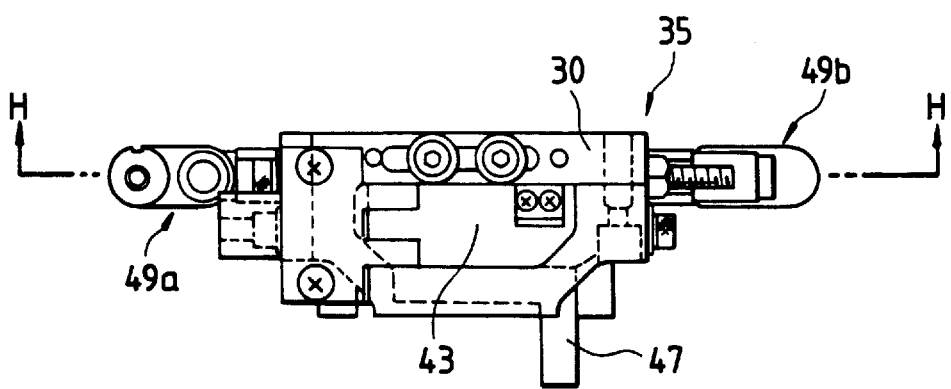
Figure 4H:
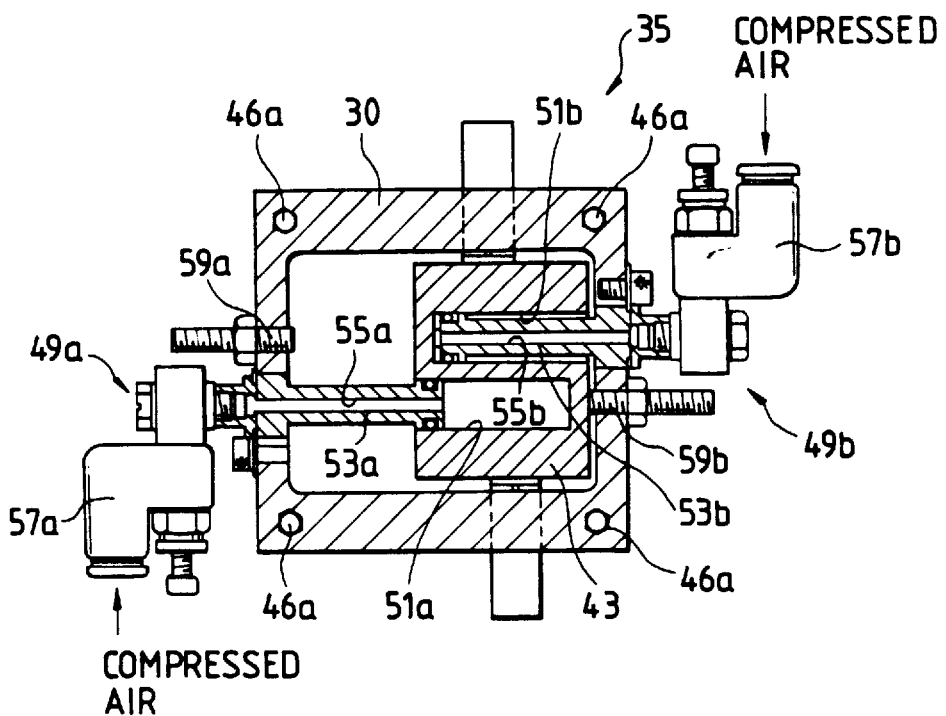
FIGS. 4H and 4I are a sectional plan view and a longitudinal sectional view taken along lines H—H and I—I in FIG. 4G.
Figure 4I:
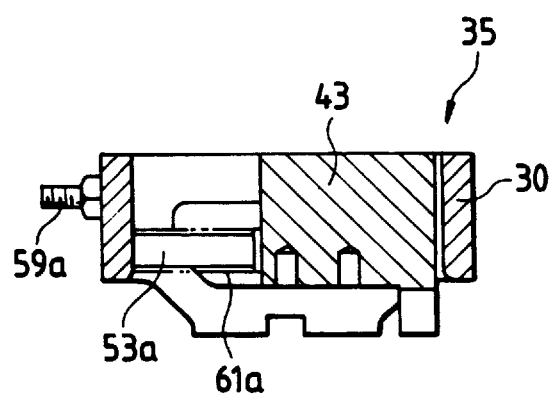

As shown in FIGS. 4G and 4I, a mounting segment 47 to which only one clamper (not shown) is mounted is integrally arranged on the lower surface of the slide member 43. In order to slidably move this slide member 43, a pair of pneumatic cylinder structures 49a and 49b are disposed so as not to oppose each other in the single horizontal plane.

The left pneumatic cylinder structure 49a located at the left side in FIG. 4H comprises a left cylinder chamber 51a in the slide member 43. The left cylinder chamber 51a extends along the slide direction of the slide member 43 at a level higher than the pair of guide shafts 41a and 41b, and is open to the left side surface of the slide member 43. The right pneumatic cylinder 49b located at the right side in FIG. 4H comprises a right cylinder chamber 51b in the slide member 43. The right cylinder chamber 51b extends to be parallel to the left cylinder chamber 51a at the same level as the left cylinder chamber 51a, and is open to the right side surface of the slide member 43.

A left piston body 53a projects from the left side portion of the frame member 30, so that its distal end projects into the left cylinder chamber 51a. The proximal end portion of the left piston body 53a extends through the left outer surface of the frame member 30 to the outside of it. A right piston body 53b projects from the left side portion of the frame member 30, so that its distal end projects into the right cylinder chamber 51b. The proximal end portion of the right piston body 53b extends through the right outer surface of the frame member 30 to the outside of it.

Compression air introduction paths 55a and 55b are respectively formed in the piston bodies 53a and 53b to extend along the axial direction. Connection ports 57a and 57b to be connected to a pneumatic source (not shown) are attached to the proximal end portions of the piston bodies 53a and 53b. When the slide member 43 is maximally biased to the right in FIG. 4H, the distal end portion of the left piston member 53a is located at the opening portion side of the corresponding left cylinder chamber 51a, and the distal end of the right piston body 53b is located at the deepest side of the corresponding right cylinder chamber 51b.

As shown in FIG. 4H, stopper members 59a and 59b are respectively attached to left and right inner surfaces of the frame member 30 at positions opposing the left and right side surfaces of the slide member 43 in the horizontal plane. These stopper members 59a and 59b are selectively brought into contact with the left and right side surfaces of the slide member 43, thereby defining left and right stop positions of the slide member 43, i.e., thereby defining a slide stroke of the slide member 43. The stopper members 59a and 59b are attached to be reciprocal in the slide direction of the slide member 43, so that the slide stroke of the slide member 43 can be arbitrarily determined.

Normally, working compression air is introduced into the above-mentioned pneumatic cylinder structure 49a, so that the slide member is kept biased to the right in FIG. 4H.

Since the single-type finger structure 35 is arranged as described above, when working compression air is introduced into the right pneumatic cylinder structure 49b, it is guided into the right cylinder chamber 51b through the compression air introduction path 55b. As a result, the slide member 43 formed with the right cylinder chamber 51b is biased to the left in FIG. 4H. For example, in the second finger module $M_{6B}$ to which the single type finger structures 35 are attached at its two ends, the slide members 43 located at the two ends approach each other, and a work present between the clampers 31 attached to these slide members 43 is clamped by the approaching clampers 31.

Note that these clampers 31 are inhibited from approaching beyond a minimum distance predetermined by the above-mentioned stopper members 59a and 59b.

The mounting holes 46a are formed at four corners of the upper surface of the frame member 30 to have the predetermined diameter $d_1$, and to be separated by the predetermined pitch $D_1$ as in the double-type finger structure 29 described above. In addition, the positioning hole 46b and the positioning groove 46c which receive the pair of positioning pins formed on the bottom surface of each of the modules $M_1$ to $M_5$ and the mounting plate 22 to have the common diameter $d_2$ and to be separated by the common distance $D_2$ are formed in the central portions of the opposing two sides of the upper surface of the frame member 30.

(Reversing Module $M_1$)

The reversing module $M_1$ for performing the reversing operation comprises a pair of upper and lower mounting bases 50a and 50b which are mounted to be relatively pivotal about a pivot shaft 48 perpendicular to the central axis of the reversing module $M_1$, as shown in FIGS. 5A to 5F. The upper mounting base 50a integrally comprises a mounting stay 52a standing downward from its lower surface, and the lower mounting base 50b integrally comprises a pair of mounting stays $52b_1$ and $52b_2$ which stand upward from its upper surface. The above-mentioned pivot shaft 48 extends through these stays $52b_1$, 52a, and $52b_2$ in turn.

Note that the pivot shaft 48 is axially supported by the mounting stay 52a through a pair of bearings 54a and 54b to extend through a through hole 56 which is formed to extend along the pivot shaft 48. The two ends of the pivot shaft 48 are fixed to the two mounting stays $52b_1$ and $52b_2$ to be rotated together. A pinion gear 58 is key-fitted on the central portion of the pivot shaft 48, in other words, a portion inserted in the through hole 56 formed in the mounting stay 52a to be rotated together.

Figure 5A:
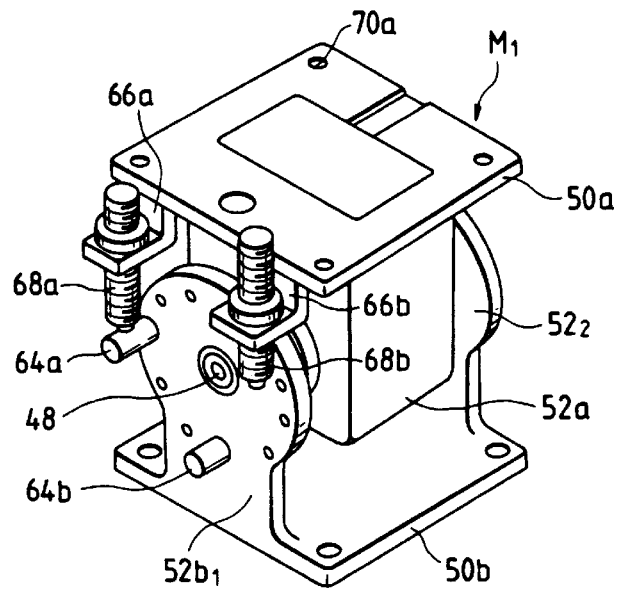
FIG. 5A is a perspective view showing an arrangement of a reversing module shown in FIG. 1.
Figure 5B:
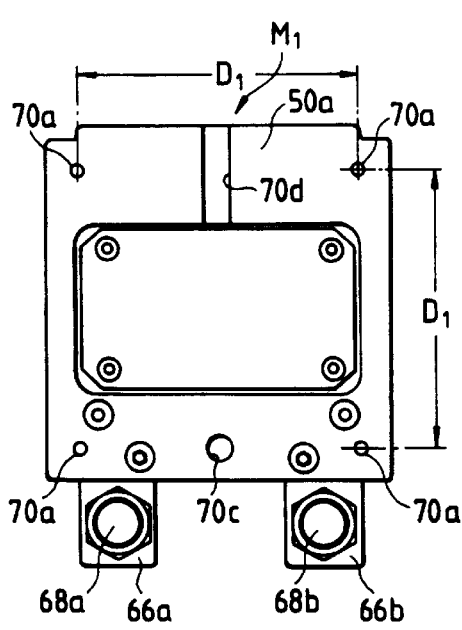
FIGS. 5B, 5C and 5D are respectively a plan view, a front view, and a bottom view of the reversing module shown in FIG. 5A.
Figure 5C:
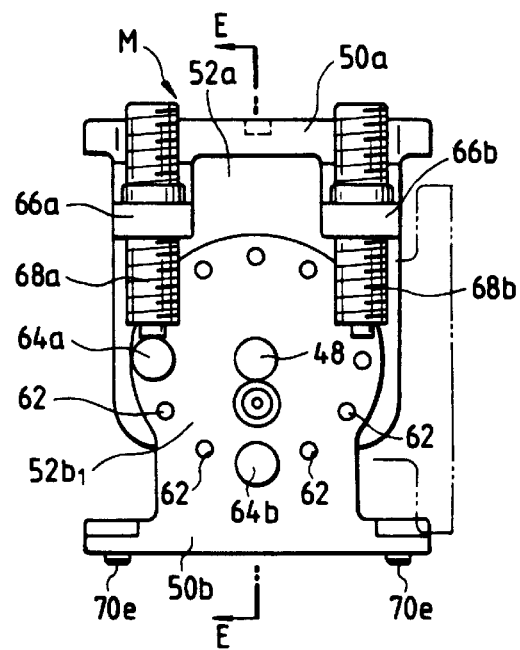
Figure 5D:
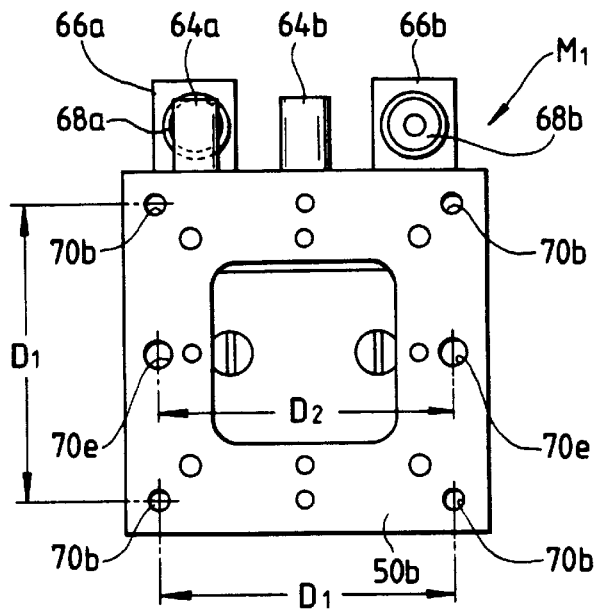
Figure 5E:
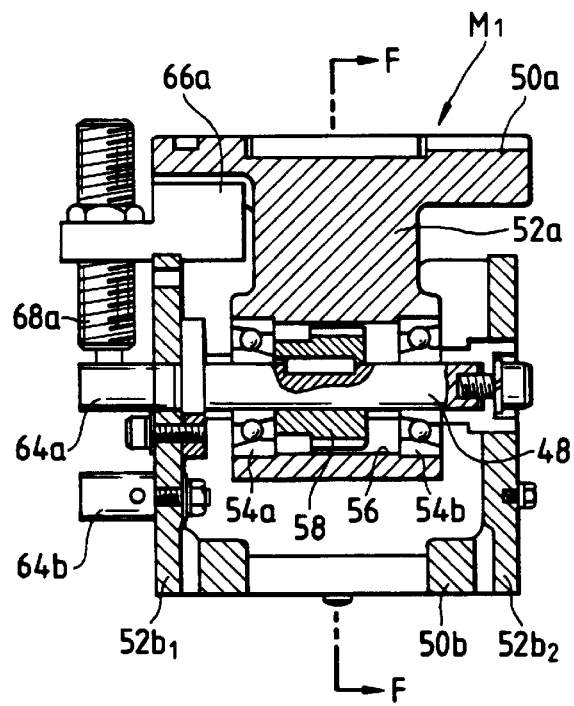
FIGS. 5E and 5F are respectively a cross-sectional view and a longitudinal sectional view taken along a line E—E in FIG. 5C and a line F—F in FIG. 5E.
Figure 5F:
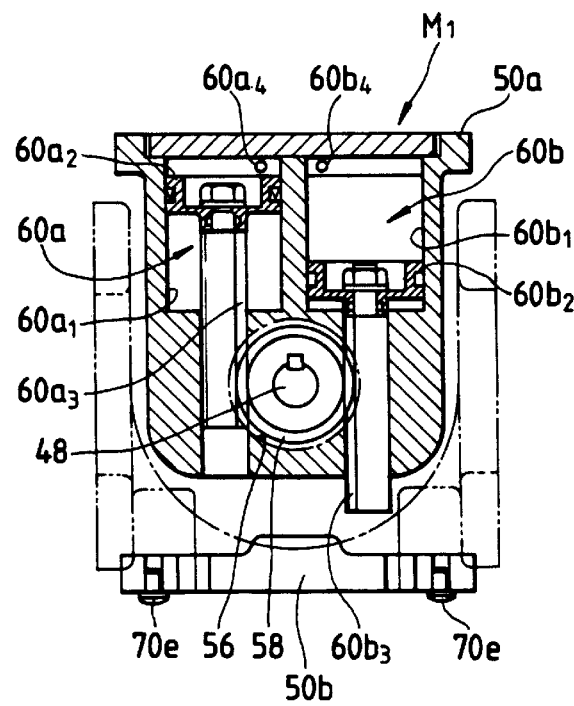

As is apparent from FIG. 5F, a pair of pneumatic cylinder structures 60a and 60b for rotating the pivot shaft 48 are disposed in the mounting stay 52a to sandwich the pivot shaft 48 therebetween and to extend in the vertical direction.

The pneumatic cylinder structures 60a and 60b are respectively constituted by cylinder chambers $60a_1$ and $60b_1$ formed in the mounting stay 52a, pistons $60a_2$ and $60b_2$ which are slidably inserted in the corresponding cylinder chambers $60a_1$ and $60b_1$ in an air-tight state, and rack members $60a_3$ and $60b_3$ contiguous with the corresponding pistons $60a_2$ and $60b_2$ and projecting downward from the cylinder chambers $60a_1$ and $60b_1$.

The rack members $60a_3$ and $60b_3$ are meshed with the pinion gear 58. Working compression air is introduced into the cylinder chambers $60a_1$, and $60b_1$ via compression air introduction paths $60a_4$ and $60b_4$ formed in their upper portions. Note that working compression air is selectively introduced into these compression air introduction paths $60a_4$ and $60b_4$ by a switching valve (not shown).

As can be apparent from FIG. 5C, a plurality of pivot amount regulating holes 62 are concentrically formed on the outer surface of the lower mounting stay $52b_1$ at 30°-angular intervals to have the horizontal central axis (pivot shaft) 48 as the center. Two pivot amount regulating members 64a and 64b are inserted in these pivot amount regulating holes 62, so that their mounting positions can be exchanged. A pair of stays 66a and 66b are fixed to the upper mounting base 50a. A pair of stopper pins 68a and 68b are threadably engaged with these stays 66a and 66b so that their positions can be adjusted in the vertical directions.

The reversing module $M_1$ is arranged as described above. Thus, in a state wherein compression air is introduced into the right pneumatic cylinder structure 60b, as shown in FIG. 5F, since the corresponding rack member $60b_3$ is pushed down, the pinion gear 58 meshed with it is pivoted clockwise, and its pivot amount is regulated when the left pivot amount regulating member 66a is brought into contact with the left stopper pin 68a, that is, the gear 58 is stopped, as shown in FIG. 5C. In this embodiment, when the left pivot amount regulating member 66a is brought into contact with the left stopper pin 68a, the lower mounting base 50b is set to be parallel to the upper mounting base 50a.

In this reversing module $M_1$, when the switching valve (not shown) is switched from the state shown in FIG. 5F, and compression air is introduced into the left pneumatic cylinder structure 60a, the corresponding rack member $60a_3$ is pushed down. Thus, the pinion gear 58 meshed with the member $60a_3$ is pivoted counterclockwise until the left pivot amount regulating member 66b is brought into contact with the right stopper pin 68b, as indicated by an alternate long and two short dashed line in FIG. 5C. In this state, the pivot amount of the pinion gear 58 is regulated, i.e., the gear 58 is stopped. In this embodiment, when the right pivot amount regulating member 66b is brought into contact with the right stopper pin 68b, the lower mounting base 50b is set to cross the upper mounting base 50a at an angle of 90°.

Mounting screw holes 70a each having the diameter $d_1$ are formed at four corners of the upper mounting base 50a to be separated by the predetermined pitch D, and mounting through holes 70b are similarly formed at the four corners of the lower mounting base 50b. A positioning hole 70c and a positioning groove 70d in which a pair of positioning pins commonly formed on the bottom surface of each of the modules $M_1$ to $M_5$ are formed in the central portions of the opposing two sides of the upper surface of the upper mounting base 50a. A pair of positioning pins 70e which project downward and are to be inserted in the positioning hole and the positioning groove formed in the remaining modules $M_2$ to $M_5$ or the first finger module $M_{6A}$ are integrally mounted on the central portions of the opposing two sides of the lower surface of the lower mounting base 50b to have the diameter $d_2$ and to be separated by the predetermined distance $D_2$.

In this manner, one of the remaining modules $M_2$ to $M_6$ is selectively attached to the lower portion of the reversing module $M_1$ and one of the remaining modules $M_2$ to $M_5$ or the hand mounting plate 22 is selectively attached to its upper portion.

(Shift Module $M_2$)

The shift module $M_2$ for performing the above-mentioned shift operation comprises a pair of upper and lower mounting bases 72a and 72b which are mounted to be relatively movable along the central axis of the shift module $M_2$, as shown in FIGS. 6A to 6D. The upper mounting base 72a integrally comprises a body portion 74 standing downward from the central portion of its lower surface. A pneumatic cylinder structure 76 for moving the lower mounting base 72b along its central axis with respect to the upper mounting base 72a is disposed on the body portion 74.

The pneumatic cylinder structure 76 comprises a cylinder chamber 78 which is formed in the body portion 74 to extend along the central axis of the shift module $M_2$ and to have a lower open surface. A pair of guide holes 80a and 80b vertically extend through the body portion 74 to sandwich the cylinder chamber 78 therebetween.

The lower end of a piston rod 82a is fixed to the upper surface of the lower mounting base 72b. The piston rod 82a projects upward along its central axis, and is inserted into the cylinder chamber 78 from the below. A piston 82b which is in sliding contact with the inner surface of the cylinder chamber 78 is mounted on the upper end of the piston rod 82a. The cylinder chamber 78 is divided into two, i.e., upper and lower chambers by the piston 82b, thus forming upper and lower cylinder subchambers 78a and 78b. The lower ends of a pair of guide rods 84a and 84b are fixed to the upper surface of the lower mounting base 72b. These guide rods are slidably inserted from below into the pair of guide holes 80a and 80b described above.

Figure 6D:
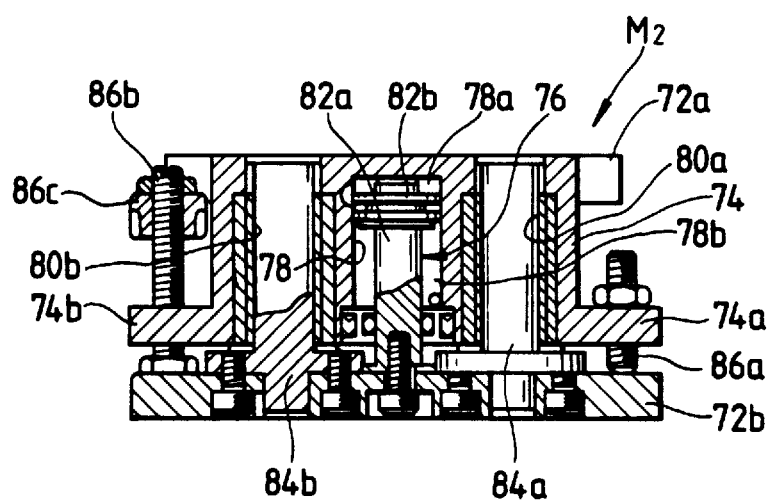
FIG. 6D is a longitudinal sectional view taken along a line D—D in FIG. 6A.

The upper end of the upper cylinder subchamber 78a and the lower end of the lower cylinder subchamber 78b are respectively connected to compression air introduction paths 76a and 76b into which working compression air is introduced. In this manner, when working compression air is introduced into the lower cylinder subchamber 78b through the lower compression air introduction path 76b, the piston 82b is moved upward along its central axis while being guided along the pair of guide rods 84a and 84b, as shown in FIG. 6D. As a result, the lower mounting base 72b is shifted to a position adjacent to the upper mounting base 72a.

When working compression air is introduced into the upper cylinder subchamber 78a through the upper compression air introduction path 76a, the piston 82b is moved downward along its central axis while being guided along the guide rods 84a and 84b. As a result, the lower mounting base 72b is shifted to a position separated away from the upper mounting base 72a.

In a non-shift mode, working compression air is introduced into the lower cylinder subchamber 78b through the lower compression air introduction path 76b via a switching valve (not shown). As a result, the lower mounting base 72b approaches the upper mounting base 72a.

Flanges 74a and 74b are integrally formed at the pair of opposing edge portions of the lower end of the body portion 74. The outer edges of these flanges 74a and 74b are vertically matched with the corresponding edges of the lower mounting base 72b.

Vertical through holes (not shown) are formed in the flanges 74a and 74b to be adjacent to bolt-like upper shift position regulating members 86a. The position regulating members 86a are threadably engaged with the through holes to vertically reciprocally extend through the through holes.

The lower ends of the position regulating members 86a can be brought into contact with the upper surface of the lower mounting base 72b. In the contact state, the position regulation members 86a define an upper shift position of the lower mounting base 72b. Note that the upper shift position can be finely adjusted by vertically reciprocating these regulation members 86a.

The support rods 86b extend through the through holes formed in the flanges 74a and 74b, and the lower ends of the support rods 86b are fixed on the upper surface of the lower mounting base 72b. The nut-like lower shift position regulation members 86c are threadably engaged with the upper ends of the support rods 86c at positions above the flanges 74a and 74b. The lower surfaces of these position regulation members 86c can be brought into contact with the upper surfaces of the flanges 74a and 74b. In this contact state, the position regulation members 86c define the lower shift position of the lower mounting base 72b. Note that the lower shift position can be finely adjusted by vertically reciprocating these regulation members 86c.

Mounting screw holes 88a are formed at four corners of the upper mounting base 72a, and mounting screw holes 88a are formed at four corners of the lower mounting base 72b. Each of these holes has the predetermined diameter $d_1$, and the holes are spaced apart from each other at predetermined pitches $D_1$. A positioning hole 88c and a positioning groove 88d are formed at the central portion between two opposing sides of the upper surface of the upper mounting base 72a. The positioning hole 88c and the positioning groove 88d are designed to receive a pair of positioning pins commonly formed on each of the modules $M_1$ to $M_5$ and the hand mounting plate 22.

A pair of positioning pins 88e are formed at the central portion between the two opposing sides of the lower surface of the lower mounting base 72b and are respectively fitted in the positioning hole and the positioning groove formed in the modules $M_1$ and $M_3$ to $M_6$ so that the pair of positioning pins 88e extend below the lower surface of the lower mounting base 72b. Each of the pair of positioning pins 88e has a predetermined diameter $d_1$, and they are spaced apart from each other by a predetermined distance $D_2$.

One of the modules $M_1$ and $M_3$ to $M_6$ is selectively mounted below the shift module $M_2$, and another one of the modules $M_1$ and $M_3$ to $M_5$ or the hand mounting plate 22 is selectively mounted on the shift module $M_2$.

(Rotation Module $M_3$)

The rotation module $M_3$ for performing the above turning operation comprises a pair of upper and lower mounting bases 92a and 92b relatively pivotal about a pivot shaft 90 set so that its axis is aligned with the axis of the rotation module $M_3$, as shown in FIGS. 7A to 7F. A main body 94 is integrally formed at the lower central portion of the mounting base 92a to extend downward. A through hole 96 is formed to vertically extend through the central portion of the main body 94.

The pivot shaft 90 is fixed on the upper surface of the lower mounting base 92b while the pivot shaft 90 vertically extends through the through hole 96 and is pivotally supported through a pair of bearings 98a and 98b. A snap ring 100 is mounted on the upper end of the pivot shaft 90 to prevent the pivot shaft 97 from being removed from the through hole 96.

A pinion gear 102 is coaxially mounted on the outer circumferential surface of the central portion of the pivot shaft 90 through a key, so that the pinion gear 102 can be rotated together with the pivot shaft 90. As is apparent from FIG. 7E, a pneumatic cylinder mechanism 104 for rotating and driving the pivot shaft 90 is disposed in the main body 94. The cylinder body 106 extends in a direction perpendicular to the pivot shaft 90. A cylinder chamber 108 is formed in the cylinder body 106 to extend in a direction perpendicular to the pivot shaft 90.

A pair of pistons 110a and 110b are integrally connected through a piston rod 112 in the cylinder chamber 108, so that the pistons 110a and 110b are hermetically slidable in the cylinder chamber 108. The cylinder chamber 108 is open to the through hole 96 at its central portion. A rack 114 meshed with the pinion gear 102 through this opening is formed on the piston rod 112. A cylinder subchamber 108a is defined by a portion of the cylinder chamber 108 located outside the piston 110a. The other cylinder subchamber 108b is defined by a portion of the cylinder chamber 108 located outside the piston 110b.

Compressed air supply paths 116a and 116b for receiving compressed working air are respectively connected to the outer ends of the cylinder subchambers 108a and 108b, respectively. When the compressed working air is supplied to the cylinder subchamber 108b through the compressed air supply path 116b, the pistons 110a and 110b are biased upward in the cylinder chamber 108 in FIG. 7E while the pistons 110a and 110b are kept connected by the piston rod 112. As a result, the lower mounting base 92b is rotated to pivot about the pivot shaft 90 counterclockwise in FIG. 7E.

Figure 7A:
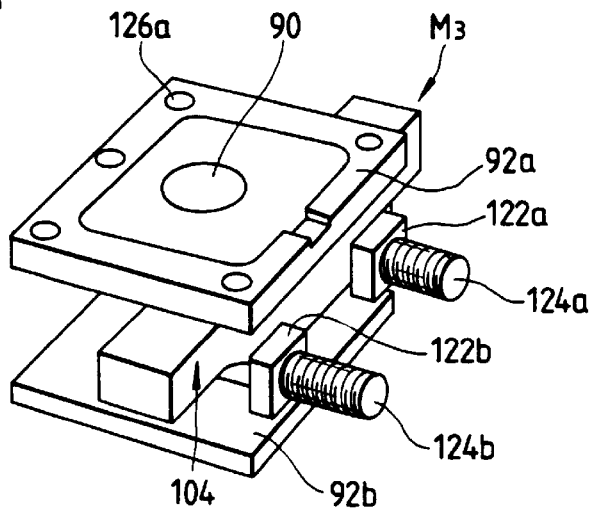
FIG. 7A is a perspective view showing an arrangement of a rotation module shown in FIG. 1.
Figure 7B:
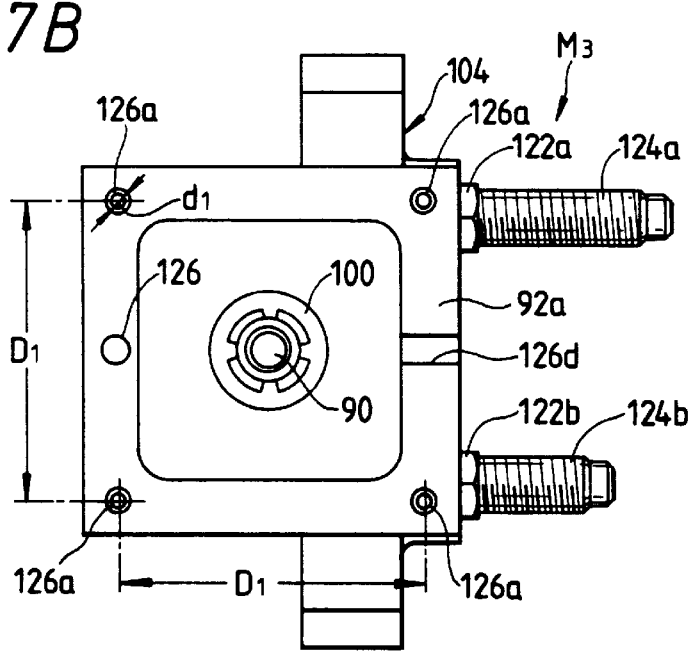
FIGS. 7B, 7C and 7D are respectively a plan view, a front view, and a bottom view of the rotation module shown in FIG. 7A.
Figure 7C:
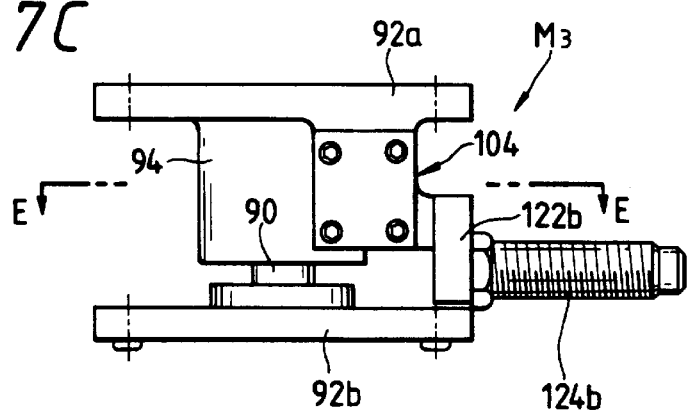
Figure 7D:
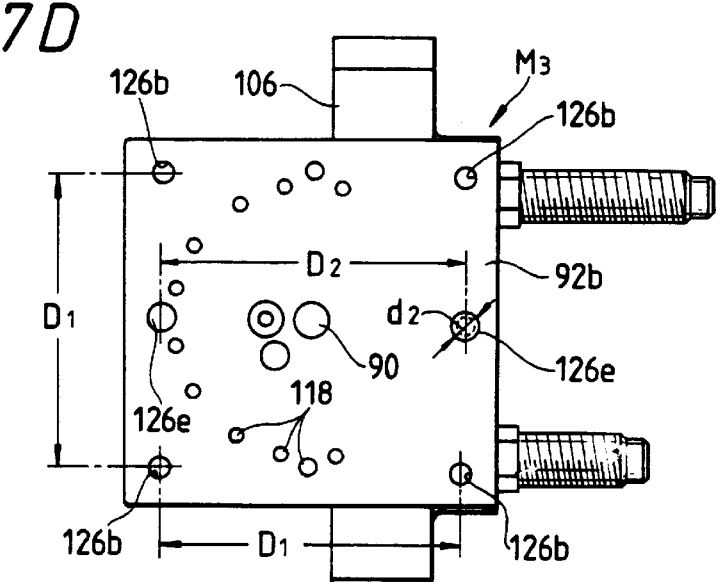
Figure 7E:
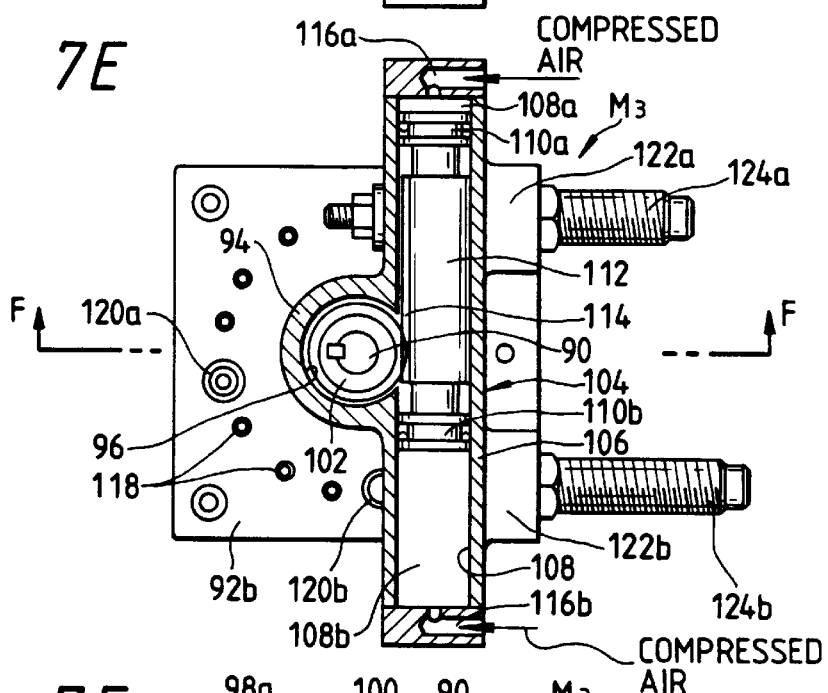
FIGS. 7E and 7F are respectively a cross-sectional view and a longitudinal sectional view taken along a line E—E in FIG. 7C and a line F—F in FIG. 7E.

Meanwhile, when the compressed working air is supplied to the cylinder subchamber 10a through the compressed air supply path 116a, the pistons 110a and 110b are biased downward in the cylinder chamber 108 in FIG. 7E while the pistons 110a and 110b are connected to each other through the piston rod 112. As a result, the lower mounting base 92b is rotated and pivoted about the pivot shaft 90 clockwise in FIG. 7E with respect to the upper mounting base 92a.

In a normal operating state, i.e., a non-rotation mode, the compressed working air is supplied to the cylinder subchamber 116b through the compressed air supply path 116b through a switching valve (not shown). As a result, the lower mounting base 92b receives a counterclockwise pivot force with respect to the upper mounting base 92a. The compressed working air is selectively supplied to the compressed air supply path 116a or 116b through a switching valve (not shown).

As is apparent from FIG. 7D, a plurality of pivot amount regulation holes 118 are formed in the lower mounting base 92b to be concentric about the pivot shaft 90 at angular intervals of 22.5°. Two pivot amount regulation members 120a and 120b are inserted in the pivot amount regulation holes 118 so that their mounting positions are interchangeable. A pair of stays 122a and 122b are fixed on the main body 94 of the upper mounting base 92a. A pair of stopper pins 124a and 124b are threadably engaged with the stays 122a and 122b so that the positions of the stopper pins 124a and 124b are adjustable.

Figure 7F:
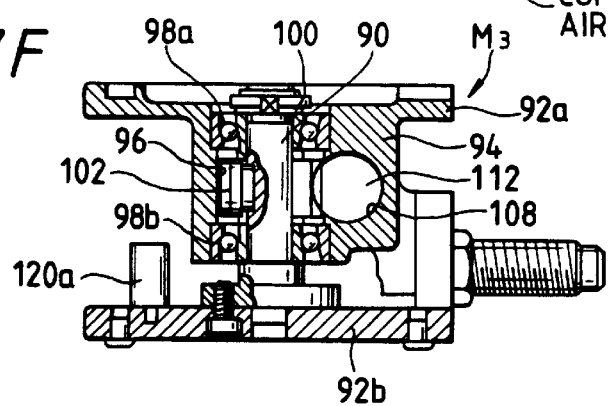

Since the rotation module $M_3$ is arranged as described above, in a state wherein the compressed air is supplied to the lower cylinder subchamber 108b, as shown in FIG. 7E, the rack 114 is biased upward in FIG. 7F. The pinion gear 102 meshed with the rack 114 is pivoted counterclockwise, and the pivot amount regulation member 102b regulates its pivot amount, i.e., is stopped while the pivot amount regulation member 120bn is in contact with the stopper pin 124b.

In this embodiment, the lower mounting base 92b is meshed with the upper mounting base 92a while the pivot amount regulation member 120b is kept in contact with the stopper pin 124b.

In the rotation module $M_3$, when a switching valve (not shown) is operated in the state shown in FIG. 7E to supply the compressed air to the upper cylinder subchamber 108a, the rack 114 is moved downward. The pinion gear 102 meshed with the rack 114 is pivoted clockwise. The pivot amount regulation member 120a is kept pivoted until it abuts against the corresponding stopper pin 124a. In this contact state, the pivot amount is regulated, i.e., the pivot amount regulation member 102a is stopped.

In this embodiment, the lower mounting base 92b is rotated through 90° clockwise when viewed from the to with respect to the upper mounting base 92a while the pivot amount regulation member 120a is kept in contact with the stopper pin 124a.

Mounting screw holes 126a each having the diameter $d_1$ are formed at the four corners of the upper mounting base 92a to be separated by the predetermined pitch $D_1$, and mounting through holes 126b are similarly formed at the four corners of the lower mounting base 92b. A positioning hole 126c and a positioning groove 126d which receive a pair of positioning pins commonly formed on the bottom surface of each of the modules $M_1$ to $M_6$ are formed in the central portion of the opposing two sides of the upper surface of the upper mounting base 92a.

A pair of positioning pins 126e each having the diameter $d_2$ and separated by the predetermined distance $D_2$ integrally project downward from the central portions of the opposing two sides of the lower surface of the lower mounting base 92b. These positioning pins are inserted in the positioning hole and the positioning groove formed in each of the remaining modules $M_1$, $M_2$, and $M_4$ to $M_6$.

In this manner, one of the remaining modules $M_1$, $M_2$, and $M_4$ to $M_6$ is selectively attached to the lower portion of the rotation module $M_3$, and one of the remaining modules $M_1$, $M_2$, $M_4$, and $M_5$, or the hand mounting plate 22 is selectively attached to its upper portion.

The above-mentioned reversing module $M_1$, the shift module $M_2$, and the rotation module $M_3$ constitute an active module of the hand structure 10, i.e., a module which can actively change its position by its driving source (pneumatic cylinder structure).

(Cushion Module)

Figure 8A:
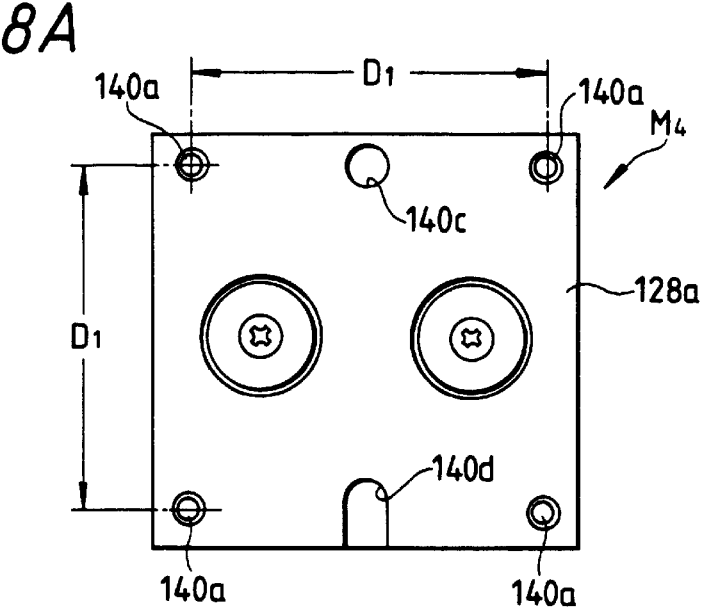
FIGS. 8A, 8B and 8C are respectively a plan view, a partially cutaway front view, and a bottom view showing in detail an arrangement of a cushion module shown in FIG. 1.
Figure 8B:
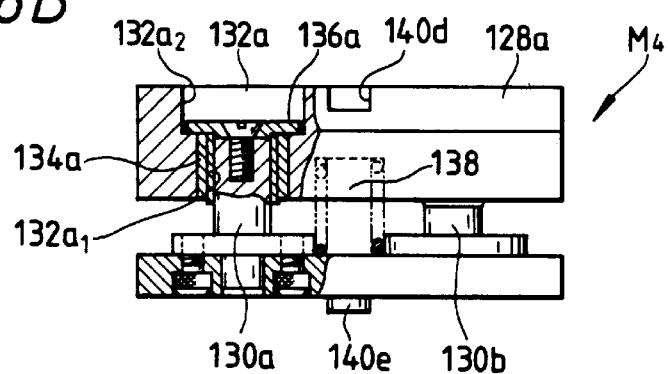
Figure 8C:
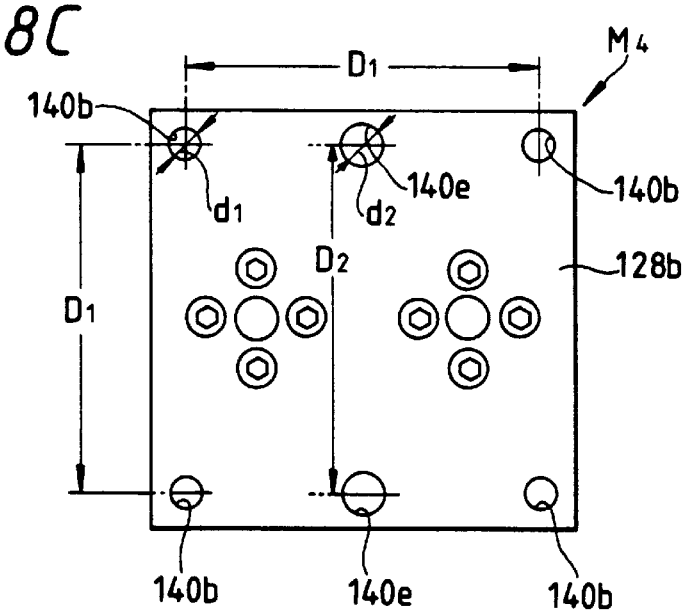

The cushion module $M_4$ for performing the above-mentioned cushion operation comprises a pair of upper and lower mounting bases 128a and 128b which are attached to be relatively movable along the central axis of the cushion module $M_4$, as shown in FIGS. 8A to 8C. A pair of guide pins 130a and 130b stand upright on the lower mounting base 128b at symmetrical positions with respect to the central axis.

Stepped through holes 132a and 132b vertically extend through the upper mounting base 128a at positions opposite to the guide pins 130a and 130b. The stepped through holes 132a and 132b coaxially comprise small-diameter through hole portions $132a_1$ and $132b_1$ open to the lower surface of the upper mounting base 128a, and large-diameter through hole portions $132a_2$ and $132b_2$ open to the upper surface thereof.

The upper portions of the guide pins 130a and 130b slidably extend through the small-diameter through hole portions $132a_1$ and $132b_1$ of the corresponding stepped through holes 132a and 132b via slide bearings 134a and 134b. Flange members 136a and 136b which are fitted in the large-diameter through hole portions $132a_2$ and $132b_2$ are fixed to the upper ends of the guide pins 130a and 130b. With this arrangement, the lower mounting base 128b is suspended from the upper mounting base 128a through the pair of guide pins 130a and 130b.

A coil spring 138 is interposed between the two mounting bases 128a and 128b along the central axis of this structure. The coil spring 138 has a biasing force for biasing the two mounting bases 128a and 128b in a direction to separate them from each other. In a non-cushion mode of the cushion module $M_4$, the lower mounting base 128b is separated from the upper mounting base 128a by the biasing force of the coil spring 138 until the flange portions 136a and 136b abut against the bottom surfaces of the large-diameter through hole portions $132a_2$ and $132b_2$ of the stepped through holes 132a and 132b.

When a part clamped by the above-mentioned finger unit F is inserted in a hole, and when the bottom portion of the part abuts against the bottom surface of the hole, the cushion operation is passively performed by this cushion module $M_4$. When the insert operation of the part continues after the bottom portion of the part abuts against the bottom surface of the hole, the lower mounting base 128b coupled to the finger unit F is moved along the central axis against the biasing force of the coil spring 138 to approach the upper mounting base 128a through the pair of guide pins 130a and 130b.

In this manner, when this cushion module $M_4$ is assembled in the hand structure 10, a shock along the central axis upon interference between a part and a hole can be absorbed when the part is inserted, so that an excessive force can be effectively prevented from being applied to the finger unit F or the robot 12.

Mounting screw holes 140a each having the diameter $d_1$ are formed at the four corners of the upper mounting base 128a to be separated by the predetermined pitch $D_1$, and mounting through holes 140b are similarly formed at the four corners of the lower mounting base 128b.

A positioning hole 140c and a positioning groove 140d which receive a pair of positioning pins commonly formed on the bottom surface of each of the modules $M_1$ to $M_6$ are formed in the central portions of the opposing two sides of the upper surface of the upper mounting base 128a. A pair of positioning pins 140e each having the diameter $d_2$ and separated by the predetermined distance $D_2$ integrally project downward from the central portions of the opposing two sides of the lower surface of the lower mounting base 128b. These positioning pins are inserted in the positioning hole and the positioning groove formed in each of the remaining modules $M_1$ to $M_3$, $M_5$, and $M_6$.

In this manner, one of the remaining modules $M_1$ to $M_3$, $M_5$, and $M_6$ is selectively attached to the lower portion of the cushion module $M_4$, and one of the remaining modules $M_1$ to $M_4$, and $M_5$, or the hand mounting plate 22 is selectively attached to the upper portion thereof.

(Compliance Module)

Figure 9A:
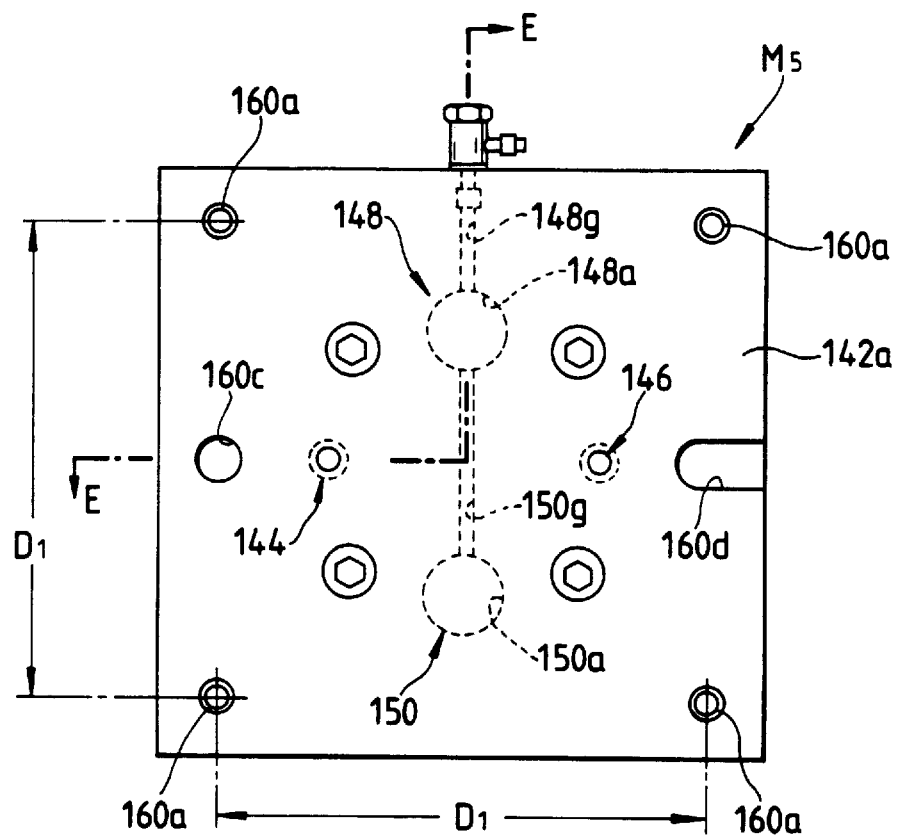
FIGS. 9A, 9B and 9C are respectively a plan view, a front view, and a bottom view showing in detail an arrangement of a compliance module shown in FIG. 1.
Figure 9B:
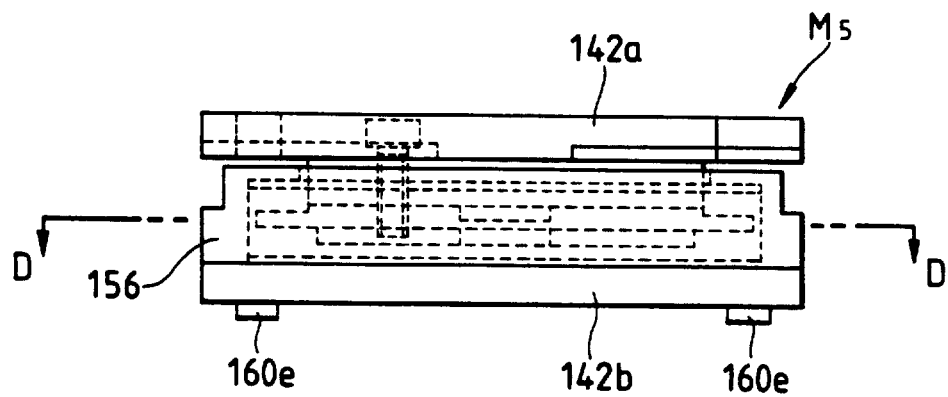
Figure 9C:
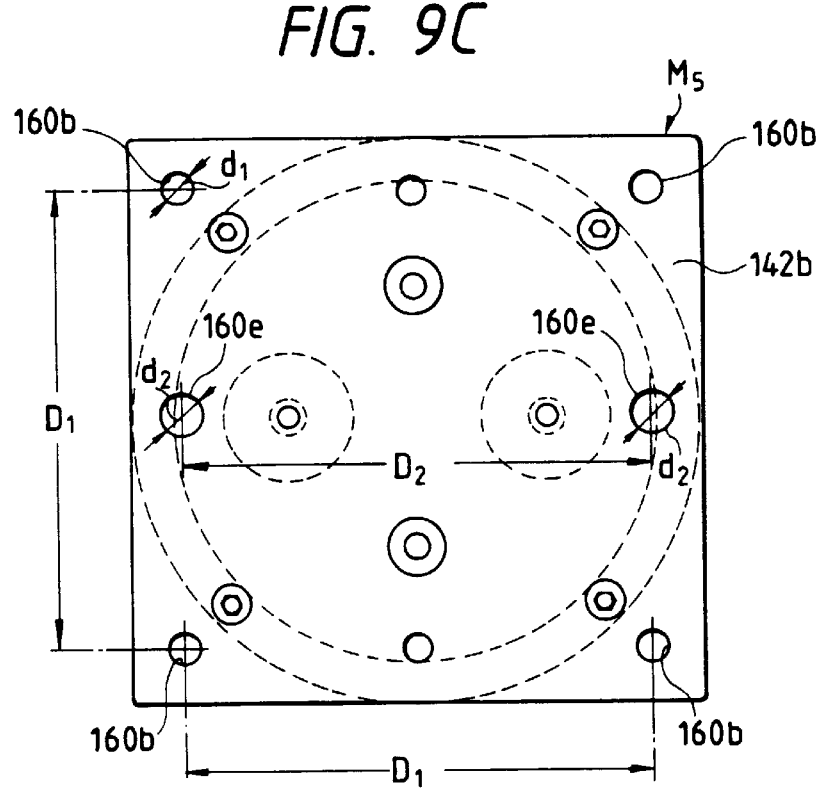
Figure 9D:
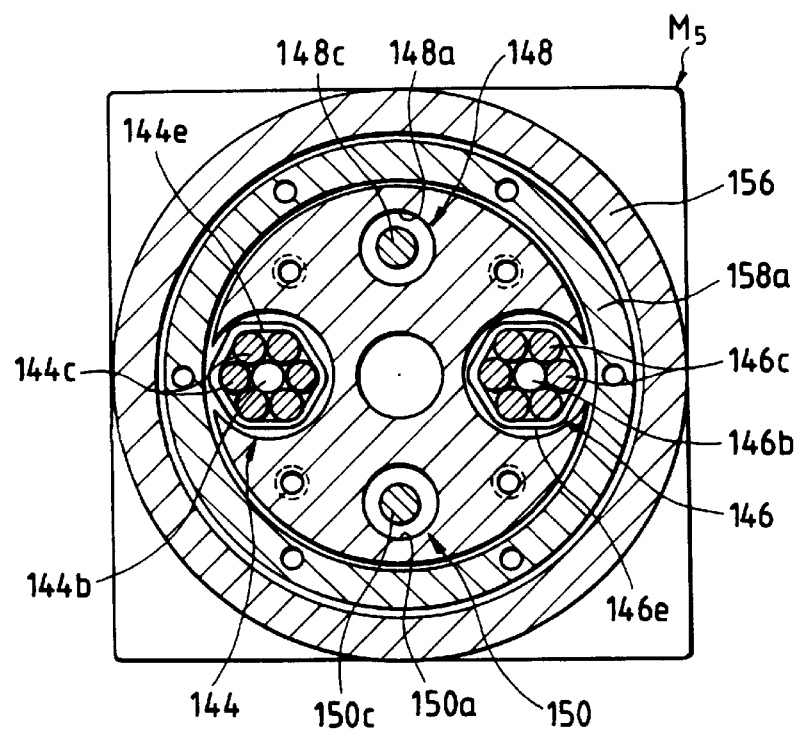
FIGS. 9D and 9E are respectively a cross-sectional view and a longitudinal sectional view taken along a line D—D in FIG. 9B and a line E—E in FIG. 9A.
Figure 9E:
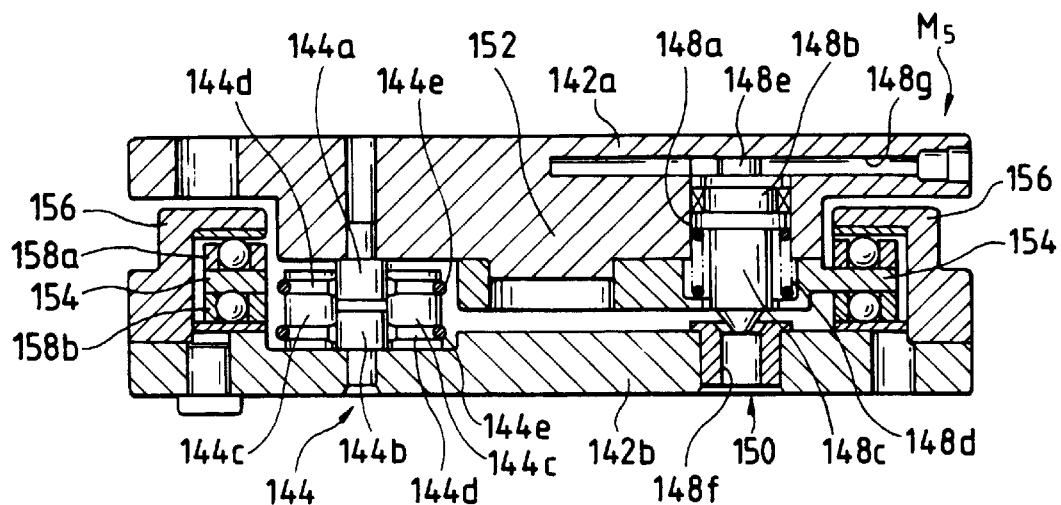

The compliance module $M_5$ for performing the above-mentioned compliance operation comprises a pair of upper and lower mounting bases 142a and 142b which are relatively movable in a direction perpendicular to the central axis of the compliance module $M_5$, as shown in FIGS. 9A to 9E. A pair of compliance structures 144 and 146 are interposed between these mounting bases 142a and 142b, as shown in FIG. 9D. The compliance structures 144 and 146 are disposed at symmetrical positions about the central axis. In addition, a pair of lock structures 148 and 150 are disposed on an axis perpendicular to the disposition axis of the compliance structures 144 and 146. The lock structures 148 and 150 are arranged at symmetrical positions about the above-mentioned central axis.

A body portion 152 integrally projects downward from the central portion of the lower surface of the upper mounting base 142a, and a flange portion 154 is integrally mounted on the lower surface of the body portion 152. The flange portion 154 extends radially outward. A ring-shaped locking member 156 is fixed to the outer peripheral portion of the upper surface of the lower mounting base 142b so as to receive the peripheral edge portion of the flange portion 154 from the above, in other words, so as to be inserted between the flange portion 154 and the upper mounting base 142a.

Ball bearings 158a and 158b are respectively interposed between the lower surface of the locking member 156 and the upper surface of the flange member 154, and between the lower surface of the flange member 154 and the upper surface of the lower mounting base 142b. In this manner, the lower mounting base 142b is freely suspended to be pivotal about the upper mounting base 142a and to be movable within a plane perpendicular to the vertical axis (to be referred to as a cross section) through these ball bearings 158a and 158b.

In a normal state, the above-mentioned pair of compliance structures 144 and 146 elastically maintain a state wherein a central axis $C_1$ of the upper mounting base 142a and a central axis $C_2$ of the lower mounting base 142b are matched with each other along the central axis of the compliance module $M_5$ when no external force acts on the lower mounting base. When an external force within the cross section acts on the lower mounting base 142b, the compliance structures 144 and 146 are flexibly biased in the cross section within a predetermined range in accordance with this external force.

The arrangements of the compliance structures 144 and 146 will be described below. Since the two compliance structures 144 and 146 have the same arrangement, only the arrangement of the left compliance structure 144 in FIG. 9E will be described in detail below, and a description of the arrangement of the right compliance structure 146 in FIG. 9E will be omitted by suffixing similar letters.

More specifically, the compliance structure 144 comprises a first shaft member 144a projecting downward from the lower surface of the body portion 152, and a second shaft member 144b projecting upward from the upper surface of the lower mounting base 142b while being matched with the first shaft member 144a in the vertical direction in a state wherein no external force acts on the lower mounting base 142b.

These first and second shaft members 144a and 144b are formed to have outer peripheral surfaces having the same radius. The lower end of the first shaft member 144a is slightly separated from the upper end of the second shaft member 144b.

The compliance structure 144 comprises a plurality of support pins 144c as support members which are disposed to simultaneously surround the opposing end portions of the first and second shaft members 144a and 144b. More specifically, in this embodiment, these support pins 144c are formed of columns each having the same radius as that of the first and second shaft members 144a and 144b, and the number of pins is six. These six support pins 144c are disposed to simultaneously surround the opposing end portions of the first and second shaft members 144a and 144b without a gap.

Annular grooves 144d are formed in the upper and lower end portions of each support pin 144c. When these support pins 144c surround the shaft members 144a and 144b, ring-like biasing members 144e are stored and wound in these grooves 144d to simultaneously surround these support pins. The biasing members 144e bias these support pins 144c so that the pins are brought into elastic contact with the peripheral surfaces of the opposing end portions of the first and second shaft members 144a and 144b.

In this embodiment, each biasing member 144e is formed of a finely wound ring-like coil spring.

The above-mentioned lock structures 148 and 150 are arranged to prevent lateral deviation of the lower mounting base 142b with respect to the upper mounting base 142a by its inertia when the Z-arm 20 of the robot 120 is moved in a lateral direction at a high speed.

The two lock structures 148 and 150 have the same arrangement, as shown in FIG. 9D. For this reason, only the arrangement of the upper lock structure 148 in FIG. 9D will be described in detail below, and a description of the arrangement of the lower lock structure 150 in FIG. 9D will be omitted by suffixing similar letters.

The lock structure 148 comprises a cylinder chamber 148a which is formed to be open to the lower surface of the body portion 152 and to extend along the vertical axis. A piston 148b is slidably housed in the cylinder chamber 148a. A piston rod 148c serving as a lock pin projecting downward from the lower surface of the body portion 152 is connected to the piston 148b. The lock pin 148c is biased upward by a coil spring 148d toward the upper mounting base 142a. A retracted position of the lock pin 148c is defined to be a position where a stopper member 148e integrally formed on the upper end of the lock pin 148c abuts against the upper surface of the cylinder chamber 148a and is stopped by the biasing force of the coil spring 148d.

A lock hole 148f is formed in the upper surface of the lower mounting base 142b at a position opposite to the distal end of the lock pin 148c. A compression air introduction path 148g is connected to a portion of the cylinder chamber 148a above the upper end of the piston 148b.

Working compression air is introduced into the cylinder chamber 148a through the compression air introduction path 148g, so that the lock pin 148c is pushed down from its retracted position against the biasing force of the coil spring 148d, and is moved to a lock position. At the lock position, the lower end of the lock pin 148c is fitted in the lock hole 148f. In this manner, the lock structure 148 is operated, so that the upper and lower bases 142a and 142b are locked with each other in the lateral direction, and are integrally moved in the lateral direction.

The alignment operation of the compliance module $M_5$ with the above arrangement will be described below.

Figure 10A:
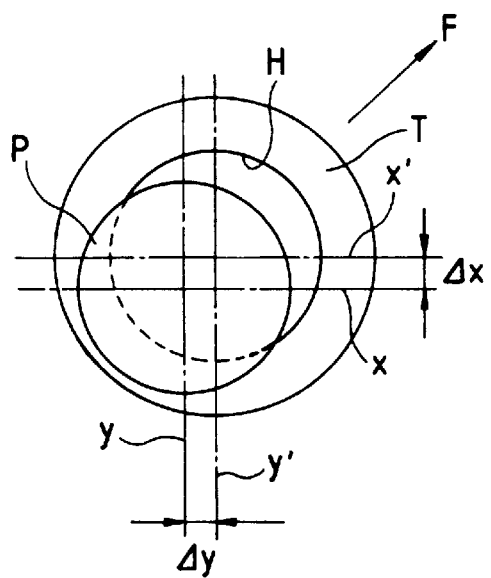
FIG. 10A is a plan view for explaining a compliance operation.

As shown in FIG. 10A, when a pin P clamped by the finger F is to be fitted in a hole H, position information of the hole H on the X-Y plane, and a three-dimensional position of the Z-arm 20 of the robot 12, i.e., position information of the pin P to be fitted are input in advance, and movement of the Z-arm 20 is controlled by a control operation of a control structure (not shown) on the basis of the input position information.

When the Z-arm 20 is controlled to be moved in the horizontal direction, i.e., in the X-Y plane, a solenoid valve (not shown) is opened, and compression air is supplied to the lock structures 148 and 150 through the corresponding compression air introduction paths 148g and 150g. In this manner, the lock pins 148c and 150c are pushed down from their retracted positions against the biasing forces of the corresponding coil springs 148d and 150d, and are moved to their lock positions. In this manner, the two lock structures 148 and 150 are operated to be set in a lock operation state, and the lock pins 148c and 150c are brought to their lock positions to be fitted in the corresponding lock holes 148f and 150f, so that the pair of upper and lower mounting bases 142a and 142b are locked in the lateral direction. Thus, these bases 142a and 142b are moved together in the lateral direction.

When the Z-arm 20 is controlled to be moved in the vertical direction, i.e., in the X-Z or Y-Z plane, the solenoid valve is closed, and no compression air is supplied to the two lock structures 148 and 150. In this manner, the lock pins 148c and 150c are pushed up from the lock positions to the retracted positions by the biasing forces of the corresponding coil springs 148e and 150e, and are moved to the retracted positions. In this manner, the two lock structures 148a and 150 are set in a non-operation state, and the lock pins 148c and 150c are brought to their retracted positions to be disengaged from the corresponding lock holes 148f and 150f. Thus, the upper and lower mounting bases 142a and 142b can be relatively freely moved in the lateral direction.

When the input position information is correct, the Z-arm 20 is accurately moved according to the control content of the control structure, and the hole H is precisely positioned according to a setup value, the pin P is moved to a position immediately above the hole H according to the above-mentioned control operation. Thereafter, the pin P is vertically moved downward, and is satisfactorily fitted in the hole H.

In some cases, however, the hole H is not accurately positioned, or its positioning is slightly shifted from the setup value in the X-Y plane, or the position of the Z-arm 20 is slightly shifted from the position defined by the control structure due to backlash of gears.

When such a position shift occurs, the lower edge of the pin P which is moved vertically downward upon downward movement of the Z-arm 20 abuts against a tapered surface T of the hole H, as shown in FIG. 10A. When the Z-arm 20 is moved further downward, the lower edge of the pin P receives a horizontal partial force $F_0$ along the tapered surface T.

When the Z-arm 20 is moved vertically, the two lock structures 148 and 140 are set in the non-operation state, as described above. For this reason, the pair of upper and lower mounting bases 142a and 142b can be relatively biased in the lateral direction. As a result, the horizontal partial force $F_0$ acts on the pin P, and then acts on the compliance structures 144 and 146 via the lower mounting base 142b.

Figure 10B:
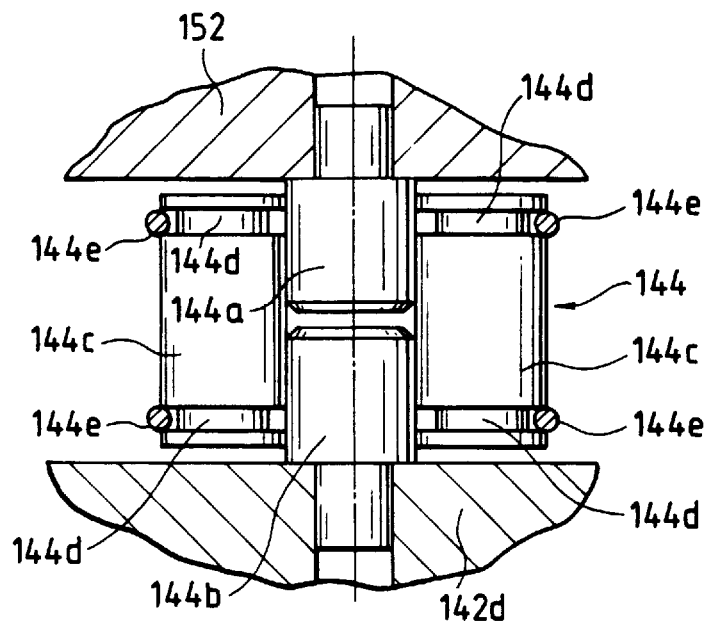
FIG. 10B is a front view showing a compliance structure before the compliance operation is executed.

For this reason, in a state wherein no partial force $F_0$ acts, as shown in FIG. 10B, the first and second shaft members 144a and 144b and the first and second shaft members 146a and 146b are matched along the vertical axis by the pairs of upper and lower biasing members 144e and 146e. From this state, as shown in FIG. 10C, the support pins 144c and 146c are inclined obliquely against the biasing forces of these biasing members 144e and 146e, so that the second shaft members 144b and 146b are moved to be deviated in the horizontal direction.

Figure 10C:
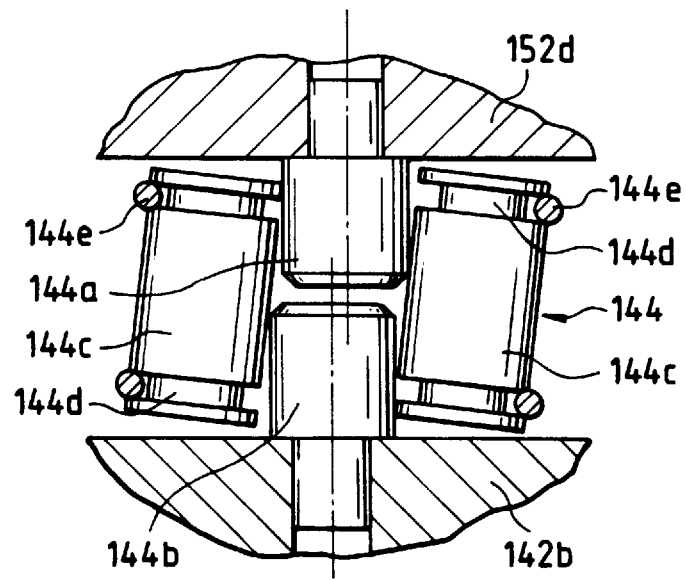
FIG. 10C is a front view showing the compliance structure after the compliance operation is executed.

Upon this horizontal movement, as shown in FIG. 10C, the lower mounting base 142b is moved while supporting the pin P to extend vertically without inclining its position. For this reason, the following fitting operation can be easily performed.

In this manner, a position shift between the pin P and the hole H can be elastically absorbed by shifting the first and second shaft members 144a and 144b and the first and second shaft members 146a and 146b in the compliance structures 144 and 146, and the pin P and the hole H are brought to be matched with each other in the vertical direction. Upon downward movement of the Z-arm 20, the pin P is satisfactorily fitted in the hole H.

After the fitting operation of the pin P into the hole H is completed, clamping of the pin P by the finger unit F is released, and the Z-arm 20 is moved upward. The finger unit F is solely moved upward to be released from the pin P. When the pin P is completely separated from the finger unit F, the above-mentioned partial force $F_0$ no longer acts on the lower mounting base 142b. As a result, the partial force acting on the second shaft members 144b and 146b of the two compliance structures 144 and 146 is canceled, and the two mounting bases 142a and 142b can be satisfactorily restored from a deviated state shown in FIG. 10C to a matching state shown in FIG. 10B.

In this manner, the alignment operation of the compliance module $M_5$, in other words, elastic deviation•restoration operations in the compliance structures 144 and 146 are completed.

Note that mounting screw holes 160a each having the diameter $d_1$ are formed in the four corners of the upper mounting base 142a to be separated by the predetermined pitch $D_1$, and mounting through holes 160b are similarly formed in the four corners of the lower mounting base 142b. A positioning hole 160c and a positioning groove 160d which receive a pair of positioning pins commonly formed on the bottom surface of each of the modules $M_1$ to $M_6$ are formed in the central portions of the opposing two sides of the upper surface of the upper mounting base 142a. A pair of positioning pins 160e each having the diameter $d_2$ and separated by the predetermined distance $D_2$ integrally project downward from the central portions of the opposing two sides of the lower surface of the lower mounting base 142b. These positioning pins are inserted in the positioning hole and the positioning groove formed in each of the remaining modules $M_1$ to $M_6$.

In this manner, one of the remaining modules $M_1$ to $M_4$, and $M_6$ is selectively attached to the lower portion of this compliance module $M_5$, and one of the remaining modules $M_1$ to $M_4$ or the hand mounting plate 22 is selectively attached to the upper portion thereof.

The above-mentioned cushion module $M_4$ and the compliance module $M_5$ constitute a passive module of the hand structure 10, i.e., a module which has no driving source, and can be deformed (biased) according to a state of a third party.

[Description of Hand Structure Selection System]

A selection system of the hand structure 10 as the characteristic feature of the present invention, i.e., a selection system for selecting an optimal combination of modules for clamping a predetermined work, will be described in detail below.

(Schematic Arrangement of Selection System)

The schematic arrangement of a selection system 200 will be described below with reference to FIGS. 11 and 12.

Figure 11:
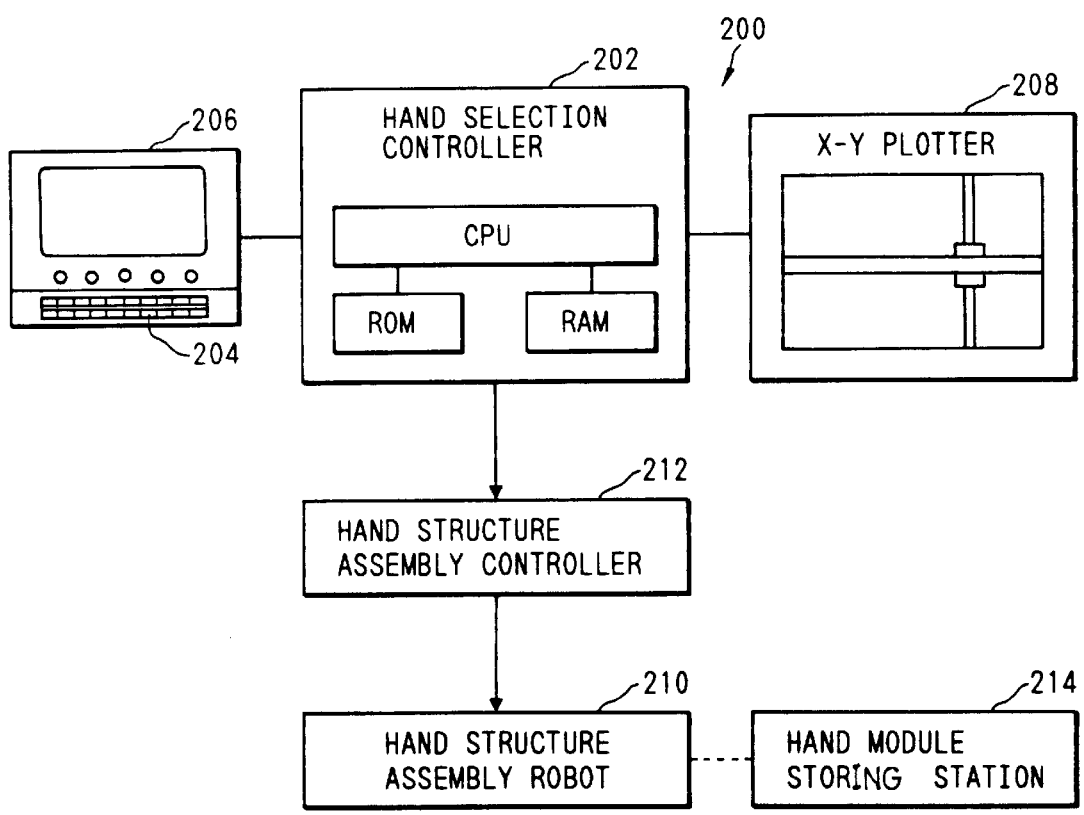
FIG. 11 is a schematic block diagram showing an arrangement of a selection system in the embodiment of the method of selecting a hand structure according to the present invention.

As shown in FIG. 11, the selection system 200 mainly comprises a hand selection controller 202 for controlling the overall selection operations, a keyboard 204 as an input means for inputting data of a work to be clamped by the hand structure 10, a display unit 206 as a display means for displaying a selection result selected by the selection controller 202 on a CRT, an X-Y plotter 208 as an output means for outputting the selection result selected by the selection controller 202 onto a paper sheet in a displayed state, and a hand structure assembly controller 212 for causing a hand structure assembly robot 210 to assemble the hand structure 10 using predetermined modules on the basis of the selection result selected by the selection controller 202. The hand structure assembly robot 210 picks up modules selected by the selection controller 202 from a module storing station 214 which prestores various modules used in assembly, and assembles a predetermined hand structure 10 to the lower portion of the hand mounting plate 22 attached to the lower end of the Z-arm 20 of the robot 12.

The selection controller 202 mainly comprises a CPU for executing a selection control sequence, a ROM for prestoring a control program of the CPU, and spec (specification) data, and a RAM as an external memory for storing data which must be stored during execution of the control sequence by the CPU.

FIG. 12 is a diagram showing the selection system 200. As can be seen from FIG. 12, data of a work to be clamped by the hand structure 10 includes "work name", "work No.", "line name", and "station No.". Characteristic data includes "work category data", "loading pattern data", and "work position data". The above-mentioned "work category data" includes "shape pattern", "size", "weight", "material", and the like. The "loading pattern data" includes "loading pattern" such as press insert or fitting, "pressure", and the like. The "work position data" includes "clamping position", and "loading position".

These work data are temporarily stored in the RAM in the selection controller 202 through the keyboard 204, and are called and used in a module selection control sequence and a work data retrieval control sequence. The ROM prestores spec data, and the spec data includes "unit name", "parts No.", "weight", "clamp force", "release force", and the like. These spec data are called and used in a spec data retrieval control sequence and a combination check sequence through a spec data control system.

(Basic Control Sequence of Selection Control)

The basic control sequence of the selection controller 202 upon selection of the hand structure 10 will be described below with reference to FIG. 13.

When the selection control sequence is started, a position change state of a work is judged based on work position data in step S10. This judgement sequence will be described in detail below. Briefly speaking, however, a position change state between a position of a work when it is clamped (picked up) by the hand structure 10 and a position when this work is mounted (placed) on a loading portion is recognized. Then, the reversing module $M_1$ and the rotation module $M_3$ necessary for this position change are selected, and the order of attaching the selected modules $M_1$ and $M_3$ is determined. In addition, the mounting position of the rotation module is determined.

After the presence/absence of attachment of the reversing module $M_1$ and the rotation module $M_3$ is judged based on the position change state of a work in step S10, the result of judgement is stored in the RAM in step S12.

Subsequently, in step S14, the presence/absence of an insert operation upon placing of a work is determined to judge the necessity of the shift module $M_2$. After the presence/absence of attachment of the shift module $M_2$ is judged on the basis of the insert operation upon placing in step S14, the result of judgement is stored in the RAM in step S16.

Thereafter, in step S18, an overload upon placing of a work is detected to judge the necessity of the cushion module $M_4$. After the presence/absence of attachment of the cushion module $M_4$ judged on the basis of the overload, the result of judgement is stored in the RAM in step S20.

A position shift between a designated work position and an actual work position upon placing of the work is detected in step S22 to judge the necessity of the compliance module $M_5$. After the presence/absence of attachment of the compliance module $M_6$ is judged the basis of on the position shift state in step S22, the result of judgement is stored in the RAM in step S22.

In step S26, the type of the finger module $M_6$ necessary for clamping a work is determined according to a category of a work. After the type of the finger module $M_6$ is determined in step S26, the result is stored in the RAM in step S28.

When all the selection states of the modules $M_1$ to $M_6$ are determined in this manner, the results are read out from the RAM, and the selection result, in other words, the final pattern of the hand structure 10 necessary for picking up the work is finally checked in association with the robot 12 to which the hand structure is attached. In step S34, the final check result is output, and a series of selection control operations of the hand structure 10 are completed.

The final pattern of the selected hand structure 10 is output to the display unit 206 and the X-Y plotter 208, as described above, and can be visually recognized by an operator. When the output result is supported by the operator, the selection result is sent to the hand structure assembly controller 212. The hand structure assembly robot 210 then assembles the hand structure 10 based on the selection result.

(Description of Position Change Judgement Sequence)

A position change judgement sequence in step S10 will be described in detail below with reference to FIGS. 13 to 18G.

In order to detect a position change of a work, a pickup position and a placed position of a work must be accurately detected. For this purpose, in this embodiment, a storing vector and a basic work vector are newly introduced. The storing vector is defined as a vector directing placing direction from a reference point on a work, and is used as a characteristic vector of the work. On the other hand, the basic work vector is a vector extending from the reference point in a direction arbitrarily determined by a designer, and is defined as a vector indicating a work reference. It should be noted that the storing vector and the basic work vector must not be parallel to each other.

The storing vector and the basic work vector are independently determined using a coordinate system originally set for a work, and an absolute coordinate system defined to coincide with, e.g., a robot coordinate system, and are set to be indicated in the corresponding coordinate systems, as shown in Table 1 below.

TABLE 1

|  | Work Coordinate System | Absolute Coordinate System |
| --- | --- | --- |
| Storing Vector | $\vec{a}$ | $\vec{A}$ |
| Work Reference Vector | $\vec{b}$ | $\vec{B}$ |

Figure 15B:
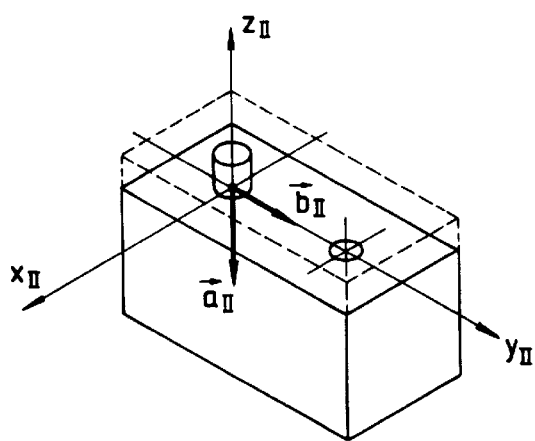
FIG. 15B is a perspective view showing setup states of the storing vector and the basic work vector defined on a receiving work when a work is placed.
Figure 15A:
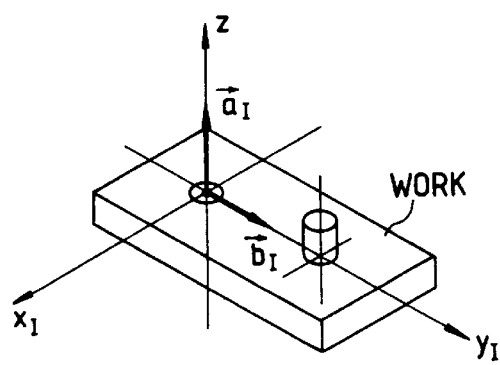
FIG. 15A is a perspective view showing setup states of the storing vector and the basic word vector defined on a work when a work is picked up.

In the following description, the work coordinate system upon picking up of a work is defined as an $O_I$-$x_I y_I z_I$ coordinate system, as shown in FIG. 15A, and the coordinate system of a receiving object on which the work is placed upon placing is defined as an $O_{II}$-$x_{II} y_{II} z_{II}$ coordinate system, as shown in FIG. 15B. In addition, the absolute coordinate system is defined as an O-xyz coordinate system. The absolute coordinate system and the two work coordinate systems have an arbitrary positional relationship therebetween. In order to identify vectors upon picking up, vectors upon placing, and vectors after different storing vectors upon picking up and placing are caused to coincide with each other, suffices "I", "II", and "III" are attached to the vectors.

By these definitions, both the storing vectors $\vec{a}$ and the basic work vectors $\vec{b}$ represented by the work coordinate systems given at the time of pickup and placing are standardized to and represented by the O-xyz absolute coordinate system according to a known conversion process among orthogonal coordinate systems.

On the other hand, comparison between the storing vector $\vec{A}_I$ and the basic work vector $\vec{B}_I$ upon picking up and the storing vector $\vec{A}_{II}$ and the basic work vector $\vec{B}_{II}$ upon placing can be attained by examining angular parameters representing separation states from the three orthogonal axes x, y, and z, which define extending directions of the respective vectors.

For the purpose of this examination, the extending directions of the storing vector $\vec{A}$ and the basic work vector $\vec{B}$ are uniquely defined by angular parameters, as shown in FIGS. 16A and 16B.

In FIG. 16A, a vector $\vec{A}'$ represents an orthogonal projection vector of the storing vector $\vec{A}$ onto an X-Y plane, an angular parameter α represents an angle defined between the X-axis and the orthogonal projection vector $\vec{A}'$, and an angular parameter β represents an angle defined between the Z-axis and the storing vector $\vec{A}$. When $\vec{A}$ and $\vec{Z}$ are parallel to each other, α=0.

In FIG. 16B, a plane M represents a plane passing through an origin O and perpendicular to the storing vector $\vec{A}$, a vector $\vec{B}'$ represents an orthogonal projection vector of the basic work vector $\vec{B}$ onto the plane M, a vector $\vec{Z}$ represents a unit vector on the Z-axis, a vector $\vec{Z}'$ represents an orthogonal projection vector of the unit vector $\vec{Z}$ onto the plane M, and an angular parameter γ represents an angle defined between the orthogonal projection vectors $\vec{B}'$ and $\vec{Z}'$. When the vectors $\vec{A}$ and $\vec{Z}$ are parallel to each other, the angular parameter γ represents an angle defined between orthogonal projection vectors of vectors $\vec{B}$ and $\vec{X}$.

When the three angular parameters α, β, and γ are defined as described above, the extending directions of the vectors on the absolute coordinate system are uniquely determined. In other words, these angular parameters α, β, and γ are input in advance as data representing pickup and placing positions of a work.

The position change judgement operation in step S10 in the basic control sequence of the selection control operation of the hand structure 10 will be described in detail below with reference to FIG. 17.

When the position change judgement operation is started, pickup and place values (i.e., $α_I$, $α_{II}$) of the angular parameter α defined between the X-axis and the orthogonal projection vector $\vec{A}'$ are compared with each other in step S40. That is, it is checked in step S40 if the two angular parameters $α_I$ and $α_{II}$ are equal to each other or a phase difference between the two angles is 180°. If YES in step S40, i.e., if the two angular parameters $α_I$ and $α_{II}$ are equal to each other or the phase difference is 180°, the flow advances to step S42 (to be described later). On the other hand, if NO in step S40, i.e., the two angular parameters $α_I$ and $α_{II}$ are not equal to each other or the phase difference is not 180°, the flow advances to step S41. In step S41, it is checked if one of conditions $β_I$=0°, $β_I$=180°, $β_{II}$=0°, and $β_{II}$=180° is established. If YES in step S41, i.e., if one of the four conditions is established, the flow advances to step S42.

If it is determined in step S42 that the two angular parameters $β_I$ and $β_{II}$ are equal to each other, values (i.e., $γ_{II}$ and $γ_{III}$) of the angular parameter γ defined between the orthogonal projection vectors $\vec{B}'$ and $\vec{Z}'$ after different storing vectors upon picking up and placing are caused to coincide with each other are compared with each other in step S44. If it is determined in step S44 that the two angular parameters $γ_{II}$ and $γ_{III}$ are equal to each other, this means that the storing vector $\vec{A}_I$ and the basic work vector $\vec{B}_I$ upon picking up of a work and the storing vector $\vec{A}_{II}$ and the basic work vector $\vec{B}_{II}$ upon placing respectively coincide with each other. Thus, it can be determined that neither the reversing nor rotational operations are necessary when this work is picked up and placed.

Figure 17:
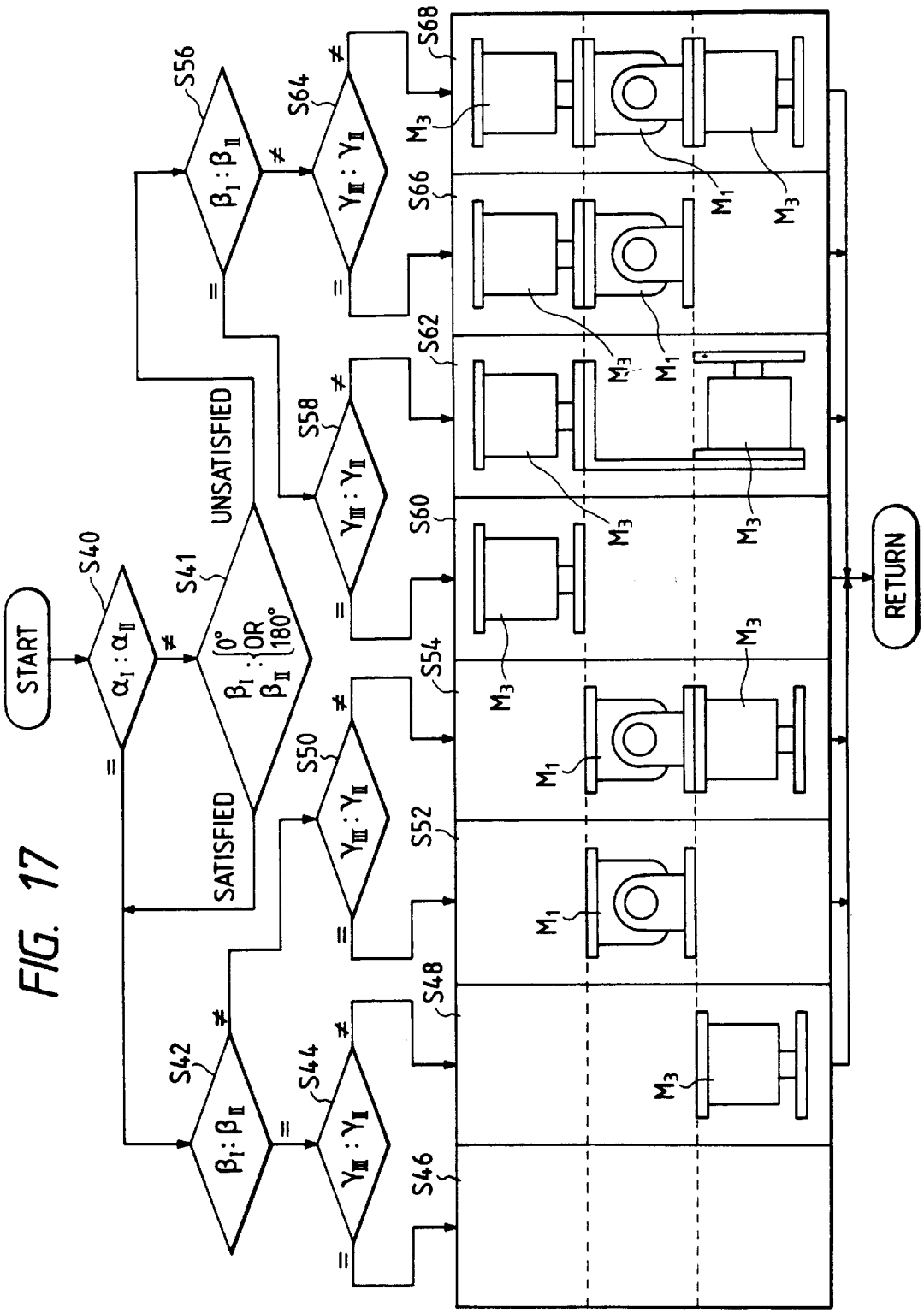
FIG. 17 is a flow chart showing in detail a subroutine for judging a position change in the selection control sequence.

As a result, as shown in FIG. 17, if it is determined in step S44 that the values of the two angular parameters $γ_{II}$ and $γ_{III}$ coincide with each other, a selection state wherein neither the reversing module $M_3$ nor the rotation module $M_1$, are attached is obtained as the result of judgement in step S46. After the result of judgement is obtained in step S46, this subroutine returns to the original basic control sequence.

Figure 18A:
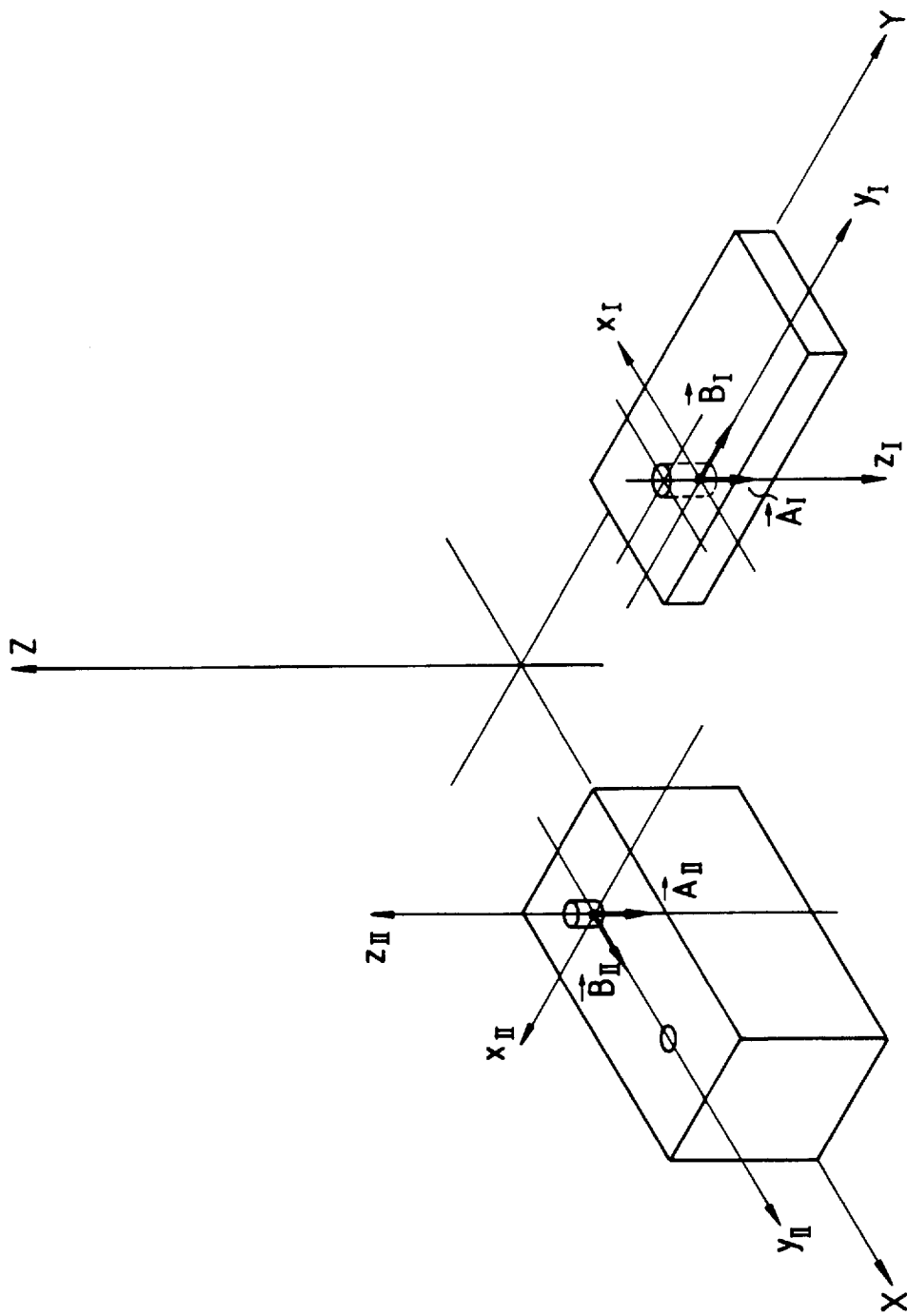

If it is determined in step S44 that the values of the two angular parameters $γ_{II}$ and $γ_{III}$ are not equal to each other, the rotation unit is necessary. For example, when a work is located as shown in FIG. 18A, both the storing vectors $\vec{A}_I$ and $\vec{A}_{II}$ of the work at the time of pickup and placing are set to be parallel to the Z-axis, and only the basic work vectors $\vec{B}_I$ and $\vec{B}_{II}$ at the time of pickup and placing extend in different directions about the Z-axis. Therefore, when this work is picked up and placed, only an operation for rotating the work about the Z-axis is necessary.

As a result, as shown in FIG. 17, if it is determined in step S44 that the two angular parameters $γ_{II}$ and $γ_{III}$ do not coincide with each other, a selection state wherein only the rotation module $M_3$ is attached is obtained as the result of judgement in step S48. After the result is obtained in step S48, this subroutine returns to the original basic control sequence.

Figure 18B:
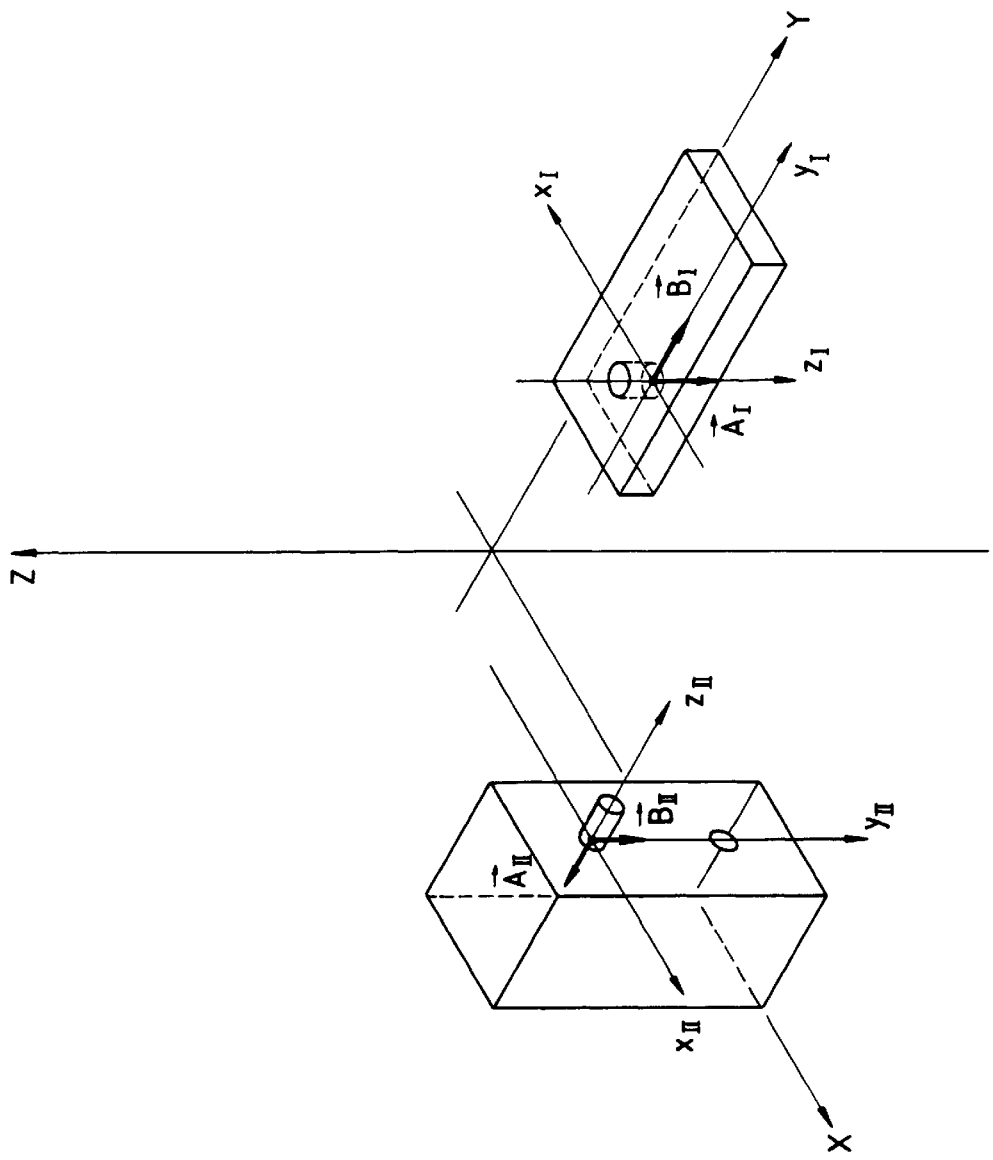

If it is determined in step S42 described above that the values of the two angular parameters $β_I$ and $β_{II}$ are not equal to each other, the angular parameters $γ_{II}$ and $γ_{III}$ are compared with each other in step S50 as in step S44 described above. If it is determined in step S50 that the values of the two angular parameters $γ_{II}$ and $γ_{III}$ are equal to each other, the reversing unit is required. For example, when a work is located as shown in FIG. 18B, the storing vectors $\vec{A}_I$ and $\vec{A}_{II}$ of the work at the time of pickup and placing are rotated from each other by a predetermined angle (in this case, 90°) about the X-axis direction, and the basic work vectors $\vec{B}_I$ and $\vec{B}_{II}$ are also relatively rotated through 90° about the X-axis direction. Therefore, when this work is picked up and placed, only an operation for reversing the work about the X-axis direction is required.

As a result, as shown in FIG. 17, if it is determined in step S50 that the two angular parameters $γ_{II}$ and $γ_{III}$ coincide with each other, a selection state wherein only the reversing module $M_1$ is attached is obtained as the result of judgement in step S52. After the result is obtained in step S52, this subroutine returns to the original basic control sequence.

If it is determined in step S50 that the two angular parameters $γ_{II}$ and $γ_{III}$ are not equal to each other, both the reversing and rotation units are required. For example, when a work is located, as shown in FIG. 18C, the storing vector $\vec{A}_I$ and the basic work vector $\vec{B}_I$ are respectively parallel to the Z- and X-axes, and the place basic work vector $\vec{B}_{II}$ is parallel to the Y-axis. In this case, the storing vector $\vec{A}_{II}$ is slightly inclined from the X-axis. Therefore, when this work is picked up and placed, operations for rotating the work about the Y-axis and then rotating it about the storing vector $\vec{A}_{II}$ are required.

As a result, as shown in FIG. 17, if it is determined in step S50 that the two angular parameters $γ_{II}$ and $γ_{III}$ coincide with each other, a selection state wherein the reversing module $M_1$ and the rotation module $M_3$ attached to the lower portion of the module $M_1$ are attached is obtained as the result of judgement in step S54. After the result is obtained in step S54, this subroutine returns to the original basic control sequence.

On the other hand, if it is determined in step S41 that the angular parameters $\beta_I$ and $\beta_I$ are neither 0° nor 180°, the angular parameters $\beta_I$ and $\beta_{II}$ are compared with each other in step S56.

Figure 18D:
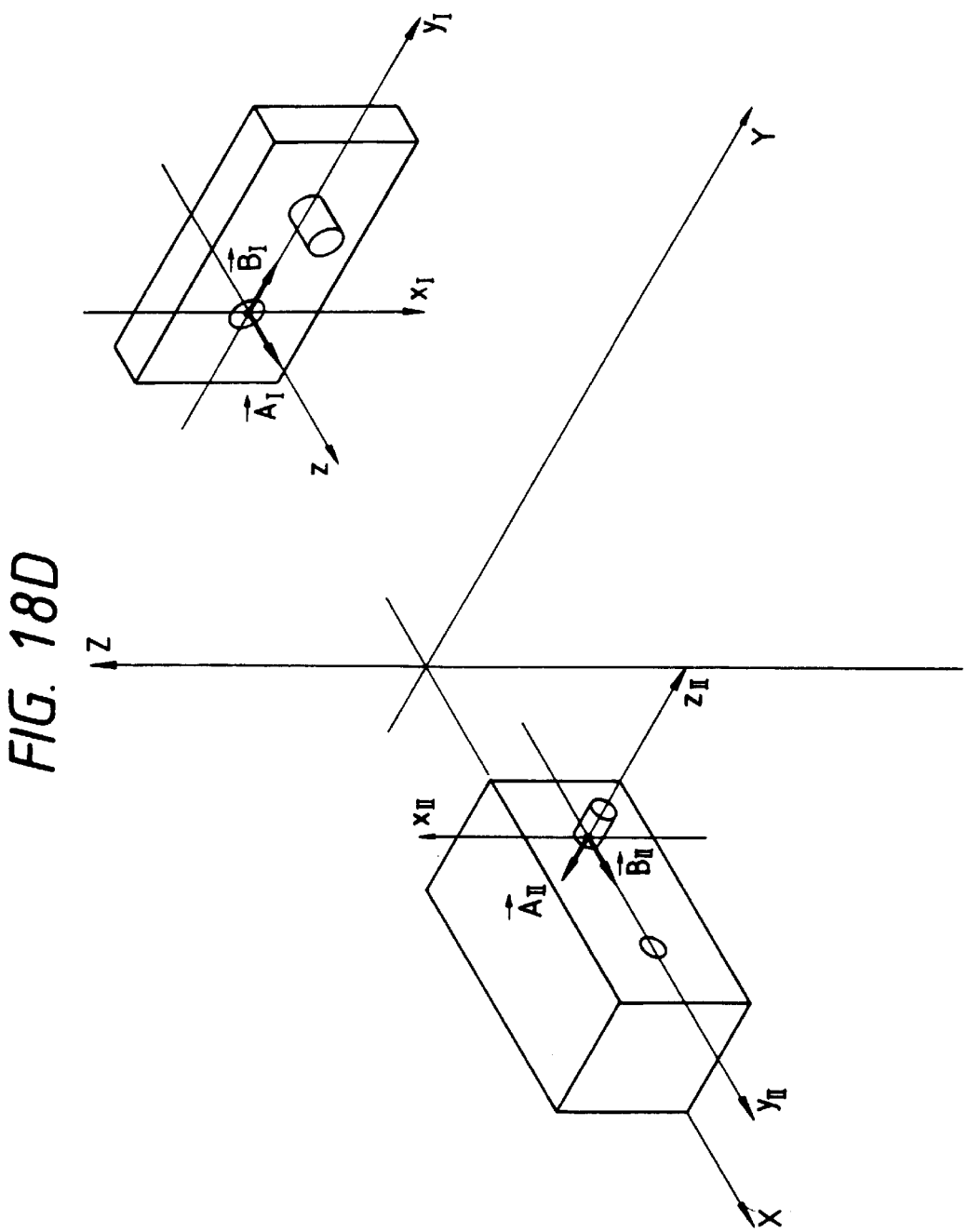

If it is determined in step S56 that the two angular parameters $\beta_I$ and $\beta_{II}$ are equal to each other, the angular parameters $\gamma_{II}$ and $\gamma_{III}$ are compared with each other in step S58. If it is determined in step S58 that the two angular parameters are equal to each other, the rotation module $M_3$ is required. For example, when a work is located, as shown in FIG. 18D, the storing vector $\vec{A}_I$ and the basic work vector $\vec{B}_I$ upon picking up are respectively set to be parallel to the X- and Y-axes, and the storing vector $\vec{A}_{II}$ and $\vec{B}_{II}$ upon placing are respectively set to be parallel to the Y- and X-axes. In other words, when the picked up work is pivoted about the Z-axis, it can coincide with a placing state. Therefore, only an operation for rotating the work about the Z-axis when this work is picked up and placed is required.

As a result, as shown in FIG. 17, if it is determined in step S58 that the two angular parameters $\gamma_{II}$ and $\gamma_{III}$ coincide with each other, a selection state wherein only the rotation module $M_3$ is attached is obtained as the result of judgement in step S60. After the result is obtained in step S60, this subroutine returns to the original basic control sequence.

Figure 18E:
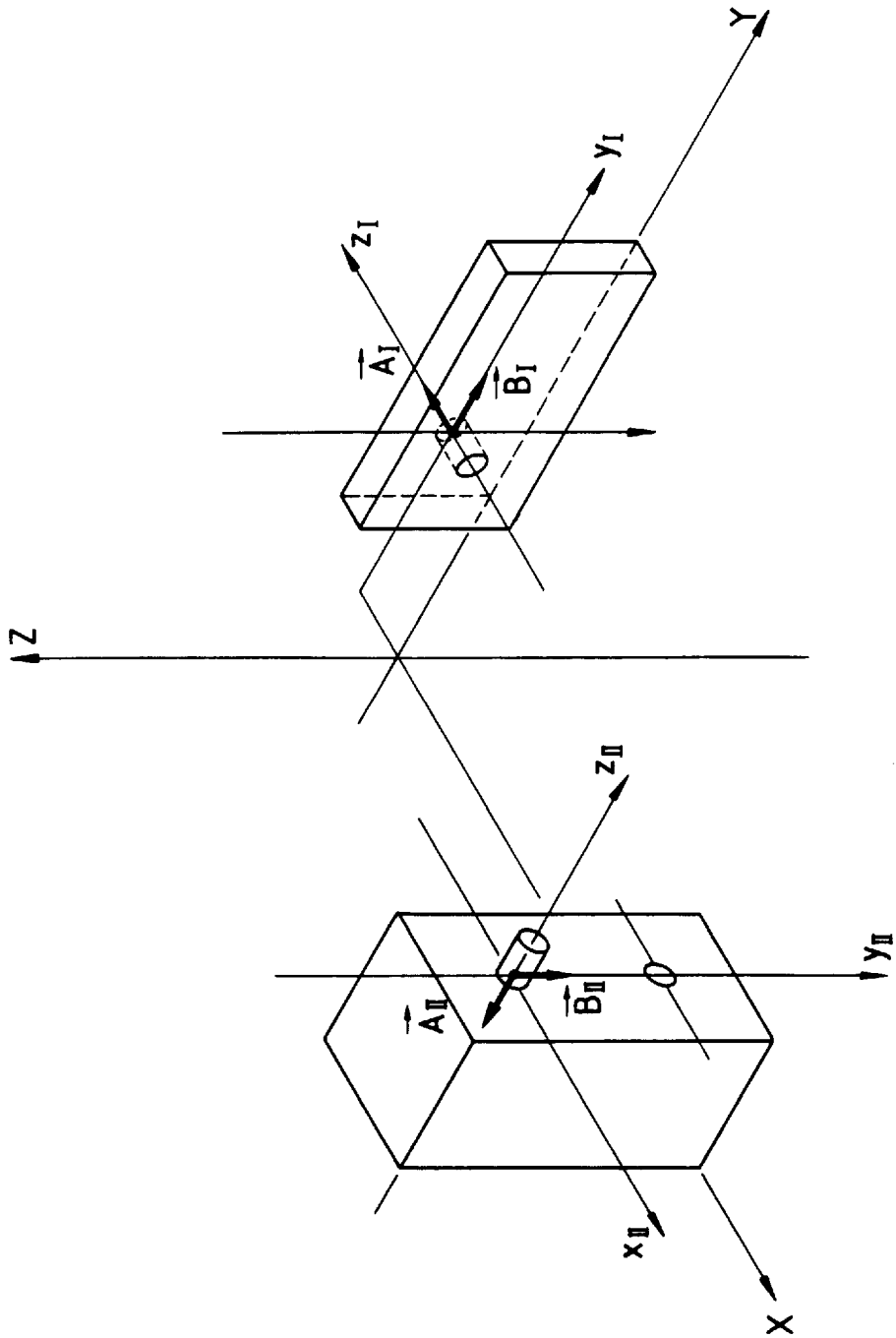
Figure 18F:
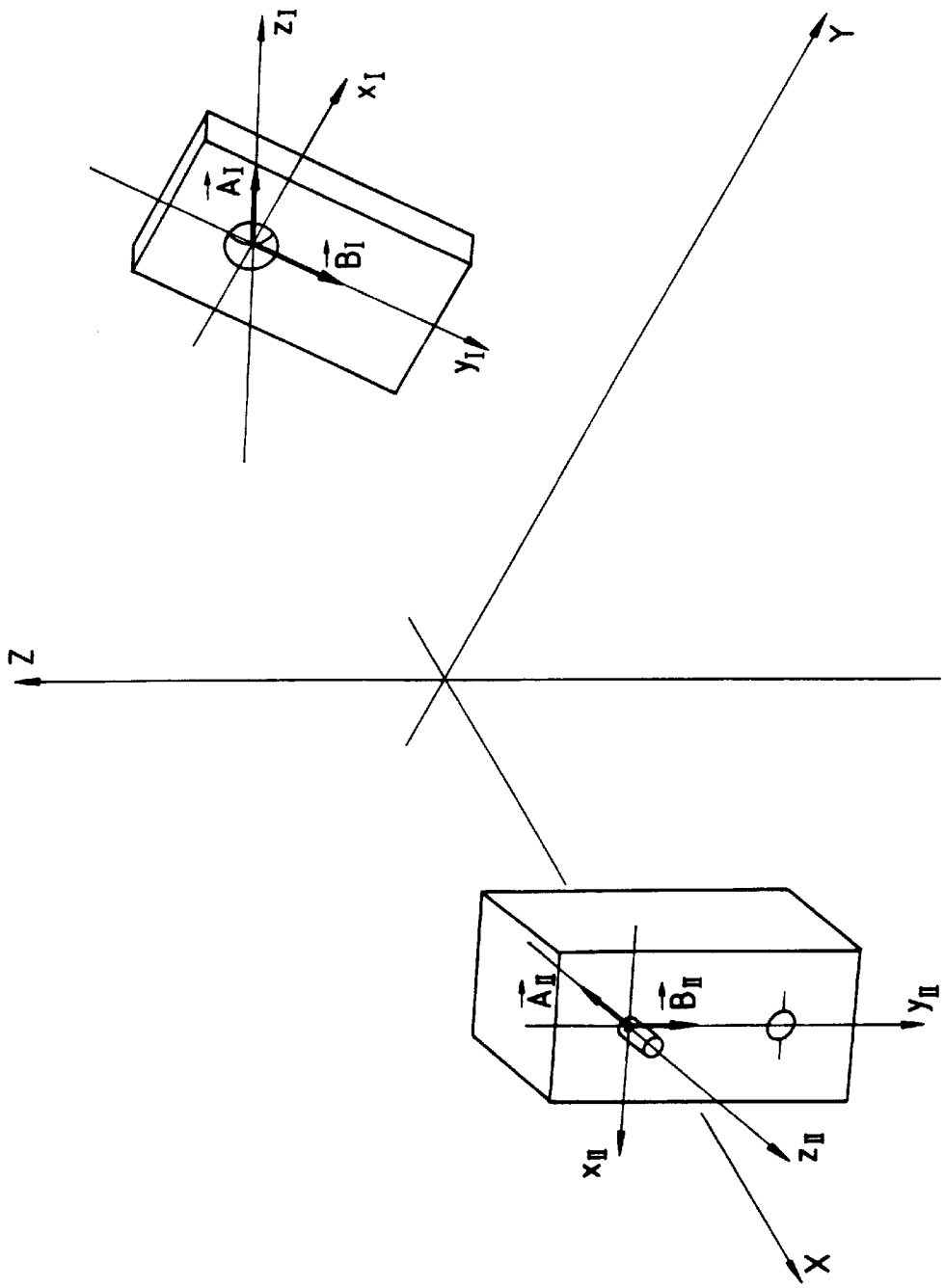

On the other hand, if it is determined in step S58 that the two angular parameters $\gamma_{II}$ and $\gamma_{III}$ are not equal to each other, the two rotation modules $M_3$ are necessary. For example, when a work is located, as shown in FIG. 18E, the storing vectors $\vec{A}_I$ and $\vec{A}_{II}$ are respectively set to be parallel to the X- and Y-axes, and can coincide with each other when the work is pivoted about the Z-axis. However, since the pickup and place basic work vectors $\vec{B}_I$ and $\vec{B}_{II}$ are respectively set to be parallel to the Y- and Z-axes, the work must be pivoted about the Y-axis. Therefore, in this case, the rotation module $M_3$ about the Z-axis and another rotation module $M_3$ about the Y-axis are required when this work is picked up and placed.

As a result, as shown in FIG. 17, if it is determined in step S58 that the two angular parameters $\gamma_{II}$ and $\gamma_{III}$ coincide with each other, a selection state wherein the two rotation modules $M_3$ are attached to have different pivot axes is obtained as the result of judgement in step S62. After the result is obtained in step S62, this subroutine returns to the original basic control sequence.

If it is determined in step S56 that the two angular parameters $\beta_I$ and $\beta_{II}$ are not equal to each other, the angular parameters $\gamma_{II}$ and $\gamma_{III}$ are compared with each other in step S64 as in step S58 described above. If it is determined in step S64 that the two angular parameters $\gamma_{II}$ and $\gamma_{III}$ are equal to each other, the rotation module $M_3$ and the reversing module $M_1$ are required. For example, when a work is located, basic work vector $\vec{B}_I$ when the work is picked up is set to be parallel to the X-Z plane. In addition, the basic work vector $\vec{B}_{II}$ when the work is placed is set to be parallel to the Z-axis, and the storing vector $\vec{A}_{II}$ is set to be parallel to the X-Y plane. Therefore, when this work is picked up and placed, operations for pivoting the work about the Z-axis and then pivoting it about an $X_{II}$-axis are required.

As a result, as shown in FIG. 17, if it is determined in step S64 that the two angular parameters $\gamma_{II}$ and $\gamma_{III}$ coincide with each other, a selection state wherein the rotation module $M_3$ is attached to the upper portion of the reversing module $M_1$ is obtained as the result of judgement in step S66. After the result is obtained in step S66, this subroutine returns to the original basic control sequence.

If it is determined in step S64 that the two angular parameters $\gamma_{II}$ and $\gamma_{III}$ are not equal to each other, two rotation modules $M_3$ and one reversing module $M_1$ are required. In this state, for example, as shown in FIG. 18G, the storing vector $\vec{A}_I$ and $\vec{A}_{II}$ and the basic work vectors $\vec{B}_I$ and $\vec{B}_I$ upon picking up and placing of a work are parallel to neither of axes nor planes. Therefore, when the work is picked up and placed, operations for temporarily pivoting the work about the Z-axis, pivoting it about a $Y_I$-axis after rotation, and then pivoting the pivoted work about an $X_I$-axis after rotation are necessary.

As a result, as shown in FIG. 17, if it is determined in step S64 that the values of the two angular parameters $\gamma_{II}$ and $\gamma_{III}$ do not coincide with each other, a selection state wherein the rotation module $M_3$, the reversing module $M_1$, and the rotation module $M_3$ are attached downward is obtained as the result of judgement in step S68. After the result is obtained in step S68, this subroutine returns to the original basic control sequence.

Figure 13:
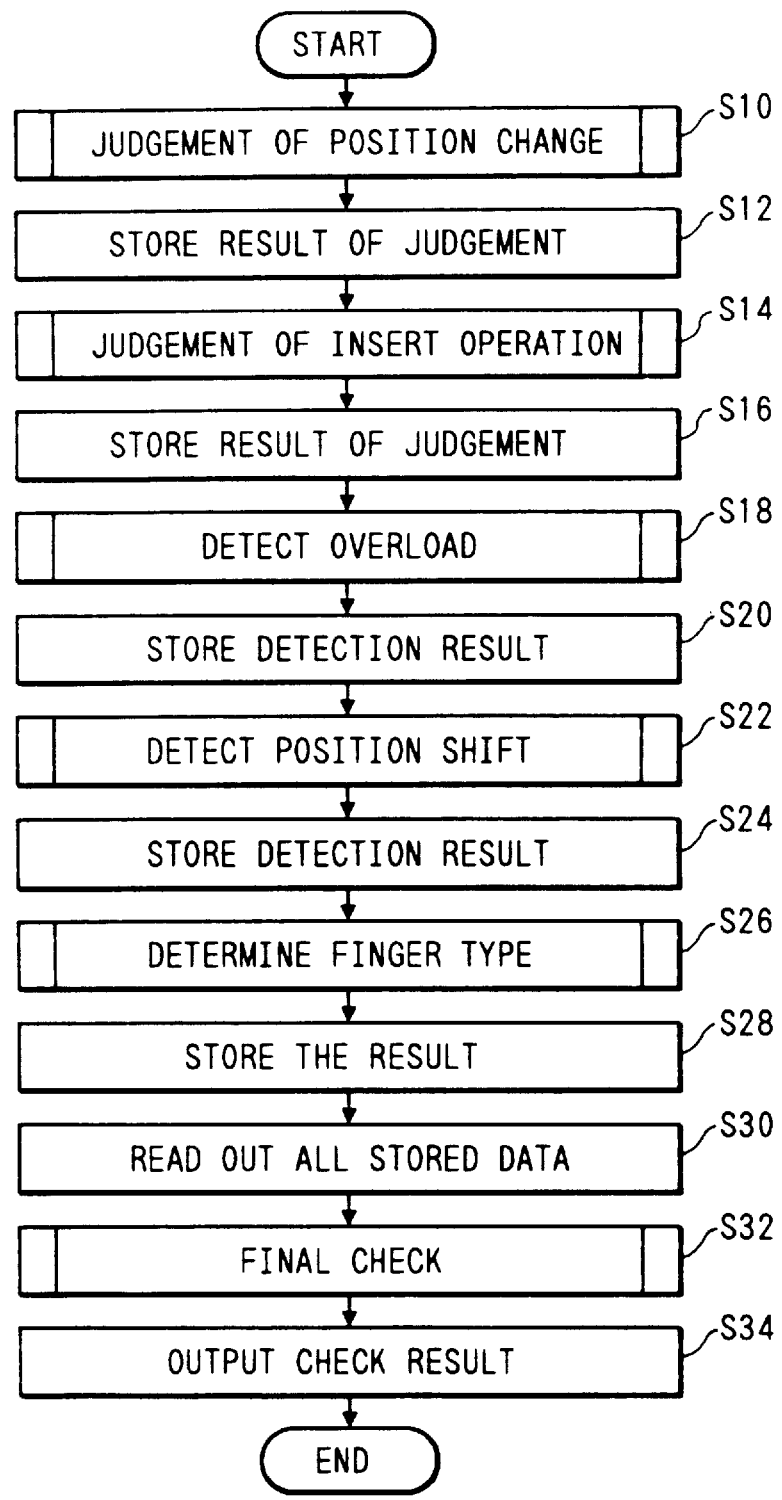
FIG. 13 is a flow chart showing a basic control sequence of selection control in the finger structure selection system.
Figure 14:
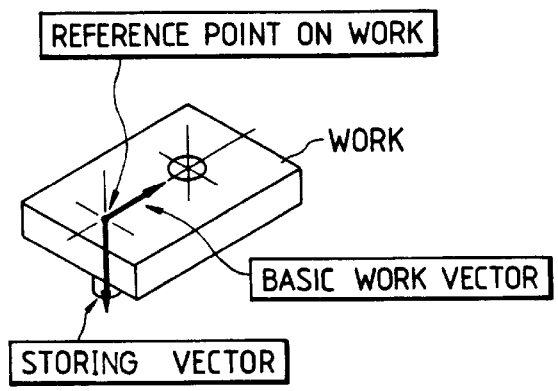
FIG. 14 is a perspective view showing definition states of a storing vector and a basic work vector.

As described above, the results of judgement of combinations of the reversing module $M_1$ and the rotation module $M_3$ required in correspondence with position changes of a work in steps S46, S48, S52, S54, S60, S62, S66, and S68 are stored in the RAM in step S12 after the control returns to the main routine shown in FIG. 13.

(Insert Operation Judgement Sequence)

A judgement operation associated with the presence/absence of an insertion operation upon loading (placing) of a work in step S14 shown in FIG. 13 will be described below with reference to FIG. 19.

Since the robot 12 having an orthogonal coordinate system shown in FIG. 2A normally comprises the Z-arm 20 moved along the Z-axis as the vertical axis, if the insert direction of a work is parallel to the Z-axis of the orthogonal coordinate system, the insert operation can be attained by the operation of the robot 12, and no shift module $M_2$ is required. On the other hand, when the insert direction of the work is inclined with respect to the Z-axis, if the insert operation is executed by the robot 12, the robot 12 must have a linear interpolation function, i.e., must be linearly moved between two arbitrary points. In this respect, the insert operation judgement sequence in step S14 will be described below.

When step S14 is started, as shown in FIG. 19, it is checked in step S70 if the robot 12 has the linear interpolation function. If YES in step S70, i.e., if the robot 12 has the linear interpolation function, since no shift module $M_2$ is required. Therefore, a selection state wherein no shift module $M_2$ is attached is obtained as the result of judgement in step S72. After the result is obtained in step S72, this subroutine returns to the main routine shown in FIG. 13.

If NO in step S70, that is, if the robot 12 has no linear interpolation function, it is checked in step S74 if the insert operation of a work is single axis drive. The "single axis" drive is a movement state defined when the insert operation of a work is parallel to one axis, i.e., one of the X-, Y-, and Z-axes of the orthogonal coordinate system of the robot 12.

If YES in step S74, i.e., if the insert operation of the work is the single axis drive, since no shift module $M_2$ is required, it is determined in step S72 that the shift module $M_2$ is not used, and this subroutine returns to the main routine shown in FIG. 13.

However, if NO in step S74, i.e., if the insert operation of the work is not the single axis drive but the insert direction is inclined with respect to the X-, Y-, or Z-axis of the robot coordinate system, it is determined in step S76 that the shift module $M_2$ is used, and this subroutine returns to the main routine shown in FIG. 13.

As described above, the result of judgement about use/nonuse of the shift module $M_2$ required in correspondence with the insert operation of a work in step S72 or S76 is stored in the RAM in step S16 after the control returns to the main routine shown in FIG. 13.

(Overload Judgement Sequence)

A judgement operation associated with the presence/absence of an overload upon placing of a work in step S18 in FIG. 13 will be described below with reference to FIG. 20.

When a press insert operation or patching operation is executed upon placing of a work, a countermeasure against an overload must be taken so as to prevent a counterforce in the press insert or patching operation from being directly transmitted to the robot 12 to adversely influence the driving system of the robot 12. In this respect, the overload operation judgement sequence in step S18 will be described below.

When step S18 is started, it is checked in step S78 if an overload state happens due to a press insert or patching operation upon placing. If NO in step S78, that is, if no overload state happens due to the press insert or patching operation, a selection state wherein no cushion module $M_4$ is attached is obtained as the result of judgement in step S80. After the result is obtained in step S80, this subroutine returns to the main routine shown in FIG. 13.

If NO in step S78, i.e., if an overload state happens due to the press insert or patching operation upon placing, it is determined in step S82 that the cushion module $M_4$ is used in order to absorb this overload state. This subroutine then returns to the main routine shown in FIG. 13.

As described above, the result of judgement about use/nonuse of the cushion module $M_4$ required in correspondence with the insert operation of a work in step S80 or S82 is stored in the RAM in step S20 after the control returns to the main routine shown in FIG. 13.

(Position Shift Judgement Sequence)

Figure 21A:
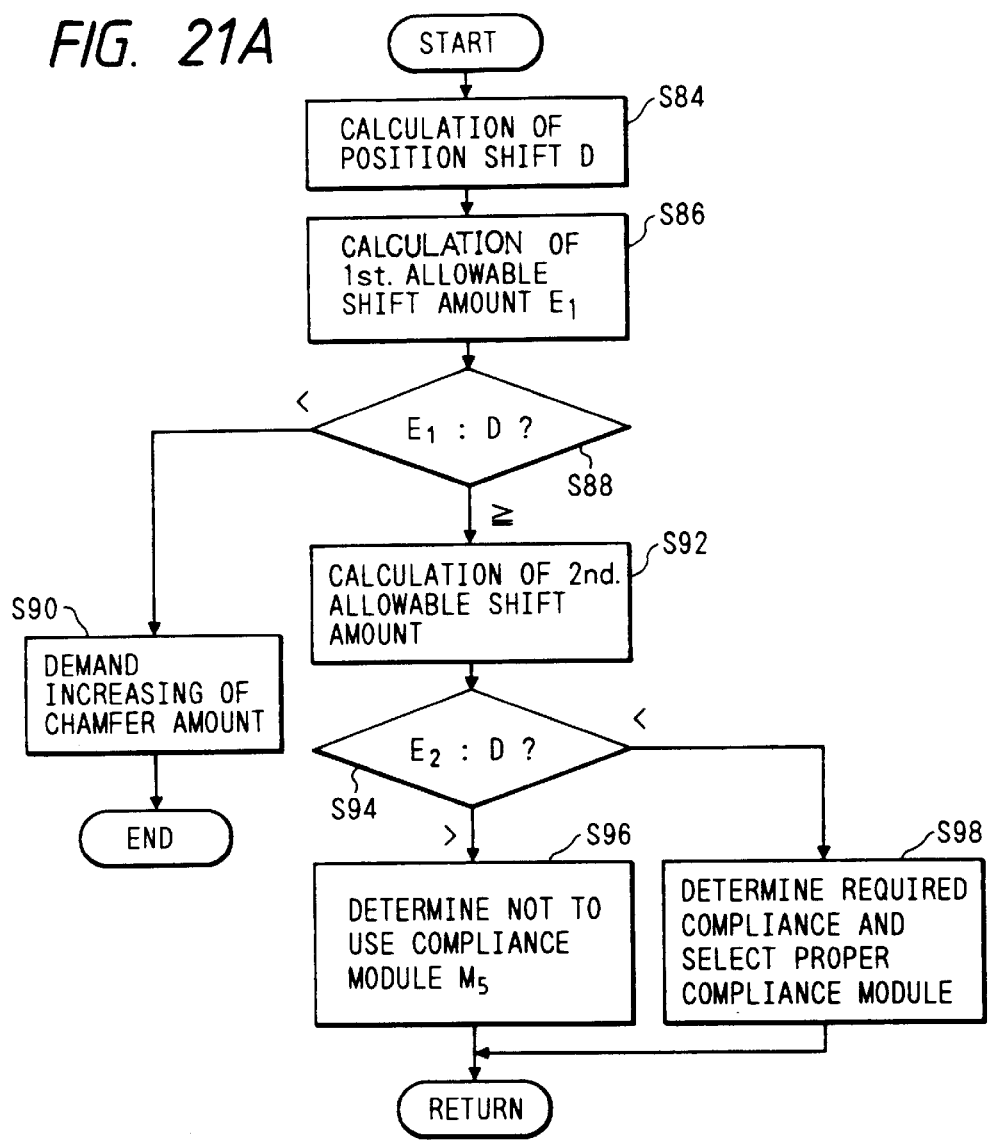
FIGS. 21A and 21B are flow charts showing in detail a control sequence of judging a position shift in step S22 in FIG. 13 as a subroutine.

A judgement operation associated with the presence/absence of a position shift upon placing of a work in step S22 shown in FIG. 13 will be described below with reference to FIGS. 21A and 21B.

When position shifts of a side for placing a work and a side on which the work is to be placed are accumulated during a placing operation of a work, and when the position shift exceeds an allowance, a placing error occurs. In order to prevent an adverse influence on the driving system of the robot 12 caused by the loading error, a compliance countermeasure must be taken. In this respect, the position shift judgement sequence in step S22 will be described below.

When step S22 is started, a position shift D of works is calculated on the basis of the size and tolerance of works, and performance of an apparatus such as repeatability of the robot. Upon repetitive calculations of this probability, in this embodiment, not a worst value method but a discrete addition theorem is used for first and second allowable shift amounts and a compliance amount F, and the calculation result is calculated as a two-dimensional area.

Figure 21B:
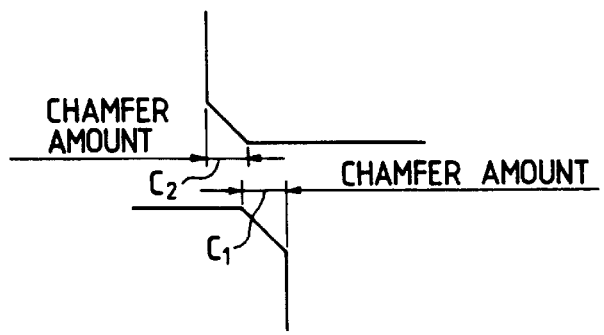

In step S86, a first allowable shift amount $E_1 = C_1 + C_2$ is calculated as a sum of chamfer amounts $C_1$ and $C_2$ of works shown in FIG. 21B.

In step S88, the position shift D is compared with the first allowable shift amount $E_1$. When the position shift D is larger than the first allowable shift amount $E_1$, this means that the position shift is too large to engage the chamfered portions with each other. In this case, the result of judgement indicating that it is impossible to load a work with any compliance amount is obtained.

Upon comparison between the position shift D and the first allowable shift amount $E_1$, in this embodiment, when an area of the position shift D is entirely included in an area of the first allowable shift amount $E_1$, it is determined that the first allowable shift amount $E_1$ is larger than the position shift D. The same applies to comparison in step S94 (to be described later).

If it is determined in step S88 that it is impossible to load a work, a demand for increasing the chamfer amount is displayed on the display unit 206, and a series of control operations are completed.

If it is determined in step S88 that the position shift D is smaller than the first allowable shift amount $E_1$, the chamfered portions of works can engage with each other, and the compliance function can be effective. The flow then advances to step S92 to calculate a second allowable shift amount $E_2$ and a compliance amount. When two works are assembled, they cannot be assembled unless there is a gap between the two works. The second allowable shift amount here means this gap. Therefore, when a plurality of works are stacked, the allowable shift amounts are also accumulated.

In step S94, the position shift D is compared with the second allowable shift amount $E_2$. If the position shift D is smaller than the second allowable shift amount, the position shift can be absorbed by only a gap between works without additionally using the compliance module $M_5$. Therefore, the result of judgement indicating that no compliance module $M_5$ is attached is obtained in step S96. After the result of judgement is obtained in step S96, this subroutine returns to the main routine shown in FIG. 13.

If it is determined in step S94 that the position shift D is larger than the second allowable shift amount $E_2$, since the position shift cannot be absorbed by only the gap between works, it is determined that the compliance module $M_5$ is necessary. Therefore, the flow advances to step S98 to calculate a required compliance amount F and to select a proper compliance module. The required compliance amount F is obtained by subtracting the second allowable shift amount $E_2$ from the position shift D. A proper compliance module is selected from a series of some compliance modules using the required compliance amount F as a parameter. In this case, a compliance module having a minimum compliance amount larger than the required compliance amount is selected.

After the compliance module is selected in step S98, the flow returns to the main routine.

(Finger Type Judgement Sequence)

A judgement operation of an optimal finger type in pickup and placing operations of a work in step S26 shown in FIG. 13 will be described below with reference to FIG. 22.

When a work is picked up and placed, in this embodiment, a total of six different finger modules $M_{6A}$ to $M_{6F}$ are prepared as the finger module $M_6$ regardless of types of clampers, as shown in FIGS. 3A to 3F. As described above, of the six different finger modules $M_{6A}$ to $M_{6F}$, each of the first to fourth finger modules $M_{6A}$ to $M_{6D}$ as mechanical clamping modules can choose one of two types of clampers, i.e., side clampers and scoop clampers. As a result, there are a total of eight types of finger modules as a result of combinations of mechanical clamping modules. An optimal finger module can be selected from a total of ten types of finger modules, i.e., eight types of mechanical clamping finger modules and two types of vacuum finger modules $M_{6E}$ and $M_{6F}$.

When step S26 is started, various data associated with a work category are read from the work data control system in step S100. In step S102, an optimal clamp pattern is selected from side, scoop, and vacuum clamp patterns on the basis of the work category data including a shape pattern. Step S102 will be described in detail later with reference to FIGS. 23A to 23C.

If it is determined in step S102 that the side clamp pattern is the optimal clamp pattern, clampers for the side clamp pattern are selected in step S104. On the other hand, if it is determined in step S102 that the scoop clamp pattern is the optimal clamp pattern, clampers for the scoop clamp pattern are selected in step S106.

Figure 24:
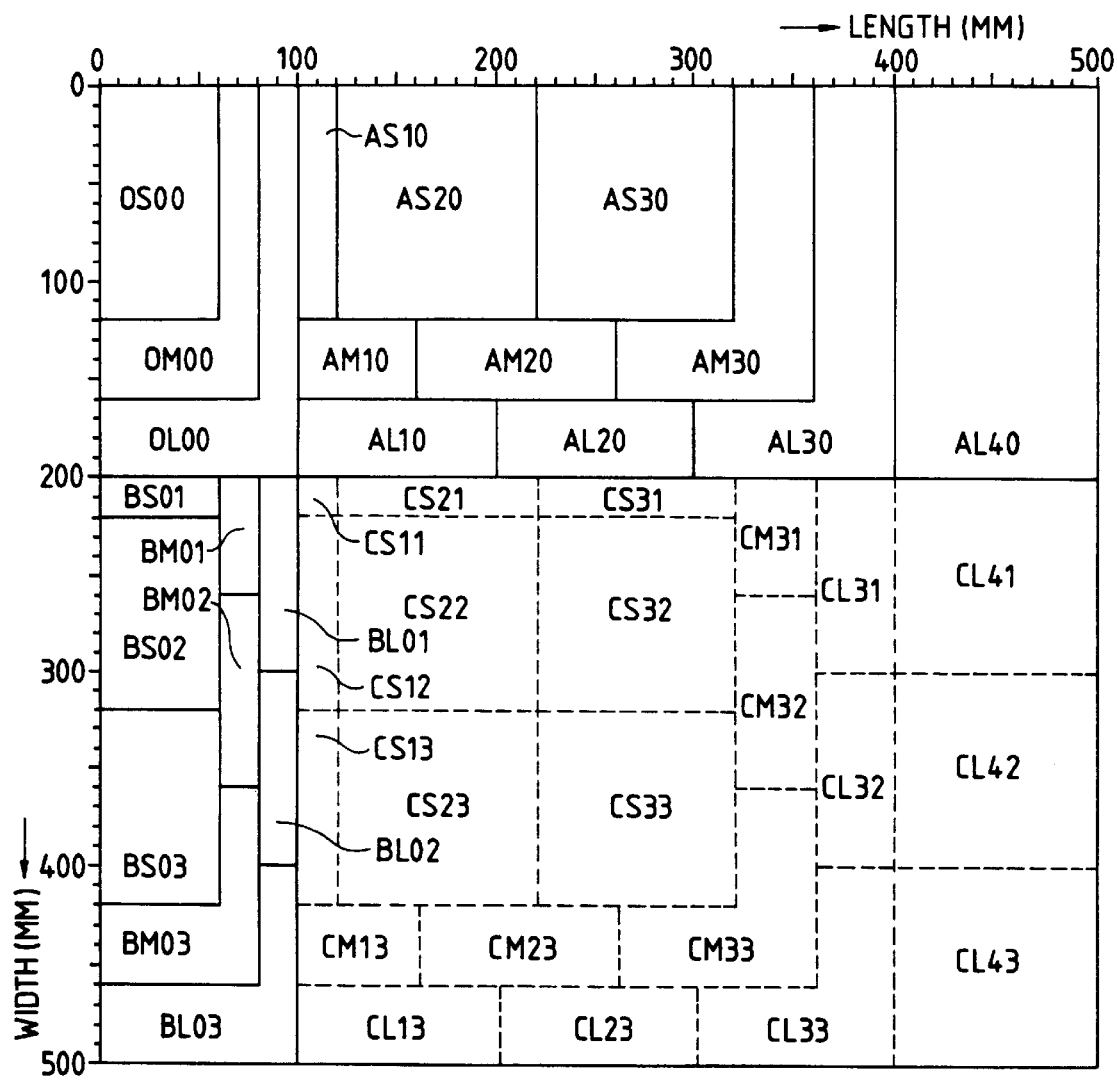
FIG. 24 shows a selection matrix used in step S108 in FIG. 22.

After the clampers are selected in step S104 or S106 according to the clamp pattern, the type of finger module is retrieved based on a selection matrix shown in FIG. 24 in accordance with the shape pattern of the work category data. The retrieval content in step S108 will be described in detail later.

If it is determined in step S108 that a work to be clamped is small, the first finger module $M_{6A}$ shown in FIG. 3A is selected in step S110. If it is determined in step S108 that a work to be clamped has a long length, the second finger module $M_{6B}$ shown in FIG. 3B is selected in step S112. If it is determined in step S108 that a work to be clamped has an elongated shape, the third finger module $M_{6C}$ shown in FIG. 3C is selected in step S114. If it is determined in step S108 that a work to be clamped is large, the fourth finger module shown in FIG. 4D is selected in step S116.

In this manner, in steps S110 to S116, one of the first to fourth finger modules $M_{6A}$ to $M_{6D}$ is selected, and this subroutine returns to the original basic control sequence.

Meanwhile, if it is determined in step S102 that the optimal clamp pattern is the vacuum clamp pattern, an inclination level of a work surface, i.e., a surface to be chucked with respect to a horizontal plane is checked. If it is determined in step S118 that the inclination is large, more specifically, if it is determined that the inclination is larger than a predetermined reference value, the finger module $M_{6E}$ shown in FIG. 3E is selected in step S120, and this subroutine returns to the original basic control sequence.

If it is determined in step S118 that the inclination is small, more specifically, if it is determined that the inclination is smaller than the predetermined reference value to include a horizontal state, the sixth finger module $M_{6F}$ shown in FIG. 3F is selected in step S122, and this subroutine returns to the original basic control sequence.

The result of judgement associated with selection of the finger module $M_6$ required in correspondence with the clamp operation of a work in step S110, S112, S114, S116, S120, or S122 is stored in the RAM in step S28 after the control returns to the main routine in FIG. 13.

{Detailed Description of Step S102}

A control sequence for selecting an optimal clamp pattern from the side, scoop, and vacuum clamp patterns of the finger modules $M_6$ when a work is clamped in step S102 in FIG. 22 will be described below with reference to FIGS. 23A to 23C and FIG. 25.

Figure 23A:
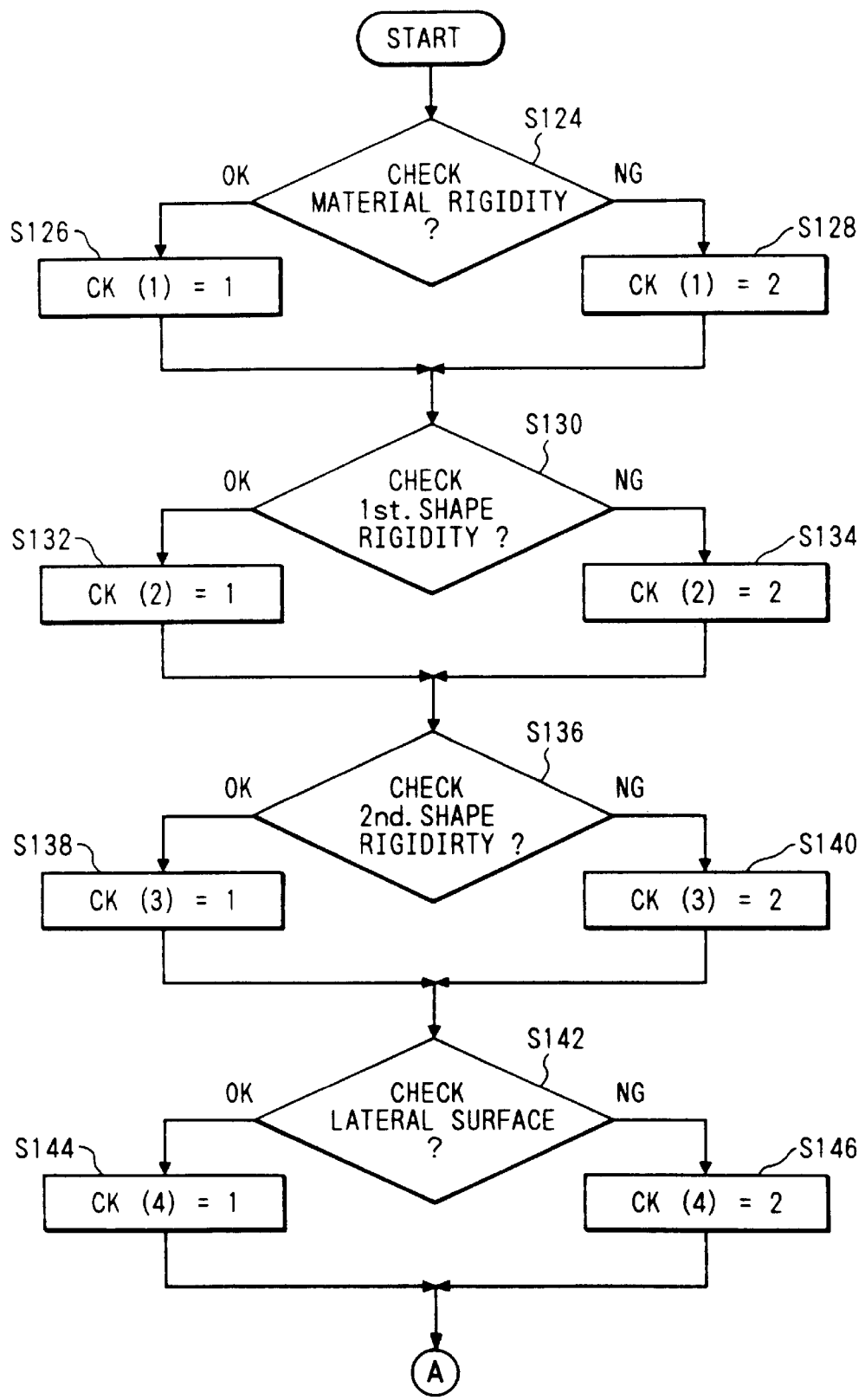
Figure 23B:
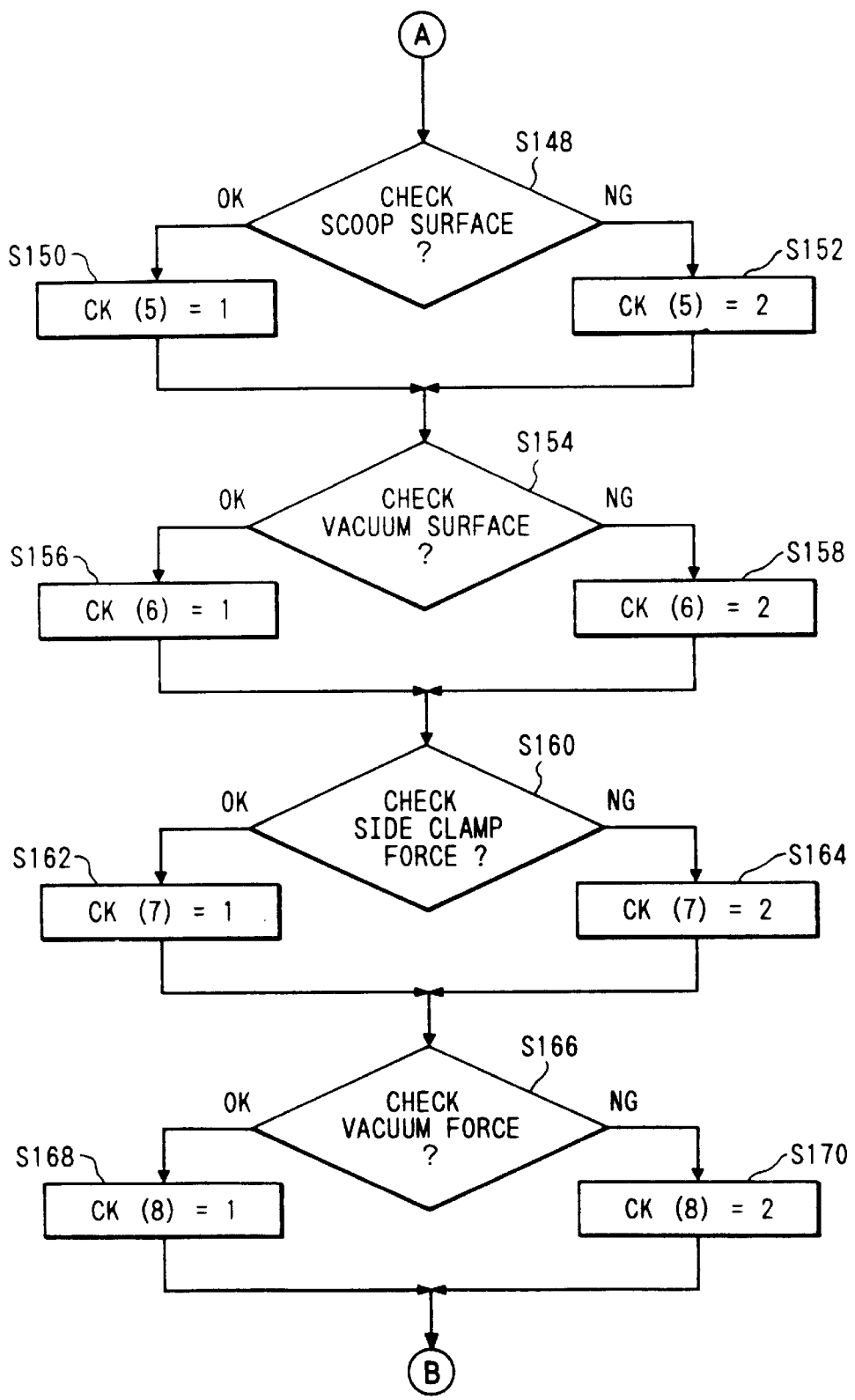

In this clamp pattern selection control sequence based on the work category data, a work having a specific work category is checked in terms of eight check items CK(i) {for i=1 to 8} shown in FIGS. 23A to 23C, and an OK/NG state is determined for each check item. For these check items, an OK table TBL(1,j) {for j=1 to 3}, and an NG table TBL(2,j) {for j=1 to 3} are prepared common to all the works, as shown in upper right and lower right portions in FIG. 25. In this case, j=1 indicates side clamp, j=2 indicates scoop clamp, and j=3 indicates vacuum clamp.

If an OK state is determined in each check operation in the following control sequence, OK data is transferred from the OK table for the corresponding check item; and if an NG state is determined, NG data is transferred from the NG table for the corresponding check item. In this manner, a check table CHK(i,j) {for i=1 to 8, j=1 to 3) is created in units of check items, as shown in the lower left portion of FIG. 25, for a specific work shown in the upper left portion in FIG. 25.

The clamp pattern selection control sequence will be described below with reference to FIGS. 23A to 23C. The following description will be made while creating the check table shown in the lower left portion in FIG. 25 as an example when the present invention is applied to the specific work shown in the upper left portion in FIG. 25.

When step S102 is started, material rigidity, i.e., an elastic coefficient of a work as one of rigidity checks of a work is checked as the first check item in step S124. If it is determined in step S124 that the elastic coefficient of the work is equal to or larger than a predetermined value, it is determined that the material rigidity is OK; otherwise, it is determined that the material rigidity is NG. If OK is determined in step S124, "1" indicating the result of judgement "OK" is set in CK(1) indicating the first check item in step S126. On the other hand, if NG is determined in step S124, "2" indicating the result of judgement "NG" is set in CK(1) indicating the first check item in step S128.

Figures 25, 25A:
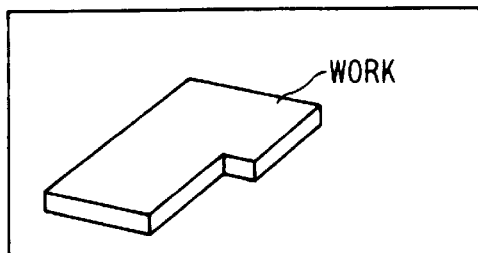

In the work shown in the upper left portion in FIG. 25, since the first check item CK(1) is determined as "OK", CK(1)=1 is set in step S126. As a result, in step S172 (to be executed later), "1", "1", and "1" are transferred from the first item of the OK table TBL(1,j) to the check table CHK(1,j).

When the check result of the first check item in step S126 or S128 is set in the check table, first shape rigidity, i.e., a thickness of a work as one of work rigidity checks is checked as the second check item in step S130. If it is determined in step S130 that the thickness of the work is equal to or larger than a predetermined value, it is determined that the first shape rigidity is OK; otherwise, it is determined that the first shape rigidity is NG. If OK is determined in step S130, "1" indicating the result of judgement "OK" is set in CK(2) indicating the second check item in step S132. On the other hand, if NG is determined in step S130, "2" indicating the result of judgement "NG" is set in CK(2) indicating the second check item in step S134.

In the work shown in the upper left portion in FIG. 25, since the second check item CK(2) is determined as OK, CK(2)=1 is set in step S132. As a result, in step S172 to be executed later, "1", "1", and "1" are transferred from the second item of the OK check table TBL(1,j) to the check table CHK(2,j).

When the check result of the second check item in step S132 or S134 is set in the check table, a second shape rigidity, i.e., a thickness ratio of a work as one of the work rigidity checks is checked as the third check item in step S136. The work thickness ratio is defined by a value expressed by l/t when the length of a work along the clamping direction is represented by l and the thickness of the work is represented by $\underline{t}$.

If it is determined in step S130 that the work thickness ratio l/t is equal to or larger than a predetermined value, it is determined that the second shape rigidity is OK; otherwise, it is determined that the second shape rigidity is NG. If OK is determined in step S136, "1" indicating the result of judgement "OK" is set in CK(3) indicating the third check item in step S138. On the other hand, if NG is determined in step S136, "2" indicating the result of judgement "NG" is set in CK(3) indicating the third check item in step S140.

In the work shown in the upper left portion of FIG. 25, since the third check item CK(3) is determined as NG, CK(3)=2 is set in step S140. As a result, in step S172 to be executed later, "0", "1", and "1" are transferred from the third item of the NG table TBL(2,j) to the check table CHK(3,J).

When the check result of the third check item in step S138 or S140 is set in the check table, a lateral surface of a work as one of clamp surface checks of a work is checked as the fourth check item in step S142. In step S142, a total of three conditions, i.e., ($a_1$) the work lateral surface is a contactable surface for clampers in terms of quality, ($a_2$) a gap exceeding a predetermined value is defined between lateral surfaces of adjacent works when a work is picked up and placed, and ($a_3$) lateral surface portions which at least a pair of dampers contact oppose and parallel to each other, are checked. When these three conditions are satisfied at the same time, it is determined that the lateral surface check is OK. However, when at least one condition is not satisfied, it is determined that the lateral surface check is NG.

If OK is determined in step S142, "1" indicating the result of judgement "OK" is set in CK(4) indicating the fourth check item in step S144. On the other hand, if NG is determined in step S142, "2" indicating the result of judgement "NG" is set in CK(4) indicating the fourth check item in step S146.

In the work shown in the upper left portion of FIG. 25, since the fourth check item CK(4) is determined as OK, CK(4)=1 is set in step S144. As a result, in step S172 to be executed later, "1", "1", and "1" are transferred from the fourth item of the OK table TBL(1,j) to the check table CHK(4,j).

When the check result of the fourth check item in step S144 or S146 is set in the check table, a scoop surface of a work as one of clamp surface checks of a work is checked as the fifth check item in step S148. In step S148, a lower surface scoop check and a side pin insert scoop check are performed as the scoop surface checks.

In the lower surface scoop check, a total of two conditions, i.e., ($b_1$) the lower surface of the work is a contactable surface for dampers in terms of quality and ($b_2$) a gap exceeding a predetermined value is defined between lower surfaces of adjacent works when a work is picked up and placed, are checked. When these two conditions are satisfied at the same time, it is determined that the lower surface scoop check is OK. However, when at least one condition is not satisfied, it is determined that the lower surface scoop check is NG.

On the other hand, in the side pin insert scoop check, a total of three conditions, i.e., ($c_1$) a pin or hole free from a quality problem is formed on or in the lateral surface of a work, ($c_2$) at least one parallel pin or hole is formed on or in each of opposing lateral surface portions, and ($c_3$) a gap exceeding a predetermined value is defined between lateral surfaces of adjacent works when a work is picked up and placed, are checked. When these three conditions are simultaneously satisfied, it is determined that the side pin insert scoop check is OK. However, when at least one condition is not satisfied, it is determined that the side pin insert scoop check is NG.

When one of the lower surface scoop check and the side pin insert scoop check is OK, it is determined that the scoop surface check is OK.

If OK is determined in step S148, "1" indicating the result of judgement "OK" is set in CK(5) indicating the fifth check item in step S150. On the other hand, if NG is determined in step S148, "2" indicating the result of judgement "NG" is set in CK(5) indicating the fifth check item in step S152.

In the work shown in the upper left portion of FIG. 25, since the fifth check item CK(5) is determined as OK, CK(5)=1 is set in step S150. As a result, in step S172 to be executed later, "1", "1", and "1" are transferred from the fifth item of the OK table TBL(1,j) to the check table CHK(5,j).

When the check result of the fifth check item in step S150 or S152 is set in the check table, a vacuum surface of a work defined by the upper surface of the work as one of clamp surface checks of a work is checked as the sixth check item in step S154. In step S154, a total of two conditions, i.e., ($d_1$) the upper surface of the work is a contactable surface for vacuum pads in terms of quality, and ($d_2$) the surface roughness of the upper surface of the work is equal to or lower than a predetermined value, are checked. When these two conditions are satisfied at the same time, it is determined that the vacuum surface check is OK. However, when at least one condition is not satisfied, it is determined that the vacuum surface check is NG.

If OK is determined in step S154, "1" indicating the result of judgement "OK" is set in CK(6) indicating the sixth check item in step S156. On the other hand, if NG is determined in step S154, "2" indicating the result of judgement "NG" is set in CK(6) indicating the sixth check item in step S158.

In the work shown in the upper left portion of FIG. 25, since the sixth check item CK(6) is determined as OK, CK(6)=1 is set in step S158. As a result, in step S172 to be executed later, "1", "1", and "1" are transferred from the sixth item of the OK table TBL(1,j) to the check table CHK(6,j).

When the check result of the sixth check item in step S156 or S158 is set in the check table, a side clamp force of a work as one of side clamp force checks of a work is checked as the seventh check item in step S160. If it is determined in step S160 that a side clamp force defined by W/$\mu$F {where W; work weight, F; clamp force, $\mu$; coefficient of friction} is equal to or larger than a predetermined value, it is determined that the side clamp force check is OK; otherwise, it is determined that the side clamp force check is NG.

If OK is determined in step S160, "1" indicating the result of judgement "OK" is set in CK(7) indicating the seventh check item in step S162. On the other hand, if NG is determined in step S160, "2" indicating the result of judgement "NG" is set in CK(7) indicating the seventh check item in step S164.

In the work shown in the upper left portion of FIG. 25, since the seventh check item CK(7) is determined as NG, CK(7)=2 is set in step S164. As a result, in step S172 to be executed later, "0", "1", and "1" are transferred from the seventh item of the NG table TBL(2,j) to the check table CHK(7,j).

When the check result of the seventh check item in step S162 or S164 is set in the check table, a side vacuum force of a work as one of side clamp force checks of a work is checked as the eighth check item in step S166. In step S166, two conditions, i.e., ($e_1$) the upper surface of a work is not a porous surface, and ($e_2$) a vacuum force defined by W/PA {where P; vacuum force, A; vacuum area} is equal to or larger than a predetermined value, are checked. When these two conditions are satisfied at the same time, it is determined that the vacuum force check is OK. However, when at least one condition is not satisfied, it is determined that the vacuum force check is NG.

If OK is determined in step S166, "1" indicating the result of judgement "OK" is set in CK(8) indicating the eighth check item in step S168. On the other hand, if NG is determined in step S166, "2" indicating the result of judgement "NG" is set in CK(8) indicating the eighth check item in step S170.

In the work shown in the upper left portion of FIG. 25, since the eighth check item CK(8) is determined as OK, CK(8)=1 is set in step S168. As a result, in step S172 to be executed later, "1", "1", and "1" are transferred from the eighth item of the OK table TBL(1,j) to the check table CHK(8,j).

When the check result of the eighth check item in step S168 or S170 is set in the check table CHK, corresponding "1" and "0" are transferred from the OK table TBL(1,j) or the NG table TBL(2,j) to the first to eighth check items (i.e., i=1 to 8) of the check table CHK(i,j) in step S172, as described above, thereby completing the check table CHK, as shown in, e.g., FIG. 25.

After the check table CHK is completed in this manner, an OK/NG code NOKNG(j) is calculated using equation (1) as the first equation in step S174.

$$NOKNG(j) = CHK(1,j)*CHK(2,j) \\ *CHK(3,j)*CHK(4,j) \\ *CHK(5,j)*CHK(6,j) \\ *CHK(7,j)*CHK(8,j) \quad (1)$$

{for j = 1 to 3}

In equation (1), numerical values in a column associated with the side clamp indicated by j=1 in the check table CHK(i,j) shown in the lower left portion in FIG. 25 are multiplied with each other, and the product is defined as the OK/NG code NOKNG(1) for the side clamp. Numerical values in a column associated with the scoop clamp indicated by j=2 are multiplied with each other, and the product is defined as the OK/NG code NOKNG(2) for the scoop clamp. Numerical values in a column associated with the vacuum clamp indicated by j=3 are multiplied with each other, and the product is defined as the OK/NG code NOKNG(3) for the vacuum clamp. In the work shown in the upper left portion in FIG. 25, NOKNG(j)="0", "1", and "1".

In this manner, after the OK/NG code NOKNG(j) is calculated in step S174, a design order code ND(j) is calculated using equation (2) as the first equation:

$$ND(j)=NOKNG(j)*NSEL(j) \ \{for\ j=1\ to\ 3\} \quad (2)$$

NSEL(j) is defined as a priority order code. Thus, "1" is uniquely set for the side clamp (j=1); "2", for the scoop clamp (j=2); and "3", for the vacuum clamp (j=3). These numerical values indicate the higher priority order of selection of the clamp pattern as their values are smaller. In other words, in this embodiment, when any clamp pattern can be selected, on the basis of the priority order code NSEL(j), the side clamp is selected first, the scoop clamp is selected next, and the vacuum clamp is selected last.

In equation (2), the priority order code NSEL(j) is multiplied with the OK/NG code NOKNG(j) already calculated in step S174, and the product is defined as the design order code ND(j). As shown in the check table CHK(i,j) in the lower left portion of FIG. 25, in the work shown in the upper left portion of FIG. 25, the design order code ND(1) for the side clamp (j=1) is "0", the design order code ND(2) for the scoop clamp (j=2) is "2", and the design order code ND(3) for the vacuum clamp (j=3) is "3".

After the design order codes ND(j) are calculated in step S176, the optimal clamp pattern in this control sequence is selected based on the calculated design order codes ND(j). More specifically, in the calculated design order codes ND(j), the clamp pattern having the result of "0" is determined as NG in at least one check item. Thus, this pattern is excluded, and a clamp pattern having a minimum natural number among the calculated results is selected as an optimal clamp pattern. According to this sequence, in the work shown in the upper left portion of FIG. 25, ND(j) for the side clamp is "0", ND(j) for the scoop clamp is "2", and ND(j) for the vacuum clamp is "3". Therefore, the result of judgement indicating that the work is optimally clamped by the scoop clamp is obtained based on the above-mentioned selection standards.

Figure 22:
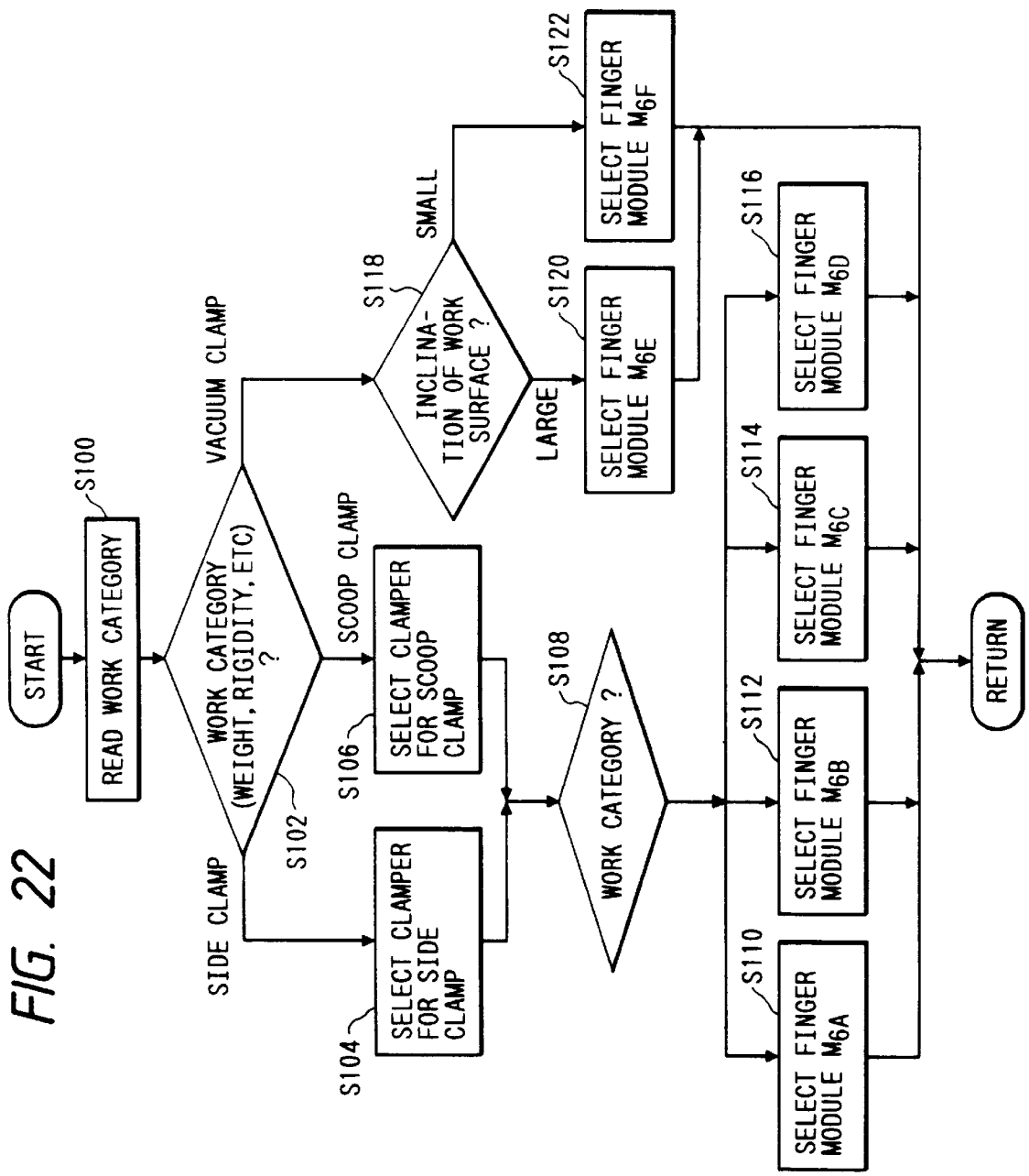
FIG. 22 is a flow chart showing in detail a control sequence of judging a finger type in step S26 in FIG. 13 as a subroutine.

After the optimal clamp pattern is selected in step S178, the control sequence of the subroutine (i.e., step 102) is completed, and the flow returns to step S26 shown in FIG. 22 as the original subroutine.

{Detailed Description of Step S108}

A control sequence for selecting an optimal finger module from four different finger modules $M_{6A}$ to $M_{6D}$ for mechanically clamping a work in step S108 in FIG. 22 will be described below with reference to FIG. 24.

In the plan view of a work to be clamped, when its upper left corner is positioned at a reference position defined by the upper left corner portion of a selection matrix shown in FIG. 24, the finger module can be uniquely determined based on a region where the lower right corner of the work is positioned.

More specifically, in this embodiment, the maximum size of a work to be clamped is set to be 500 mm in both a direction of length (horizontal direction in FIG. 24) and a direction of width (vertical direction in FIG. 24), and when the size of a work is changed within this range, a finger module can be reliably determined by the selection matrix shown in FIG. 24. In this selection matrix, an optimal finger module is determined by a combination code of four alphanumeric characters in the region where the lower right corner of the work is positioned. Note that the selection matrix is stored in advance in the ROM described above.

In a combination code of the four alphanumeric characters, the left end character is selected from four letters "O", "A", "B", and "C", and indicates the type of finger module to be used. More specifically, "O" indicates use of the first finger module $M_{6A}$ shown in FIG. 3A; "A", the second finger module $M_{6B}$ shown in FIG. 3B; "B", the third finger module $M_{6C}$ shown in FIG. 3C; and "C", the fourth finger module $M_{6D}$ shown in FIG. 3D.

The second left character in the combination code of the four alphanumeric characters is selected from three letters "S", "M", and "L", and indicates the size of a finger module. More specifically, "S" indicates a small size in various types of finger modules; "M", a medium size; and "L", a large size.

The second right character in the combination code of the four alphanumeric characters is selected from five numerals "0", "1", "2", "3", and "4", and indicates a length of a work to be clamped. More specifically, "0" indicates that the length of a work to be clamped is not more than 100 mm; "1", the length falls within the range of 100 to 200 mm; "2", the length falls within the range of 120 to 300 mm; "3", within a range of 220 to 400 mm; and "4", the length falls within the range of 400 to 500 mm.

The right end character of the combination code of the four alphanumeric characters is selected from four numerals "0", "1", "2", and "3", and indicates a width of a work to be clamped. More specifically, "0" indicates that the width of a work to be clamped is not more than 200 mm; "1", the width falls within the range of 200 to 300 mm; "2", the width falls within the range of 160 to 400 mm; and "3", the width falls within the range of 320 to 500 mm.

In this manner, in step S108, the mechanical clamp finger structures can be easily classified using the selection matrix shown in FIG. 24.

The finger type judgement sequence in step S26 in FIG. 13 is executed as shown in FIG. 22. When the control sequence as the subroutine shown in FIG. 22 is completed, the flow returns to the original basic control sequence, and the result of judgement in step S26 is stored in the RAM in step S28.

(Final Check Sequence)

The final check sequence associated with a combination state of modules selected based on all the results of judgement in step S32 in FIG. 13 will be described below with reference to FIGS. 26 and 27.

Figure 26:
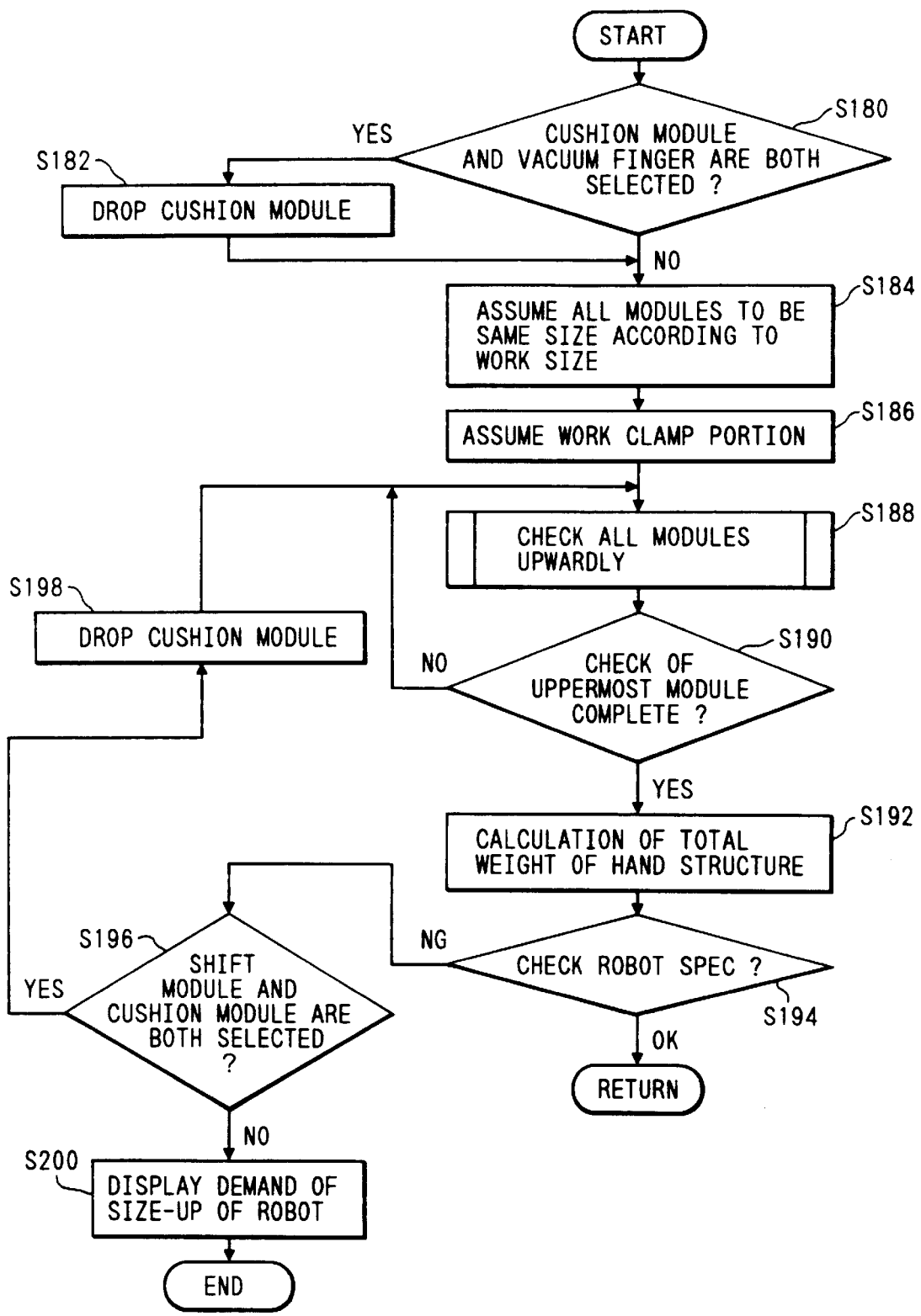
FIGS. 26 and 27 are flow charts showing a control sequence of final check in step S32 shown in FIG. 13.
Figure 27:
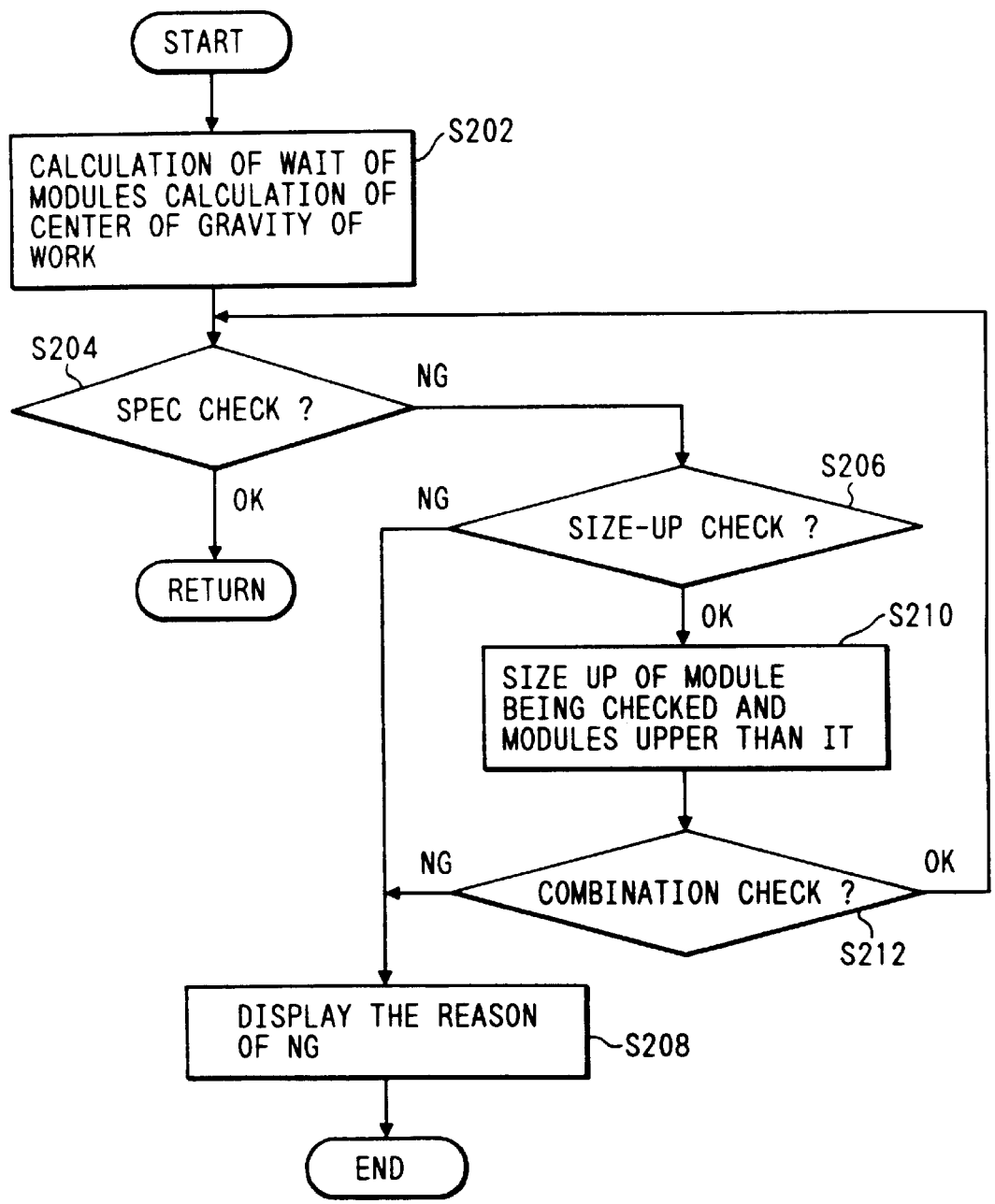

In this final check control sequence, as shown in FIG. 26, it is checked in step S180 if all the selected modules include the cushion module $M_4$ and the vacuum finger module $M_{6E}$ or $M_{6F}$ of the finger modules $M_6$. If YES in step S180, the cushion module $M_4$ is dropped from the selection content to reduce the total weight of the hand structure 10 in step S182. Note that even when the cushion module is dropped in this manner, no problem is posed since the remaining vacuum finger module $M_{6E}$ or $M_{6F}$ has a cushion function.

After step S182 is executed, or if NO in step S180, all the selected modules are assumed to have the same size according to the size of a work to be clamped. For example, when a work to be clamped has the S size, all the selected modules are assumed to have the S size. In step S186, a clamp position of a work clamped by the finger module $M_6$ whose size is assumed is assumed. In this clamp position assumption operation, the position of the center of gravity of a clamped work is simultaneously calculated.

In this manner, in step S186, after the work clamp position is assumed based on the assumed size of the work, specifications of all the selected modules are checked upwardly in step S188. Since the finger module $M_6$ is always attached to the lowermost end of the hand structure 10, the specifications of the finger module $M_6$ are checked first. Note that "spec" check of the modules will be described in detail later as a subroutine with reference to FIG. 27.

When the spec check operations of a predetermined module are completed in step S188, it is judged in step S190 if the checked module is the uppermost module. If NO in step S190, the flow returns to step S188 to check the spec check operation of the module immediately above the module previously checked in step S188. If YES in step S190, i.e., if it is determined that the spec check operation of the uppermost module is completed, this means that the spec check operations of all the selected modules are completed, and the flow advances to step S192. In step S192, the total weight W of the hand structure 10 comprising all the selected modules is calculated.

In step S194, the spec check operation of the robot 12 is executed. In the spec check operation of the robot, it is checked if the total weight of the hand structure 10 calculated in step S192 falls within an allowable range in terms of a maximum allowable load of the robot 12. If it is determined in step S194 that the check content is OK, i.e., if it is determined that the weight of the hand structure 10 is smaller than the maximum allowable load of the robot 12, and the robot can satisfactorily move the hand structure 10 selected by the hand selection system 200, the final check operation is completed, and the flow returns to the main routine shown in FIG. 13.

If it is determined in step S194 that the check content is NG, i.e., if it is determined that the weight of the hand structure 10 exceeds the maximum allowable load of the robot 12, the flow advances to step S196 to check if both the shift module $M_2$ and the cushion module $M_4$ are selected. If YES in step S196, i.e., if both the shift module $M_2$ and the cushion module $M_4$ are selected, the cushion module $M_4$ is dropped from the selection content in terms of duplication of functions in step S198. Thereafter, the flow jumps to step S188 to sequentially execute the spec check operations of all the selected modules upwardly based on the selection result from which the cushion module $M_4$ is dropped. Then, the above-mentioned control sequence is repeated again.

If NO in step S196, i.e., if it is determined that either of the shift module $M_2$ or the cushion module $M_4$ is not selected, there is no module to be dropped from the selection content, and the weight of the hand structure 10 cannot be reduced. Therefore, the flow advances to step S200, and information indicating demand of size-up is displayed on the display unit 206 to increase the maximum allowable load of the robot 12, thus ending the control sequence.

In this manner, the final check sequence in step S32 in FIG. 13 is completed. Only when it is determined in step S194 that the check content is OK, the flow returns to the main routine, and the selection result of the selection sequence, i.e., the arrangement of the hand structure 10 as an optimal combination of modules for picking up and placing a work input through a keyboard 204 is displayed on the display unit 206 and/or the X-Y plotter 208 in step S34 in the main routine.

A spec check subroutine of the selected modules in step S188 will be described below with reference to FIGS. 27 and 28.

When step S188 described above is started, a total weight of combined modules to be checked and a work held by the finger module is calculated, and the center of gravity of the work is calculated in step S202. In step S204, the spec check operation of the module during checking is executed.

In step S204, the spec check operation of the module to be checked is executed on the basis of the weight and the center of gravity calculated in step S202. In this spec check operation, when the weight and the center of gravity fall within the allowable range with respect to specifications defined as a maximum allowable range such as a torque, a work range, and the like necessary for operating the module to be checked, OK is determined; otherwise, NG is determined.

Note that when the spec check operation of the finger module $M_6$ is executed in step S204, only the weight and the center of gravity of a work clamped by the module are calculated since there is no module coupled to the lower portion of this finger module $M_6$.

If OK is determined in step S204, the control sequence in this subroutine is ended, and the flow returns to the routine shown in FIG. 26.

If NG is determined in step S204, the flow advances to step S206 to check if it is possible to perform size-up of the module during checking. Basically, when NG is determined in the spec check operation in step S204, the sizes of the module and all the modules attached thereabove are increased by one rank. When size-up of the modules is performed to expand the maximum allowable range, the judgement result can be canceled (overruled). However, when the "L" size has already been assumed based on the size of a work in step S184, NG is determined in step S206 since no more size-up is available.

If NG is determined in step S206, i.e., if it is determined that the module size during checking is set to be "L", and the required specifications cannot be satisfied by size-up of the module, the NG content is displayed on the display unit 206 in step S208, and a series of control operations are completed.

If OK is determined in step S206, i.e., if it is determined that the module during checking has the "S" or "M" size, and size-up is possible, the flow advances to step S210, and the size-up operation for increasing the sizes of the corresponding module and the modules attached thereabove by one rank is executed. As a result, if the size of the module during checking is "S", its size is updated to "M"; if it is "M", the size is updated to "L".

Thereafter, the check operation is executed based on a combination check list shown in FIG. 28 in step S212 to check if the module during checking can be coupled to a module located immediately therebelow (to be simply referred to as a lower module hereinafter). In the combination check list shown in FIG. 28, a mark ⊙ indicates a possible combination pattern. In this combination check list, only a module of the same size can be coupled to the upper portion of the module during checking, but a module of the same or smaller size can be generally coupled to the lower portion.

The combination check list shown in FIG. 28 is prestored in the RAM, and is appropriately read out from the RAM upon execution of step S212.

If OK is determined in the combination check in step S212, the flow jumps to step S204, and the spec check operation of the size-up module whose combination state is determined as OK is restarted. When the combination check of the finger module $M_6$ limited to the lowermost position is performed in step S212, OK is determined without reading out the combination check list shown in FIG. 28 since no module is coupled to the lower surface of the finger module $M_6$, and the flow jumps to step S204.

If NG is determined in step S212, i.e., if it is determined that the combination state is impossible to achieve in the combination list, since the size-up module cannot constitute the hand structure 10, the flow jumps to step S208 to cause the display unit 206 to display the NG content, thus ending a series of control operations.

As described above, upon execution of the hand structure selection control sequence described above by the hand structure selection controller 202 in the hand selection control system 200, desired work data are input through the keyboard 204, and the arrangement of the hand structure 10 comprising an optimal combination of modules for picking up and placing the input work is automatically displayed on the display unit 206 and/or the X-Y plotter 208.

As a result, an operator checks the displayed content, and executes an instruction operation for the hand structure assembly controller 212 to assemble the hand structure 10 according to the displayed content unless the displayed content includes a specific error. The hand structure assembly robot 210 picks up modules selected by the above-mentioned selection control from the module storing station 214 on the basis of the instruction operation under the control of the hand structure assembly controller 212, and assembles the modules under the lower surface of the hand mounting plate 22 of the robot 12 in a predetermined order, thereby completing the entire hand structure 10 according to the selection result.

In this embodiment, an optimal hand structure 10 used when a variety of pickup and placing operations of a variety of works are to be executed can be automatically selected and assembled.

The hand structure assembly controller 212 may assemble the hand structure 10 under the lower surface of the hand mounting plate 22 via the hand structure assembly robot 210 in accordance with the content selected by the hand structure selection controller 202 without going through decisions of an operator.

The present invention is not limited to the arrangement of the above embodiment, and various changes and modifications may be made within the spirit and scope of the invention.

As described above, according to the present invention, a method of selecting a hand structure which comprises modules, which can be independently combined, for performing elementary operations such as rotational, reversing, shift, cushion, compliance, and work clamping operations so as to assemble at least two workpieces in a robot, comprises the first step of determining a basic vector for uniquely determining a position of a first workpiece at a pickup position with respect to an absolute coordinate system of the robot, and a storing vector for defining a pickup direction of the first workpiece, the second step of determining a storing vector for defining a placing direction of the first workpiece with respect to a second work located at a place position in the absolute coordinate system of the robot and a basic vector for uniquely defining a position of the second workpiece, the third step of judging the sameness between the basic vector and the storing vector when the first workpiece is picked up and the basic vector and the storing vector of the second workpiece when the first workpiece is placed on the second work upon loading the first workpiece with respect to the second work, and the fourth step of selecting the modules on the basis of the result of judgement in the third step.

In the method of selecting the hand structure for the robot according to the present invention, the modules are selected from the rotation module and the reversing module in the fourth step in order to change a position of the first workpiece.

In the method of selecting the hand structure for the robot, in the third step, vector components of the storing vector on two, i.e., pickup and placing reference planes in the absolute coordinate system are compared with each other to judge the necessity of the reversing module and the rotation module.

Therefore, according to the present invention, there is provided a method of selecting a hand structure for a robot, which can select an optimal combination of a plurality of modules for performing a plurality of elementary operations to clamp and assemble an arbitrary workpiece.

What is claimed is:

1. A robot for picking up a workpiece in a first location and conveying the workpiece to a second location by changing its position and posture, said robot having a central axis and comprising:

a finger module for picking up the workpiece;

a reversing module operably engaged to said finger module for changing a position of said finger module about an axis transverse to a central axis of said finger module; and means for determining whether said reversing module needs to be mounted on said robot or not, said determining means making the determination on the basis of at least a storing vector extending from a predetermined origin position of the workpiece in the first location, along which the workpiece is to be moved when the workpiece is conveyed to the second location, and a storing vector extending from the origin position of the workpiece in the second location, along which the workpiece conveyed to the second location is to be moved.

2. A hand structure, comprising:

a mounting member for mounting the hand structure;

finger means for picking up a first workpiece;

rotational means for rotating a position of said finger means about a central axis;

first means for defining a vector of the first workpiece, said first means determining a basic vector for defining a position and a posture of the first workpiece located at a pickup position and a storing vector for defining an assembling direction of the first workpiece located at the pickup position, along which the first workpiece is to be moved to be assembled to a second workpiece located at an assembling position when the first workpiece is moved to the assembling position by said finger means, the basic vector and the storing vector being defined in an absolute coordinate system;

second means for defining a vector of the second workpiece, said second means determining a basic vector for defining a position and a posture of the second workpiece located at the assembling position and a storing vector for defining an assembling direction of the first workpiece located at the assembling position, along which the first workpiece moved to the assembling position is to be moved to be assembled to the second workpiece located at the assembling position, the basic vector and the storing vector being defined in the absolute coordinate system;

judging means for judging a difference between each of the basic vector and the storing vector of the first workpiece at the pickup position and each of the basic vector and the storing vector of the first workpiece at the assembling position; and means for selecting whether said rotational means should be mounted on said finger means on the basis of the difference as judged by said judging means.

3. A hand structure according to claim 2, further comprising:

reversing means for performing a reversing operation of the first workpiece; and means for determining whether either of said rotational means and said reversing means are to be mounted on the basis of at least the difference between the storing vector of the first workpiece at the pickup position and the storing vector of the first workpiece at the assembling position.

4. A hand structure for assembling at least first and second workpieces in a robot, comprising:

a plurality of independent modules which can be selectively combined with each other, said modules including a rotational module for performing a rotating operation, a reversing module for performing a reversing operation and a compliance module for performing a compliance operation;

first judging means for judging a position and a posture of the first workpiece located at a pickup position with respect to the second workpiece; and first means for selecting said rotational module and said reversing module on the basis of the position and the posture of the first workpiece with respect to the second workpiece as judged by said first judging means.

5. A hand structure according to claim 4, further comprising:

a shift module for performing a shift operation;

second judging means for judging whether a function for performing a linear interpolation is present in the robot; and second means for selecting said shift module when the function for performing a linear interpolation is judged to be not present in the robot by said second judging means.

6. A hand structure according to claim 5, further comprising:

third judging means for judging whether an insert operation, which is performed when the first and second workpieces are assembled, is of single axis drive, wherein said second means does not select said shift module when the insert operation is of single axis drive.

7. A hand structure according to claim 5, further comprising:

a cushion module for performing a cushioning operation;

third judging means for judging an overload state at a time when the first workpiece is to be mounted on the second workpiece, in which a reactive force upon mounting the first workpiece on the second workpiece is greater than a predetermined value; and third means for selecting said cushion module when said third judging means judges the overload state.

8. A method of selecting a hand structure for assembling at least first and second workpieces in a robot having a central axis, the hand structure including a rotational module and a reversing module provided between a finger portion and an arm portion of the robot, with the rotational module rotating the finger portion about the central axis and the reversing module rotating the finger portion about an axis transverse to the central axis, wherein the rotational module and the reversing module can be provided in an optional order in the hand structure, said method comprising the steps of:

defining a position and a posture of the first workpiece at a pickup location and a position and a posture of the second workpiece at a place location;

determining whether or not the rotational module and the reversing module are required for changing the position and the posture of the first workpiece and assembling the first workpiece to the second workpiece on the basis of the position and the posture of the first workpiece in the pickup location and the position and the posture of the second workpiece in the place location; and determining a construction order of the rotational module and the reversing module in the hand structure on the basis of the position and the posture of the first workpiece in the pickup location and the position and the posture of the second workpiece in the place location.

9. A method according to claim 8, wherein said defining step includes a step of defining the position and the posture of the first workpiece in the pickup location by a basic vector extending from a predetermined origin position of the first workpiece at the pickup location and a storing vector, extending from the predetermined origin position of the first workpiece at the pickup location, for defining an assembling direction of the first workpiece located at the pickup location, along which the first workpiece is to be moved to be assembled to the second workpiece at the place location when the first workpiece is moved to the place location, a step of defining the position and the posture of the second workpiece in the place location by a basic vector extending from the predetermined origin position of the first workpiece at the place location and a storing vector, extending from the predetermined origin position of the first workpiece at the place location, for defining an assembling direction of the first workpiece located at the place location, along which the first workpiece is to be moved to be assembled to the second workpiece at the place location when the first workpiece is moved to the place location, and a step of transforming each of the positions and the postures of the first and second workpieces expressed by each of the two basic vectors and the two storing vectors to three angles of an absolute coordinate system, and determining the construction order and necessity of the rotational module and the reversing module on the basis of differences between the three angles of the two basic vectors and between the three angles of the two storing vectors of the absolute coordinate system as transformed in the step of transforming.

10. A method of selecting a hand structure for assembling at least first and second workpieces in a robot, the hand structure including a rotational module for performing a rotating operation, a reversing module for performing a reversing operation, a shift module for performing a shift operation, a cushion module for performing a cushioning operation, a compliance module for performing a compliance operation and a workpiece clamping module, with the workpiece clamping module positioned at a terminal end of the hand structure and the other modules positioned in an optional order between the workpiece clamping module and the robot, said method comprising steps of:

judging whether or not a function for performing a linear interpolation is present in the robot; and determining that the shift module is required to shift and assemble the first workpiece to the second workpiece when the function for performing a linear interpolation is judged in said judging step to be not present in the robot and that the shift module is not required to shift and assemble the first workpiece to the second workpiece when the function for performing a linear interpolation is judged in said judging step to be present in the robot.

11. A method according to claim 10, further comprising a second judging step of judging whether and insert operation, which is performed when the first and second workpieces are assembled, is of single axis drive, wherein said determining step determines that the shift module is not required when the insert operation is of single axis drive.

12. A method of selecting a hand structure for assembling at least first and second workpieces in a robot, the hand structure being provided with a rotational module for performing a rotating operation, a reversing module for performing a reversing operation, a shift module for performing a shift operation, a cushion module for performing a cushioning operation, a compliance module for performing a compliance operation and a workpiece clamping module, with the workpiece clamping module positioned at a terminal end of the hand structure and the other modules positioned in an optional order between the workpiece clamping module and the robot, said method comprising steps of:

judging whether or not an overload state, in which a reactive force occurring upon mounting of the first workpiece supported by the workpiece clamping module to the second workpiece is greater than a predetermined value, is present; and determining that the cushion module is required to cushion the reactive force when the first workpiece is mounted to the second workpiece when said judging step judges the overload state is present and that the cushion module is not required to cushion the reactive force when said judging step judges the overload state is not present.

* * * * *

UNITED STATES PATENT AND TRADEMARK OFFICE
CERTIFICATE OF CORRECTION

PATENT NO.   : 5,825,980

DATED        : October 20, 1998

INVENTOR(S) : Shojiro Danmoto, et al.

It is certified that error appears in the above-identified patent and that said Letters Patent is hereby corrected as shown below:

COLUMN 4:

Line 48, delete "15".

COLUMN 6:

Line 34, "dampers" should read --clampers--; and
    Line 40, "dampers" should read --clampers--.

COLUMN 8:

Line 33, "dampers" should read --clampers--; and
    Line 44, "dampers" should read --clampers--.

UNITED STATES PATENT AND TRADEMARK OFFICE
CERTIFICATE OF CORRECTION

PATENT NO. : 5,825,980

DATED : October 20, 1998

INVENTOR(S) : Shojiro Danmoto, et al.

It is certified that error appears in the above-identified patent and that said Letters Patent is hereby corrected as shown below:

COLUMN 15:

Line 2, "to" should read --top--.

COLUMN 23:

Line 56, "$\gamma$defined" should read --$\gamma$ defined--.

COLUMN 24:

Line 6, "$M_1$," should read --$M_1$--.

COLUMN 42:

Line 2, "and" should read --an--.

Signed and Sealed this

Fourteenth Day of September, 1999

Attest:

Q. TODD DICKINSON

*Attesting Officer*  *Acting Commissioner of Patents and Trademarks*